(12) United States Patent
Rock et al.

(10) Patent No.: US 7,149,984 B1
(45) Date of Patent: Dec. 12, 2006

(54) IMAGE CONFIGURATION METHOD

(75) Inventors: Joseph E. Rock, Colorado Springs, CO (US); Adam Workman, Parker, CO (US); Patrick Wilson, Denver, CO (US); Richard A. Bagley, Marlborough, MA (US)

(73) Assignee: Sprint Communications Company L.P., Overland Park, KS (US)

( * ) Notice: Subject to any disclaimer, the term of this patent is extended or adjusted under 35 U.S.C. 154(b) by 578 days.

(21) Appl. No.: 10/056,336

(22) Filed: Jan. 24, 2002

Related U.S. Application Data

(63) Continuation of application No. 10/034,741, filed on Dec. 28, 2001, now abandoned.

(51) Int. Cl.
*G06F 13/00* (2006.01)
*G06F 15/00* (2006.01)

(52) U.S. Cl. .................. 715/838; 715/848; 715/801

(58) Field of Classification Search ................. 345/764, 345/629, 634, 419, 427, 581; 705/27; 715/800, 715/815, 801, 848, 838
See application file for complete search history.

(56) References Cited

U.S. PATENT DOCUMENTS

| | | | | |
|---|---|---|---|---|
| 5,293,479 A | * | 3/1994 | Quintero et al. ............ 715/841 |
| 6,144,388 A | * | 11/2000 | Bornstein .................... 345/629 |
| 6,307,568 B1 | * | 10/2001 | Rom .......................... 345/629 |
| 6,339,763 B1 | * | 1/2002 | Divine et al. ................ 705/27 |
| 6,344,853 B1 | * | 2/2002 | Knight ........................ 345/629 |
| 6,466,237 B1 | * | 10/2002 | Miyao et al. ............... 715/838 |
| 6,501,441 B1 | * | 12/2002 | Ludtke et al. .............. 345/1.1 |
| 6,552,734 B1 | * | 4/2003 | Rozin ......................... 345/629 |
| 6,583,792 B1 | * | 6/2003 | Agnew ....................... 345/660 |
| 6,798,923 B1 | * | 9/2004 | Hsieh et al. ................ 382/284 |

* cited by examiner

*Primary Examiner*—Cao (Kevin) Nguyen

(57) ABSTRACT

A method in a computing environment is provided for configuring images for display on the Internet. The method includes selecting first and second component images and positioning the images according to a coordinate system to create a configured image. In the preferred embodiment, the method of the present invention is utilized to configure products in an online purchasing environment.

27 Claims, 34 Drawing Sheets

PRODUCT TABLE
CONFIG. 1
CONFIG. 2
CONFIG. 3
CONFIG. 4
CONFIG. 5
CONFIG. X
— 1902

PHOTO IMPLEMENTOR TABLE
CONFIG. 1, PHOTO A, PHOTO C, PHOTO E
CONFIG. 2, PHOTO A, PHOTO B
CONFIG. 3, PHOTO A, PHOTO D, PHOTO E
. . . . . .
— 1904

PHOTO COORDINATE TABLE
PHOTO A    $(X_A, Y_A)$
PHOTO B    $(X_B, Y_B)$
PHOTO C    $(X_C, Y_C)$
PHOTO D    $(X_D, Y_D)$
PHOTO E    $(X_E, Y_E)$
— 1906

FIG. 19.

ADDRESS TABLE

```
ADDRESS 1,   ADD-ID1
ADDRESS 2,   ADD-ID2
ADDRESS 3,   ADD-ID3
ADDRESS 4,   ADD-ID2     } 2502
ADDRESS 5,   ADD-ID4
ADDRESS 6,   ADD-ID3
ADDRESS 7,   ADD-ID1
ADDRESS 8,   ADD-ID4
```

FIG. 25.

ADDRESS/GEOGRAPHIC REGION CROSS-REFERENCE TABLE

```
ADD-ID1, GEO-ID1, GEO-ID2, GEO-ID3
ADD-ID2, GEO-ID1, GEO-ID2, GEO-ID3, GEO-ID4
ADD-ID3, GEO-ID5, GEO-ID6, GEO-GEO-ID7
ADD--ID4, GEO-ID8, GEO-ID9, GEO-ID10
```

GEOGRAPHIC REGION/TAX DISTRICT
CROSS REFERENCE TABLE

GEO-ID1, TAXDIST-ID1
GEO-ID2, TAXDIST-ID2
GEO-ID3, TAXDIST-ID3, TAXDIST-ID4
GEO-ID4, TAXDIST-ID5
GEO-ID5, TAXDIST-ID6
GEO-ID6, TAXDIST-ID7
GEO-ID7, TAXDIST-ID8, TAXDIST-ID9
GEO-ID8, TAXDIST-ID10
GEO-ID9, TAXDIST-ID11
GEO-ID10, TAXDIST-ID12

TAX TABLE

TAXDIST-ID1, (A%)
TAXDIST-ID2, (B%)
TAXDIST-ID3, (C%)
TAXDIST-ID4, (D%)
TAXDIST-ID5, (E%)
TAXDIST-ID7, (F%)
TAXDIST-ID8, (G%)
TAXDIST-ID9, (H%)
TAXDIST-ID10, (I%)
TAXDIST-ID11, (J%)
TAXDIST-ID12, (K%)

| | 3002 | 3004 | 3006 |
|---|---|---|---|
| 3008 | CATEGORY LEVEL | NAME | DESCRIPTION |
| 3010 | AAA | ESTORE 1 | VENDOR - ABC NURSERY |
| | AAB | ESTORE 2 | VENDOR - XYZ FLORISTS |
| | . | . | . |
| | . | . | . |
| | . | . | . |

| | CATEGORY LEVEL (3012) | ITEM NAME (3014) | ITEM DESCRIPTION (3016) |
|---|---|---|---|
| 3018 | AAA | ESTORE 1 | |
| 3022 | AAA001 | TELEPHONES | |
| 3024 | AAA002 | COMPUTERS | |
| 3026 | AAA001AAA | CORDLESS PHONES | |
| 3028 | AAA001AAA001 | 9 MHZ | |
| 3030 | AAA001AAA002 | 2.4 GHZ | |
| 3032 | AAA001AAB | DESKTOP | |
| 3034 | AAA001AAC | WALL MOUNT | |
| 3020 | AAB | ESTORE 2 | |
| 3036 | AAB001 | TELEPHONES | |

| REC. # | CLIENT ID | HEATED SEAT | AUTO WIPERS | ROOF |
|---|---|---|---|---|
| 1 | C-001 | | VENDOR 1 | SOLID |
| 2 | C-002 | DRIVER ONLY | | SOLID |
| 3 | C-003 | DRIVER/ PASS | VENDOR 2 | MOON |
| 4 | C-004 | | | SUN |

FIG. 31a.
(PRIOR ART)

| REC. # | CLIENT ID | HEATED SEAT | AUTO WIPERS | ROOF |
|---|---|---|---|---|
| 1 | C-001 | | W001 | R001 |
| 2 | C-002 | HS001 | | R001 |
| 3 | C-003 | HS002 | W002 | R002 |
| 4 | C-004 | | | R003 |

FIG. 31b.
(PRIOR ART)

AUTO WIPERS — 3204

| VENDOR | DESCR | ID# |
|---|---|---|
| VEND. 1 | AUTO | W001 |
| VEND. 2 | AUTO | W002 |

HEATED SEAT — 3202

| VENDOR | DESCR | ID# |
|---|---|---|
| VEND. 1 | DRIVE ONLY | HS001 |
| VEND. 1 | DRIVE/PASS | HS002 |

ROOF — 3206

| VENDOR | DESCR | ID# |
|---|---|---|
| VEND. 1 | SOLID | R001 |
| VEND. 1 | MOON | R002 |
| VEND. 2 | SUN | R003 |

FIG. 32.

IMAGE CONFIGURATION METHOD

CROSS REFERENCE TO RELATED APPLICATIONS

This application is a continuation of patent application Ser. No. 10/034,741, filed Dec. 28, 2001, now abandoned and claims priority therefrom.

FIELD OF THE INVENTION

The present invention relates to software program modules in network computing environments. More specifically, this invention relates to a system and method for configuring images for display on the Internet, such as products for sale on commercial web sites.

BACKGROUND OF THE INVENTION

As organizations strive to improve their quality of service and efficiency, increasingly they are turning to electronic commerce (e-Commerce) to achieve these goals. Generally described, e-Commerce is commercial activity conducted on networks such as closed private networks or the Internet.

Historically, e-Commerce was conducted on private networks. Large organizations developed Electronic Data Interchange (EDI) and financial institutions implemented Electronic Funds Transfer (EFT). Both EDI and EFT were used by these respective industries to transact business primarily between other members within the same industry. More recently, the proliferation of the Internet as an open system that can be inexpensively accessed by persons around the world has created a shift in the desired network environment for conducting business. Small and large organizations alike are looking to plug-in to the Internet for conducting business, particularly for the distribution and acquisition of products and/or information. In addition to organizations, private individuals also are turning to the Internet as a means for conducting a vast amount of their daily activities. One reason for this growth has been the convenience and efficiency of locating products and information on the Internet. By the same token, businesses have found the Internet and e-Commerce to be advantageous in facilitating and improving traditionally time consuming tasks such as selling products, invoicing, controlling inventories and communicating with suppliers and customers.

Another area of commerce that is of concern to organizations today is mobile commerce (m-Commerce). While somewhat related to e-Commerce, m-Commerce, or "wireless Internet" as it is sometimes referred to, has some distinct and unique features that set it apart. These features include, among others, appearance, capabilities and protocols. There are evolving standards and protocols in the mobile arena, along with a cascade of software and hardware options. While not all of these options will be viable, the concept and the offerings in m-Commerce are dynamic and are continuously evolving. In particular, customers and knowledge workers are no longer tethered to their desktop personal computer (PC) in order to access information. They can retrieve and process data anywhere and at anytime with a mobile connection to information. Organizations need to be able to provide compelling offerings for m-Commerce, build infrastructures that are suited for this area, and build business models that work for m-Commerce rather than just being wired models that are emulated and ported into the wireless realm. In other words, the technology must be dynamic and modular so that businesses may evolve quickly over time. In addition, the mobile business model must be one that captures the value of products and services in the wireless space.

A typical e-Commerce solution for an organization requires an infrastructure to support deployment and ongoing utilization, in addition to the design, analysis, implementation and integration of the web application. Furthermore, the organization is faced with issues relating to locating the necessary manpower and expertise necessary to attain the objectives of the e-Commerce solution. In addition to issues of manpower and infrastructure, there are concerns related to identifying and incorporating the appropriate functions to support consumer, business and commerce needs. As is readily understood and appreciated, fulfillment of these requirements involves a considerable amount of time. The nature of a global economy and the intense business competition that currently exist require organizations to expedite the deployment of any and all advantageous systems and solutions, while still maintaining a high quality of service and flexibility in their offerings.

Organizations also must make decisions regarding selection of a package-based environment or a home-grown customized solution for their entry into the 'new age' commerce environment. As is expected, there are advantages and disadvantages with each available option. A customized solution has the inherent disadvantages of locating the necessary expertise and allocating the required design and development time, which, as previously discussed, often are precluded by the fast paced nature of today's commerce. Accordingly, this suggests an inherent advantage to a package-based system. However, the advantages of package-based environments, which further include total integration, single source and support, are offset by other issues. These offset issues include developer/integrator learning curve, initial data loads, system installation and other similar costs that can be found with the initial version of any pre-packaged software or system. In fact, the benefits of commerce application systems can be fully realized only by an ongoing commitment to the package. Such commitment includes dealing with some of the total cost of ownership issues, such as the requirement for extensive training and exposure, dependence on vendor upgrade schedules and support, commitment to non-coding engineering activities, and the inevitable trade-off of increased features for ease of use. A package with a wide variety of features and flexibility tends to require more effort on the part of the end user both to familiarize themselves with the package and to become efficient at using it.

As previously mentioned, one reason for the growth in product distribution and purchasing via the Internet is the convenience and efficiency of locating products, and associated information, on the Internet. Consumers now can locate information (e.g., style, color, price, etc.) concerning similar products from multiple vendors in a matter of minutes, eliminating the need for visiting or telephoning multiple stores. Additionally, consumers can make on-line purchases of products and have them delivered to their home, or other convenient location, with minimal time commitment. Similarly, consumer business organizations have found the Internet and e-Commerce to be advantageous in facilitating and improving traditionally time consuming tasks such as selling products, invoicing, controlling inventories and communicating with suppliers as well as customers.

This business trend has resulted in a forum for on-line purchasing known as the Internet store or electronic store (e-Store). Many wholesale and retail consumer organizations, such as department stores, have created on-line purchasing options for their inventories. Additionally, manufacturers and vendors have begun to sell products through e-Stores which are not associated with a traditional consumer venue. Multiple vendor e-Stores offer the advantage of selling similar products from a variety of vendors, thus presenting the consumer with options for purchase which may not be available in traditional consumer venues.

An important aspect of e-Commerce and the sale of products via a web site is the visual depiction of the products being sold. More specifically, customers wish to visually examine a product prior to making a purchasing decision. Currently, visual depictions are provided by scanning photographs of products into the web site. A customer may then select a particular product and see the associated photograph displayed prior to or upon purchase.

This method of operation is adequate when either there is a limited amount of product, or where the products themselves are not subject to multiple variations. However, products oftentimes may be configured in numerous different ways and/or may have multiple alternative accessories and parts which substantially vary the visual appearance of the product. Under the present system, in order for the multiple variations to be displayed, it is necessary to configure the products in each possible variation and, thereafter, take, scan and store photographs of each variation of the product. Thus, when a customer selects a particular configuration, a photograph reflecting the selected configuration is retrieved and displayed on the web site.

As is apparent, when multiple products and/or multiple configurations of products are available for purchase on a particular web site, the photographing, scanning and storing of all possible variances can become extremely burdensome. Accordingly, the actual product configured as desired by the customer oftentimes is not displayed, but rather a generic version or a product which is relatively similar. In particular, certain accessories and auxiliary parts may be left off of the configuration simply because it is not feasible to photograph every possible configuration of a given product or product line.

Accordingly, a method is needed in a computer system for use in a commercial web site wherein the problems discussed above are addressed. In particular, a method is needed which permits presentation and display of various product configurations without the necessity of photographing or otherwise depicting each possible variation of a product.

SUMMARY OF THE INVENTION

The present invention is directed to a method in a computing environment for configuring images for display. The method comprises receiving a selection of a first component image which depicts a first component and a selection of second component image which depicts a second component. The images are positioned on a coordinate system to create a configured image which includes both the first and second components.

The present invention further is directed to a method in a computing environment for configuring product images for display which comprises first receiving a selection of a configured product image. A first data table is then consulted to determine which of a variety of component images comprise the configured product image. A second data table also is consulted to determine the coordinates on an (X,Y) axis of each component image that comprises the configured product image. The configured product image is displayed by placing each component image at its corresponding coordinates on the (X,Y) axis.

Still further, the present invention is directed to a computer system for displaying a configured graphical image. The computer system includes a configuration component, a coordinate component and a displaying component. The configuration component determines which of a plurality of component images comprise the configured image. The coordinate component determines the positioning of the component images on a coordinate system, the positioning being defined by (X,Y) coordinates. The displaying component positions the component images on an (X,Y) axis based upon the determined coordinates and displays the resulting configured graphical image.

Additionally, the present invention is directed to a method in a computing environment for displaying a product configuration including multiple parts. The method includes determining the coordinates on an (X,Y) axis for one or more component images that comprise the product configuration and displaying the product configuration by positioning the component images at their determined coordinates.

The present invention also is directed to a computer readable medium containing a data structure for storing location information on one or more component images of a configured product. The data structure comprises an implementor table and a coordinate table. The implementor table contains entries indicative of the component images that make up the configured product. The coordinate table contains entries indicative of the (X,Y) coordinates for the component images which specify the positioning of the component images necessary to correctly make up the configured product.

Additional aspects of the invention, together with the advantages and novel features appurtenant thereto, will be set forth in part in the description which follows, and, in part, will become apparent to those of skill in the relevant art upon examination of the following, or may be learned from the practice of the invention. The objects and advantages of the invention may be realized and attained by means, instrumentalities and combinations particularly pointed in the appended claims.

BRIEF DESCRIPTION OF THE SEVERAL VIEWS OF THE DRAWINGS

In the accompanying drawings which form a part of the specification and are to be read in conjunction therewith, and in which like reference numerals are employed to indicate like parts in the various views:

FIG. 19 is an illustration of the tables involved in the image configuration application according to an embodiment of the present invention;

FIG. 25 is an illustration of an address table for use in the tax computation module according to an embodiment of the present invention;

FIG. 26 is an illustration of an address/geographic region cross-reference table for use in the tax computation module according to an embodiment of the present invention;

FIG. 27 is an illustration of a geographic region/tax district cross-reference table for use in the tax computation module according to an embodiment of the present invention;

FIG. 28 is an illustration of a tax table for use in the tax computation module according to an embodiment of the present invention;

FIGS. 31a and 31b illustrate a typical prior art system for storing data;

FIG. 32 illustrates a system for storing data in accordance with the implementor concept of the present invention.

DETAILED DESCRIPTION OF THE INVENTION

Figure 1:
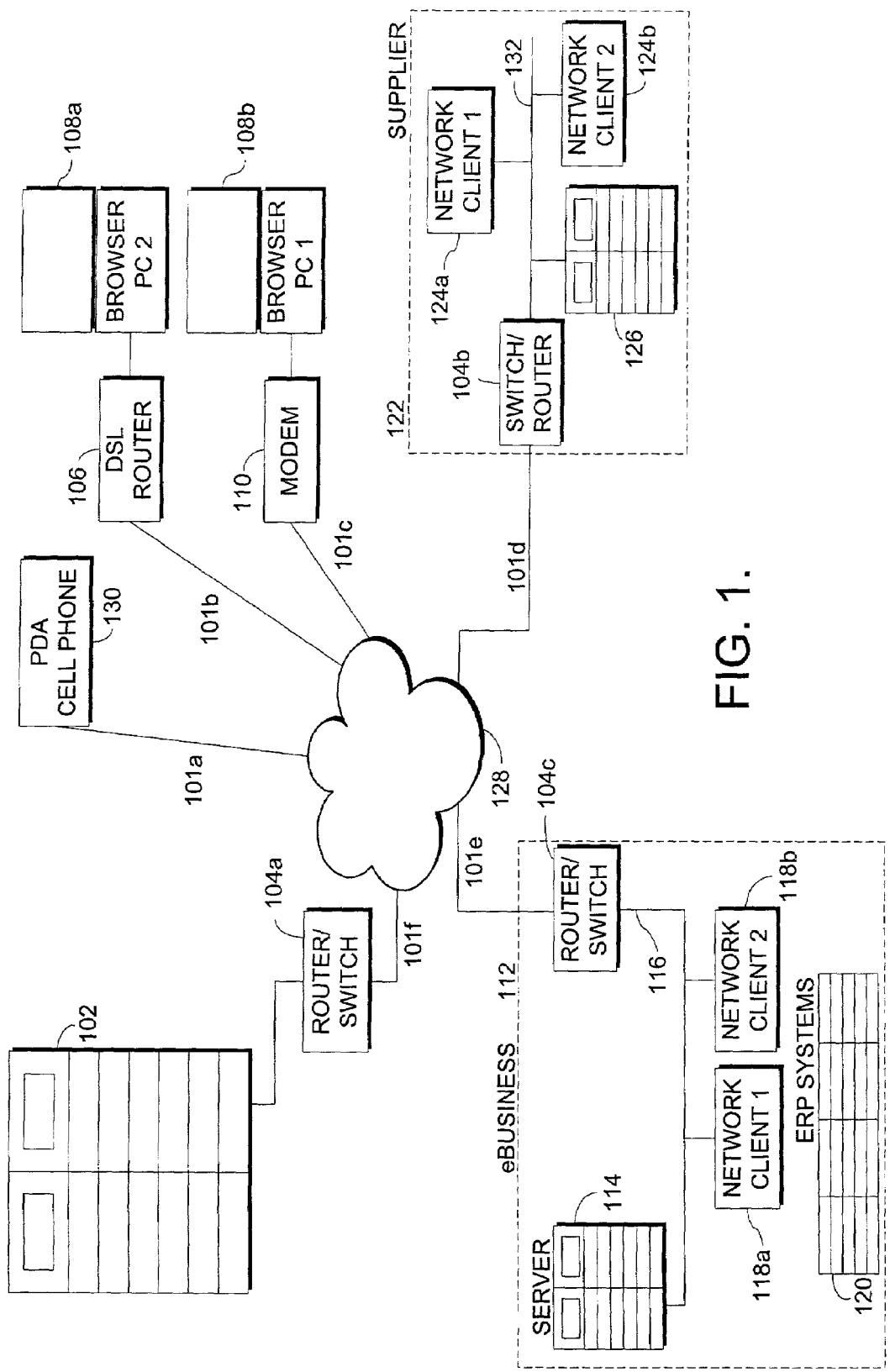
FIG. 1 is a block diagram of an exemplary architecture of a network suitable for practicing the present invention.

The present invention provides various systems and methods which permit the development, hosting and integration of commercial web sites. The particular embodiments described herein are intended in all respects to be illustrative rather than restrictive. Alternative embodiments will become apparent to those skilled in the art to which the present invention pertains without departing from its scope.

It should be understood that the present invention is directed to both electronic commerce (e-Commerce) and electronic business (e-Business). The term "e-Commerce", as used herein, and as is generally understood in the art, refers to the activities surrounding the purchase and sale of goods and services via a network such as a closed private network or, more typically in today's marketplace, the Internet. e-Business, on the other hand, refers to a much broader range of functions, including, in addition to e-Commerce, training, human resources, support and other common business activities. The present invention comprises a suite of applications and modules that can be uniquely combined or grouped to accomplish tasks complying with varying levels of e-Business requirements. The suite of applications and modules of the present invention is designed to quickly mobilize and manage an organization's entry into, or expansion within, the Internet business space. In other words, the suite of the present invention enables an organization to maximize the use of the Internet for Business-to-Business (B2B), Business-to-Consumer (B2C) and other business functions.

As previously stated, the suite offering of the present invention is a collection of applications and modules which may be combined to accomplish various e-Business tasks. These applications and modules include, among other standard and optional components, an administration application, an online purchasing application, an image configuration application and a database integration application. Each of these applications is discussed in further detail below.

In brief, the administration application of the present invention permits a customer to manage, build and maintain web-enabled applications. The online purchasing application of the present invention further provides the ability to launch fully functional, highly flexible electronic stores (e-Stores) expeditiously. The image configuration application of the present invention provides the ability for an end-user to customize the configuration of product images that are available within an e-Store, by selecting and matching product component pieces. An additional feature of the customized image configuration application, is the incompatibility module which provides of the automatic detection and correction of incompatible product component selections by an end-user. The database integration application provides an Extensible Markup Language (XML) based integration of the e-Commerce system of the present invention, with various organizations' Enterprise Resource Planning (ERP) systems, to support product availability, shipping and status information exchange.

Having briefly described the various applications offered by the suite of the present invention, an exemplary architecture of a network suitable for practicing the present invention is described below.

Exemplary Operating Architecture

The present invention may be described in the general context of computer-executable instructions, such as program modules, being executed by one or more computing devices in a network environment. Generally a network includes several similar or dissimilar devices connected together by some transport medium, which enables communication between the devices by using a predefined protocol. Those skilled in the art will appreciate that the present invention may be practiced within a variety of network configuration environments and on a variety of computing devices, including hand-held devices, consumer electronics, and the like. The invention also may be practiced in a wireless computing environment.

Referring to the drawings in general and initially to FIG. 1 in particular, wherein like reference numerals identify like components in the various figures, an exemplary operating environment for implementing the present invention is shown. FIG. 1 illustrates a network architecture 100 in which the present invention can be implemented. The network architecture 100 is merely one example of a suitable architecture and is not intended to suggest any limitation as to the scope of use or functionality of the invention. Additionally, the network architecture 100 should not be interpreted as having any dependency or requirement relating to any one or combination of components illustrated FIG. 1.

An exemplary network 100 for implementing the invention includes a public or private network 128, such as the Internet, Virtual Private Network (VPN) or other such arrangement, that enables multiple devices to be locally or remotely interconnected to facilitate communication between them. The Internet is a network of networks that enables one computing system to access virtually any other computing system, as well as any database and/or any type of information, anywhere in the world, so long as requisite devices have access to the Internet. VPN, otherwise referred to as a Software-Defined Network (SDN), typically is used by large user organizations that have sites which are geographically dispersed. A terminating location in each of a multi-site enterprise is identified and a level of bandwidth required by each is determined. Dedicated access circuits are then established between each point of termination and the closest VPN-capable InterExchange Carrier (IXC) Point Of Presence (POP). This allows the routing of communication traffic over specified high-capacity transmission facilities on a priority basis, thus creating a level of service equivalent to that of a true private network.

The present invention operates with a variety of connected devices in a network environment, as discussed and illustrated in FIG. 1. In an embodiment of the present invention, a hosting server 102 or multiple servers, provide a central store or repository for the software programs and data required to provide a functional web site and more particularly a functional electronic store (e-Store). An electronic business organization (e-Business) 112 that has products or services to offer on-line also may be connected to the network. End-customers, or others seeking to access the information or products provided by e-Business 112, also may be connected to the network 128 by a variety of hardware and software interfaces. Suppliers/vendors 122 of an e-Business also may be connected to the network 128, to facilitate the ordering of raw materials or supplies. Regardless of the intended purpose of the connection, each of the connections discussed above can be accomplished in a variety of different ways. Connections can be established in ways including, but not limited to, dial-up access 101c using a modem 110, broadband connection 101b such as Digital Subscriber Line (DSL) via a DSL router 106, wireless access 101a, or dedicated access 101e such as a T1 line. However, the performance of the connection will depend upon the nature of the underlying technologies that are utilized and the amount of available bandwidth that is provided. In all instances of the stated connection types, there is a requirement for specific combinations of hardware and software on each end of the communication medium. For example, when using dial-up access via a modem to connect to the Internet, there must be a modem on the client side and a modem on the receiving side of the network. The receiving side of the network for the Internet is usually provided by an Internet Service Provider (ISP) that has a bank of modems rated at a various speeds, in order to accommodate and match the speed of incoming client modem connections.

The indicated remote connection 101f provides access from the network 128 through a router 104a to a hosting system 102, which may be a single computing device or an array of devices that are interconnected. The hosting system 102, provides access to stored information and web enabled applications such as applets, portlets, web pages and the like, for use or execution by the various other computing devices on the network 128. Computing devices on the network 128 that may be utilized for communicating to the host system 102 may include, but are not limited to, wireless devices 130 linked by a remote connection 101a, such as a PDA, PC, hand held device or other mobile device equipped with a wireless interface. The network 128 can also be accessed by a client side application program or browser executing on a PC 108a, 108b. The PC 108a, 108b may be connected to the network 128 in a variety of ways including but not limited to a hard-wired connection via a Local Area Network (LAN) or a remote connection. An example of such remote connections include the connection 101b from a PC 108a via a DSL Router 106, the connection 101c from a PC 108b via a dial up modem 110, or any of the other connection configurations previously discussed.

e-Business 112 customers that utilize the present invention also may be connected to the network 128. In that case, a direct connection 101e is utilized by the e-Business. Large organizations typically derive a cost-benefit from utilizing a dedicate access connection. A dedicated or direct access connection in this context is a connection to a regional or national backbone provider, bypassing any local ISP. Direct access can be on the basis of a number of alternatives including, but not limited to, Dataphone Digital Service (DDS), Trunk Carrier (T-Carrier) (e.g., Fractional T1, T1, T3, etc.). The connection 101e is linked to a network interface device, such as router/switch 104c, which performs the functions of routing and switching between the external network 128 and the corporate network 116 of the e-Business 112. A router is an intelligent device that supports connectivity between like and disparate LANs. Routers also can provide access to various WANs, such as X.25, ISDN and Frame Relay. Routers generally provide connectivity, addressing and switching. As would be understood by those skilled in the art, an e-Business can be highly computerized with an enterprise network system as shown in FIG. 1 or simply have a single stand alone computer. As shown, a single server 114 or multiple servers are connected on a corporate network 116. The server 114 is accessible by any one or more of the enterprise network clients 118a, 118b. In addition, an Enterprise Resource Planning (ERP) system 120, may be present on the corporate network 116 for handling manufacturing, product tracking, shipping and supplier related information.

It is not unusual that in conjunction with the e-Business 112, a supplier business 122 that has a relationship with the e-Business 112 may also be connected to the network 128. The supplier business 122 in this case, has a remote connection 101d that is coupled to a switch/router 104b, which is then connected to a LAN 132 at the supplier location. As with the e-Business 112, the supplier may also have a server 126 and multiple client workstations 124a, 124b.

Although many other components of the network architecture 100 are not shown, those of ordinary skill in the art will appreciate that such components and the interconnection between them are well known. Accordingly, additional details concerning the construction of the network architecture 100 need not be disclosed in connection with the present invention.

The network architecture discussed above provides the infrastructure for the systems and methods of the present invention, as well as other systems and applications found in an enterprise wide business. Having briefly described an exemplary architecture, an exemplary operating environment for the present invention is described below.

Exemplary Operating Environment

Figure 2:
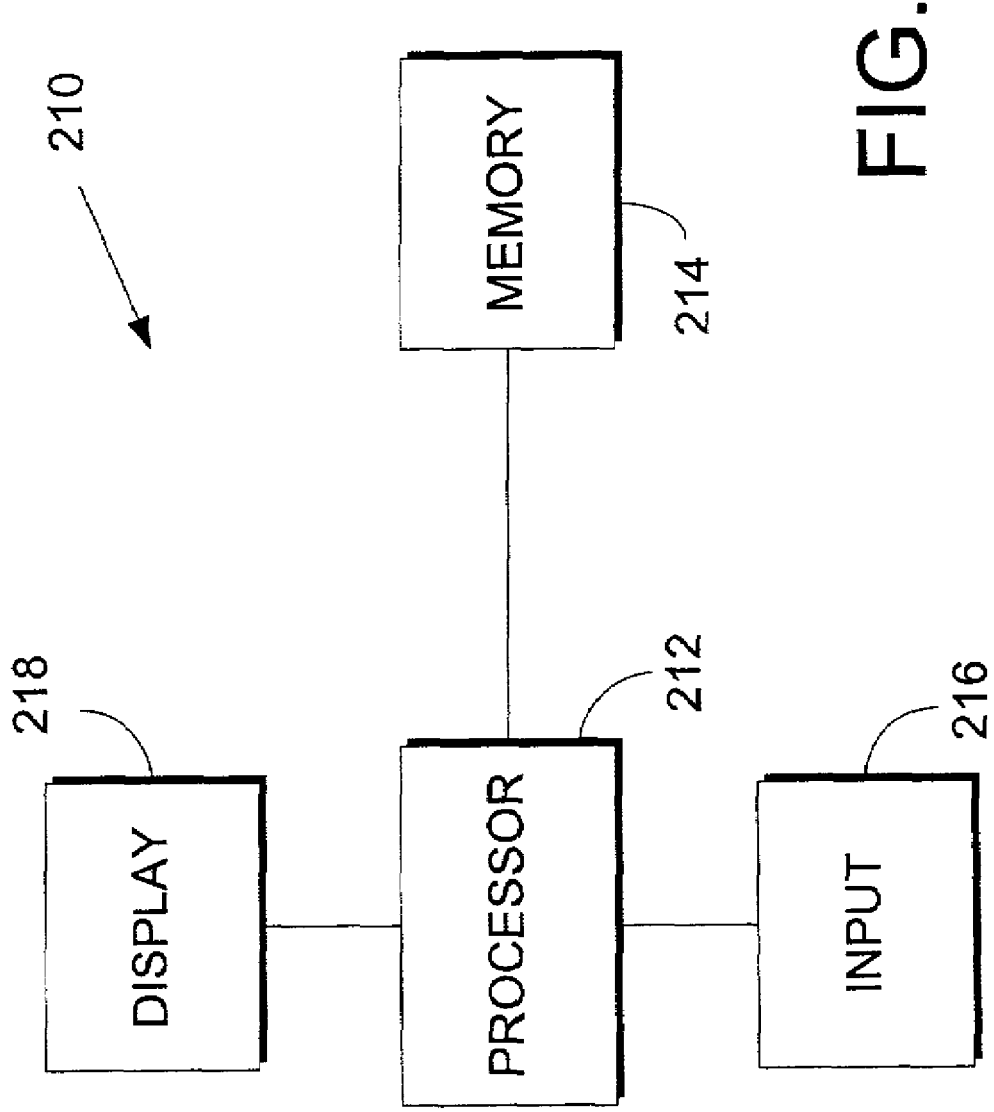
FIG. 2 is a block diagram of a computing system environment suitable for use in implementing the present invention.

Referring now to the drawings in general and initially to FIG. 2 in particular, an exemplary operating environment for implementing the present invention is shown and designated generally as operating environment 210. In its most basic configuration, operating environment 210 typically includes a processor 212 and a memory 214. Depending upon the exact configuration and type of operating environment, memory 214 may be volatile (e.g., random access memory (RAM)), non-volatile (e.g., read only memory (ROM), flash memory, etc.) or some combination of volatile and non-volatile memory. Additionally, operating environment 210 also may have mass storage (removable and/or nonremovable) such as magnetic tape, magnetic disks, and/or optical disks. The operating environment 210 further typically includes an operating system which is resident on the memory 214 and executes on the processor 212.

Operating environment 210 also may include an input 216 and/or an output, such as a display 218. Merely by way of illustration and not restriction, input 216 may be any one of a variety of inputs known in the art, or any combination thereof, such as a keypad, mouse, pen, voice input device, touch input device, and the like. Similarly, output 218 may be any one or a combination of a variety of outputs known in the art such as a display, speakers, printer, and the like. All such devices are well known in the art and need not be discussed at length herein. It will be understood and appreciated that various inputs or outputs may be utilized with the operating environment of the present invention and such variations are contemplated to be within the scope hereof.

As will be understood and appreciated by those skilled in the art, while an embodiment of the present invention is described with reference to a personal computer (PC) environment, other embodiments utilizing alternative computing devices and environments are within the scope of the present invention. By way of example and not limitation, an exemplary PC operating environment is illustrated in FIG. 3.

Figure 3:
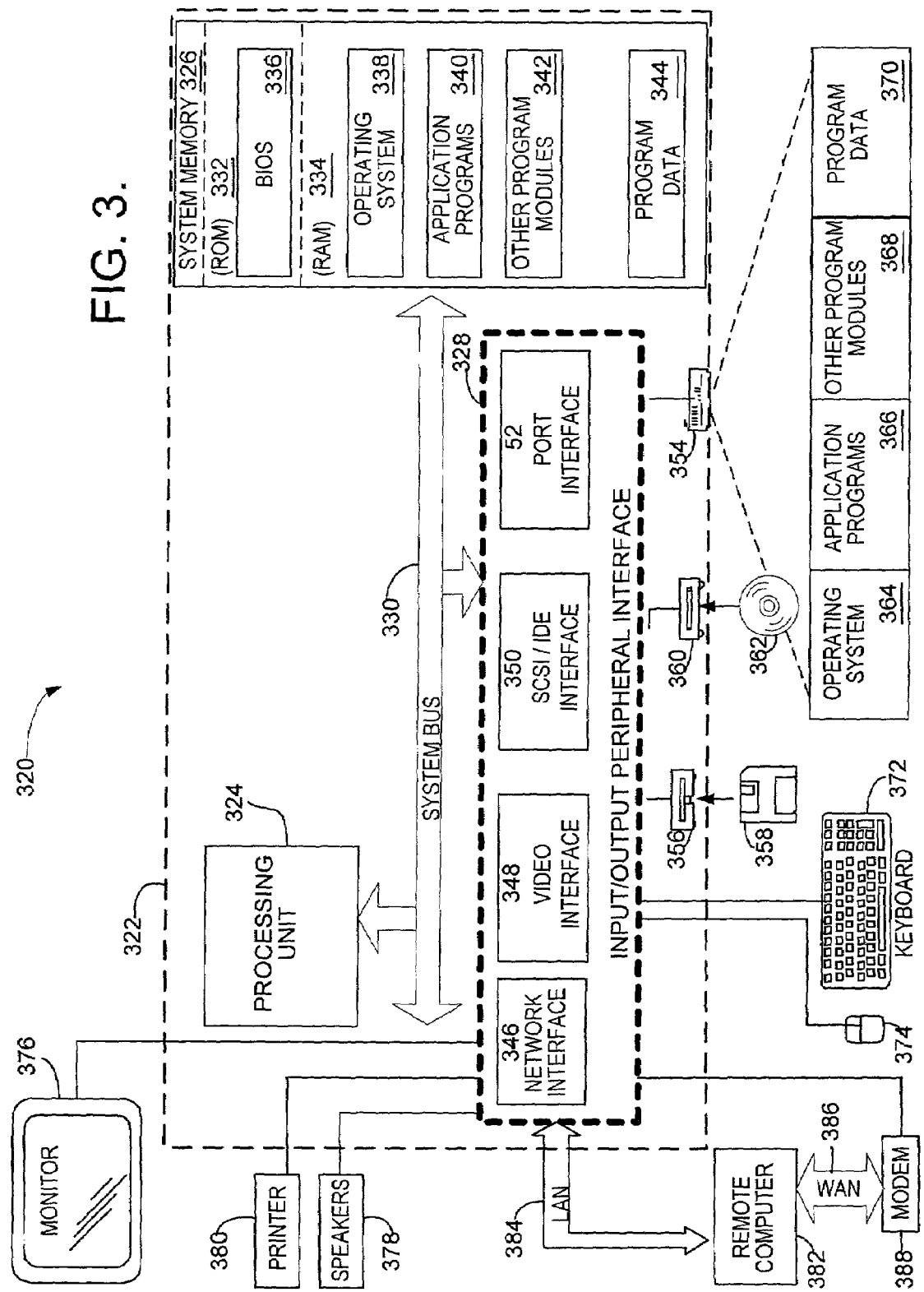
FIG. 3 is a more detailed block diagram of a computing system suitable for use in implementing the present invention.

In greater detail, FIG. 3 illustrates an example of a suitable operating environment 320 on which the present invention may be implemented. Operating environment 320 is a computing system environment and is merely one example of a suitable operating environment. Computing system environment 320 is not intended to suggest any limitation as to the scope of use or functionality of the present invention. Further, computing system environment 320 should not be interpreted as having any dependency or requirement relating to any one of the components, or any combination thereof, illustrated in the exemplary computing environment 320.

The present invention may be described in the general context of computer-executable instructions, such as program modules, being executed by a computer. Generally, program modules include routines, programs, objects, components, data structures, and the like, that perform particular tasks or implement particular abstract data types. Moreover, those skilled in the art will appreciate that the present invention is operational with a variety of additional general purpose or special purpose computing systems, environments, and/or configurations. Examples of well known computing systems, environments, and/or configurations that may be suitable for use with the present invention include, but are not limited to, personal computers, server computers, hand-held or laptop devices, multiprocessor systems, microprocessor-based systems, programmable consumer electronics, network PCs, minicomputers, mainframe computers, and the like. The invention also may be practiced in distributed computing environments wherein tasks are performed by remote processing devices that are linked through a communications network. In a distributed computing environment, program modules may be located in both local and remote computer storage media including memory storage devices.

With continued reference to FIG. 3, an exemplary system for implementing the present invention includes a general purpose computing device in the form of a computer 322. Components of computer 322 include, but are not limited to, a central processing unit (CPU) 324, a system memory 326, an input/output (I/O) Interface 328, and a system bus 330 that couples various system components with one another, including coupling the system memory with the processing unit. The system bus 330 may be any of several types of bus structures including a memory bus or memory controller, a peripheral bus, and a local bus using any of a variety of bus architectures. By way of example, and not restriction, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 322 typically includes a variety of computer readable media. By way of example, and not restriction, computer readable media may comprise computer storage media and communication media. Computer storage media includes both volatile and nonvolatile storage media, and removable and non-removable storage media, each implemented in any method or technology for storage of information such as computer readable instructions, data structures, program modules or other data. Examples of computer storage media include, but are not limited to, RAM, ROM, electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 322.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not restriction, communication media includes wired media such as a wired network or direct wired connection, and wireless media such as acoustic, RF, infrared and other wireless media. It will be understood and appreciated that combinations of any of the above also are included within the scope of computer readable media.

The system memory 326 includes computer storage media in the form of volatile and/or nonvolatile memory such as ROM 332 (nonvolatile) and RAM 334 (volatile). A basic input/output system (BIOS) 336, containing the basic routines that help to transfer information between elements within computer 322, such as during start-up, is typically stored in ROM 332. RAM 334 typically contains data and/or program modules that are presently being operated on by processing unit 324, and/or are immediately accessible to the processing unit. By way of example, and not restriction, FIG. 3 illustrates operating system 338, application programs 340, other program modules 342, and program data 344 as data and/or program modules stored in RAM 334.

The I/O Interface 328 includes a variety of components that provide physical connections and communications between peripheral devices and the processing unit 324, system bus 330 and system memory 326 of computer 322. By way of example only, I/O Interface 328 may include network interface 346, video interface 348, Small Computer System Interface (SCSI) or Integrated Device Electronics (IDE) Interface 350, or other mass storage-type interface, and serial, parallel, USB, or other bus-type port interface 352. As will be understood and appreciated by those of skill in the art, I/O Interface 328 may include interface components that are integrated, provided as an add-on hardware device, provided as a software component, or as a combination of software and hardware. All such variations are contemplated to be within the scope hereof.

The computer 322 also may include other computer storage media which may be removable and/or nonremovable, volatile and/or nonvolatile. By way of example only, FIG. 3 illustrates other computer storage media as a hard disk drive 354, a magnetic disk drive 356 and an optical disk drive 360. Hard disk drive 354 reads from and/or writes to nonremovable, nonvolatile magnetic media. Magnetic disk drive 356 reads from and/or writes to a removable, nonvolatile magnetic disk 358. Optical disk drive 360 reads from and/or writes to a removable, nonvolatile optical disk 362 such as a CD ROM, DVD or other optical media. By way of example, and not restriction, other removable/nonremovable, volatile/nonvolatile computer storage media that can be used in the exemplary operating environment include magnetic tape cassettes, flash memory cards, digital video tape, Bernoulli cartridges, solid state RAM, solid state ROM, and the like.

Computer storage media typically is connected to the system bus 330 through I/O Interface 328. Various types of I/O interfaces may be used in the exemplary operating environment 320 and are known to those of skill in the art. For instance, the hard disk drive 354, magnetic disk drive 356, and optical disk drive 360 may be connected to the system bus 330 by a SCSI 350 or IDE Interface. It will be understood and appreciated that the above interfaces are merely examples of interfaces that may be suitable for the exemplary computing system 320 and should not be viewed as limitations of the present invention.

The drives and their associated computer storage media discussed above and illustrated in FIG. 3, provide storage of computer readable instructions, data structures, program modules and other data for the computer 322. In FIG. 3, for example, hard disk drive 354 is illustrated as storing operating system 364, application programs 366, other program modules 368, and program data 370. Note that these components either can be the same as or different from operating system 338, application programs 340, other program modules 342, and program data 344. Typically, the operating system, application programs and the like that are stored in RAM are portions of the corresponding systems, programs, or data read from hard disk drive 354, the portions varying in size and scope depending on the functions desired. Operating system 364, application programs 366, other program modules 368, and program data 370 are given different numbers herein to illustrate that, at a minimum, they are different copies.

A user may enter commands and information into the computer 322 through input devices such as a keyboard 372 and pointing device 374, commonly referred to as a mouse, trackball, or touch pad. Other input devices (not shown) may include a microphone, joystick, game pad, satellite dish, scanner, or the like. These and other input devices often are connected to the processing unit 324, generally through an I/O Interface 328 that is coupled to the system bus 330, more particularly through port interface 352. As previously discussed, input devices may be connected by interface components and bus structures, such as a parallel port, game port or a universal serial bus (USB) port. A monitor 376 or other type of display device also is connected to system bus 330 via an interface such as I/O Interface 328. In addition to the monitor, computers also may include other peripheral output devices such as speakers 378 and printer 380, which also may be connected through I/O interface 328. By way of example only, a typical I/O interface for an output peripheral device such as monitor 376 is a video interface 348.

The computer 322 in the present invention is capable of operating in a networked environment using logical connections to one or more remote computers, such as remote computer 382. The remote computer 382 may be a personal computer, a server, a router, a network PC, a peer device or other common network node, and typically includes many or all of the elements described above relative to the computer 322. The logical connections depicted in FIG. 3 include a local area network (LAN) 384 and a wide area network (WAN) 386, but may also include other networks. Such networking environments are commonplace in offices, enterprise-wide computer networks, intranets and the Internet.

When used in a LAN networking environment, the computer 322 is connected to the LAN 384 through a network interface 346 or adapter. When used in a WAN networking environment, the computer 322 typically includes a modem 388 or other means for establishing communications over the WAN 386, such as the Internet. The modem 388, which may be internal or external, may be connected to the system bus 330 via the I/O Interface 328, or other appropriate mechanism. It will be understood and appreciated by those of skill in the art that the network connections shown are exemplary and other means of establishing a communications link between the computers may be used.

Although many other internal components of the computer 322 are not shown, those of ordinary skill in the art will appreciate that such components and the interconnection are well known. Accordingly, additional details concerning the internal construction of the computer 322 need not be disclosed in connection with the present invention.

When the computer 322 is turned on or reset, the BIOS 336, which is stored in the ROM 332 instructs the processing unit 324 to load the operating system, or necessary portion thereof, from the hard disk drive 354 into the RAM 334. Once the copied portion of the operating system, designated as operating system 338, is loaded in RAM 334, the processing unit 324 executes the operating system code and causes the visual elements associated with the user interface of the operating system 338 to be displayed on the monitor 376. Typically, when an application program 366 is opened by a user, the program code and relevant data are read from the hard disk drive 354 and the necessary portions are copied into RAM 334, the copied portion represented herein by reference numeral 340.

Figure 4:
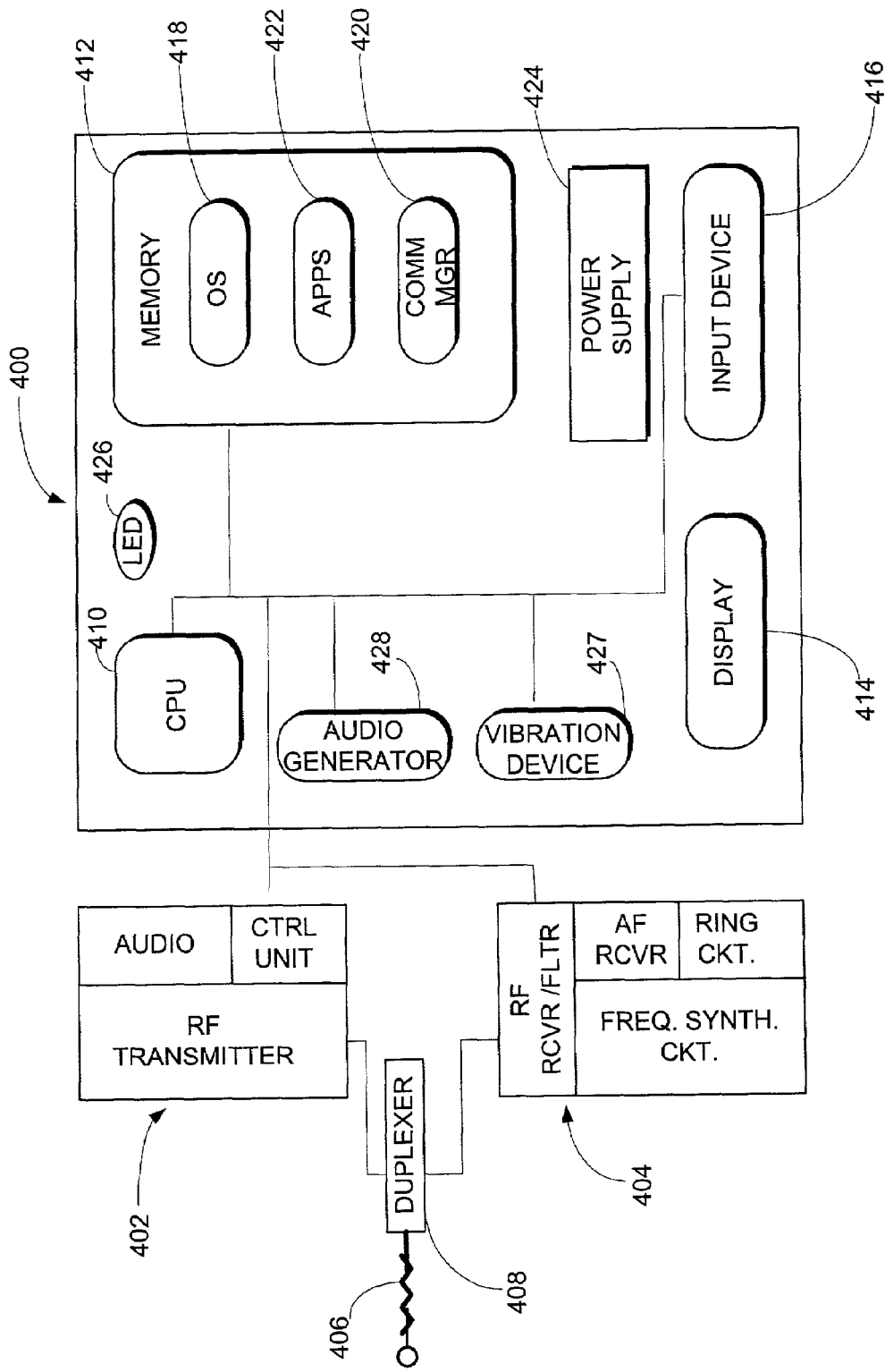
FIG. 4 is a more detailed block diagram of a wireless system suitable for use in implementing the present invention.

FIG. 4 illustrates an alternative suitable computing environment 490 on which the invention may be implemented. Alternative computing environment 490 is a wireless environment and is merely a second example of a suitable computing environment and is not intended to suggest any limitation as to the scope of use or functionality of the invention. Neither should alternative computing environment 400 be interpreted as having any dependency or requirement relating to any one or combination of components illustrated in the exemplary environment 400.

Wireless environment 400 includes several components that are similar to computing environment 320, as well as transmission circuitry 402 and receiving circuitry 404, that jointly utilize an antenna 406 through a duplexer 408. Similar to computing environment 320, wireless environment 400 generally includes a processor 410, a memory 412, a display 414 and an input 416. The memory 412 may be volatile (e.g., RAM), non-volatile (e.g., ROM, Personal Computer Memory Card International Association (PCM-CIA) cards), or some combination of volatile and non-volatile memory. Like computing environment 320, wireless environment 400 typically includes a variety of computer readable media. Examples include, but are not limited to, Programmable Read-Only Memory (PROM) and Erasable Programmable Read-Only Memory (EPROM). The wireless environment 400 further typically includes an operating system 418 which is resident on the memory 412 and executes on the processor 410.

Memory 412 also includes one or more application programs that interact with the operating system 418. Examples of applications include, but are not limited to, email programs, scheduling programs, PIM (personal information management) programs, word processing programs, spreadsheet programs, Internet browser programs and the like. Wireless environment 400 also includes a notification manager 420 loaded in memory 412. The notification manager handles notification requests from application programs 422 and other operating system functions.

Wireless environment 400 further includes a power supply 424 which may be implemented as one or more batteries, such as nickel-cadmium (NiCAD) batteries. The power supply 424 may further include an external power source (not shown) that overrides or recharges the built-in batteries, such as an AC adapter or a powered docking cradle.

Wireless environment 400 is illustrated with three types of external notification mechanisms: an LED 426 or other display, a vibration device 427 and an audio generator 428. These devices are directly coupled to the power supply 424 so that, when activated, they remain on for a duration dictated by the notification mechanism even though the processor 410 and/or other components might be shut down to conserve battery power. The display 414 preferably remains on indefinitely unless and until the user takes action. The vibration device 427 and audio generator 428 may be configured to conserve power by turning off when the rest of the system is off, or at some finite duration after activation.

Within a typical wireless environment 400, radio RF transmitter 402 and radio receiver 404 sections couple transmit and receive functions with a duplexer 408 and an antenna 406. In operation, the processor 410 receives program instructions from memory 412. The wireless environment 400 must receive and transmit a ream of data back and forth to a communications cell site. Signal (e.g., voice/data) is received from a cell site and is filtered and processed to be heard in a speaker. The processor 410 also sends data to and from a frequency synthesizer which, after processing this data, sets up the correct transmit and receiver frequencies. The frequency synthesizer within the receiver 404, with instructions from the processor 410, tunes the wireless environment 400 to the proper receive and transmit channels.

Also within a wireless environment 400 is an input device 416 which may include a microphone, a touch screen display, keyboard or other mechanism for accepting information from a user, or from another external device. Regardless of the source of incoming information that needs to be transmitted, a control unit within the transmitter 402 receives a signal and relevant data from processor 410. The control unit formulates and prepares the data for transmission, using an RF transmitter, the duplexer 408 and the antenna 406. The duplexer 408 operates as a switch allowing alternate connections to the antenna 406 by the receiving circuitry 404 and the transmitting circuitry 402. On the receiving side, incoming signals are received, filtered and then processed by the receiver circuitry. The receiver circuitry in conjunction with the processor 410 then may cause information in the form of signals or data to be sent to the audio generator 428, the display 414, or other components of the wireless environment 400.

It should be noted that the RF carrier with modulation that is transmitted back and forth in wireless environment 400, also can be modulated with speech data or other control signals.

The network architecture discussed above provides the infrastructure for the systems and methods of the present invention, as well as, other systems and applications of the enterprise business. Within an enterprise, these systems and applications can be represented by a structured framework of layered services, as illustrated in FIG. 5.

Figure 5:
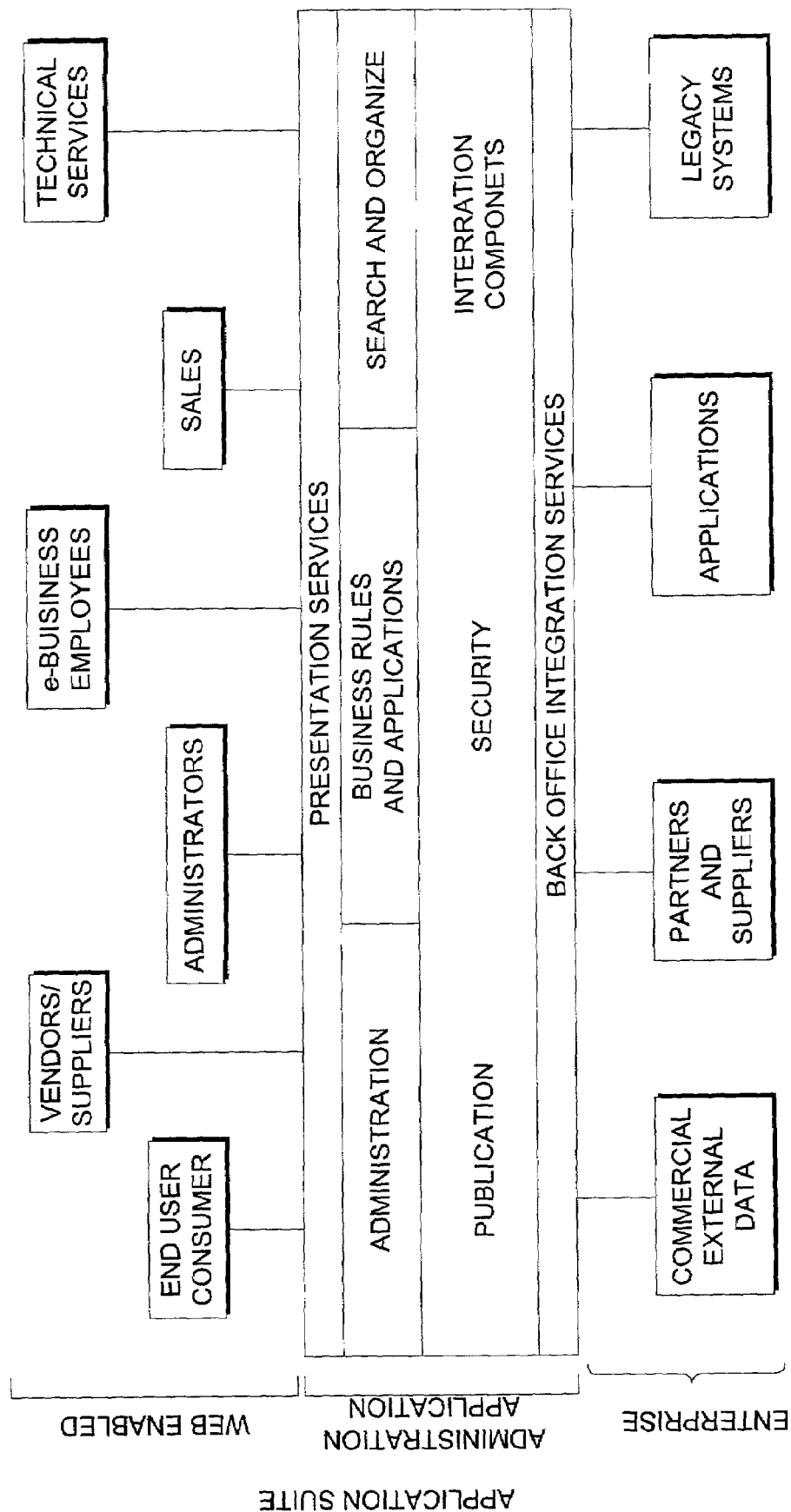
FIG. 5 is a block diagram illustrating a framework with layers of components that can be found in the present invention.

As shown in FIG. 5, a scalable infrastructure with a framework for incorporating layered components, which includes those offered by the present invention, forms the basis of the business enterprise. A typical business enterprise contains many data components and systems that are needed to support its operations. These systems provide commercial/external data interface, business partners/suppliers interaction, and include business applications and Legacy systems, which are collectively referred to as enterprise resources. These enterprise resources are essentially managed through ERP systems. ERP is an integrated transaction-processing system that handles businesses' internal information. The great benefit of ERP is integration. The addition of a new sales order to the system, causes everything related to the order to also change, including sales commissions, inventory requirements, manufacturing schedules and the balance sheet. With ERP-enabled integration, all facets of the company and personnel, can use the same information and business processes to obtain a variety of information. This results in efficiency and consistency throughout the organization.

The present invention provides the tools and methods to integrate and present ERP information to a varied audience. The audience of enterprise resources includes end user/consumers, vendors/suppliers, administrators, e-Business employees, sales and technical personnel. Equally as diverse as the audience for the enterprise information are the systems or applications that are utilized to enable communication to the enterprise resources. The present invention provides component applications and modules that facilitate the use of web enabled front-end applications and wireless applications for the varied audiences identified above. In operation, a back office integration service layer provides an interface between the enterprise resources and all of the functions provided by the present invention, such as, publication, security, integration, administration, business rules, and searching. A layer of presentation services, also provided by the present invention enable the functions mentioned above to be utilized by front-end applications and browsers.

The present invention is a suite of applications and modules offered in a preferred embodiment as a single offering. In other words, the present invention provides a grouping of applications and modules designed to mobilize and manage an organization's entry into, or expansion within, the Internet business space. An appropriate Internet presence enables an organization to maximize the use of the Internet for B2B and B2C, as well as other business functions.

Figure 6:
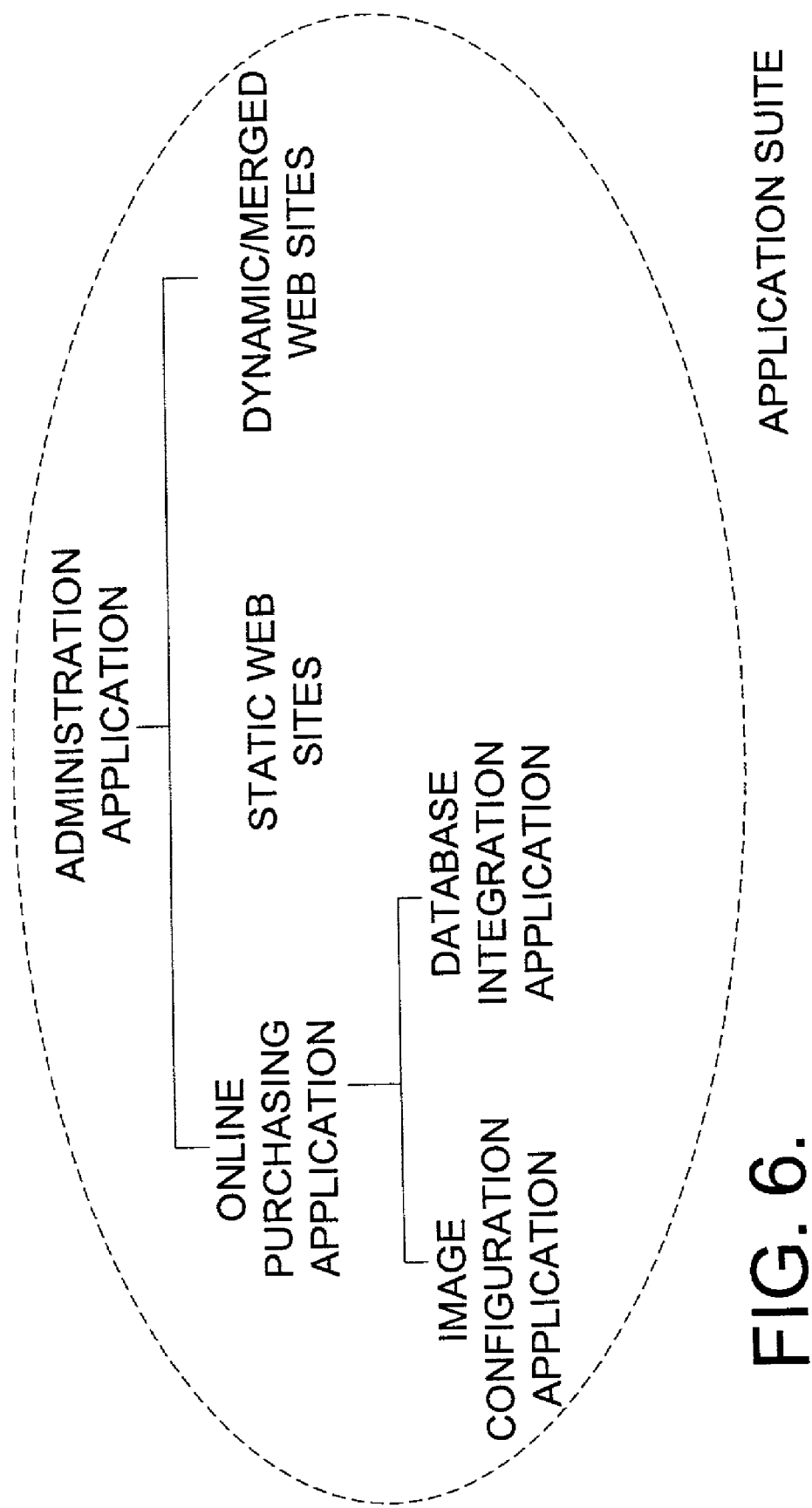
FIG. 6 is an illustration of the application level modules that comprise the suite offered by the present invention.

FIG. 6 illustrates these various applications offered by the application and module suite of the present invention along with their hierarchy and relationship to each other. The administration application is the top level application of the suite offering. When the suite of applications and modules is offered as a package product, it is contemplated that in a preferred embodiment, the administration application is a standard application offering. The administration application is a tool that essentially provides customers with the ability to manage existing Internet and intranet applications, create new versions or iterations of existing applications, and build/manage content pages. The administration application provides the entry point to the online purchasing application, static content web page functions and dynamic content module, as illustrated in FIG. 7 and as more fully described below.

Figure 7:
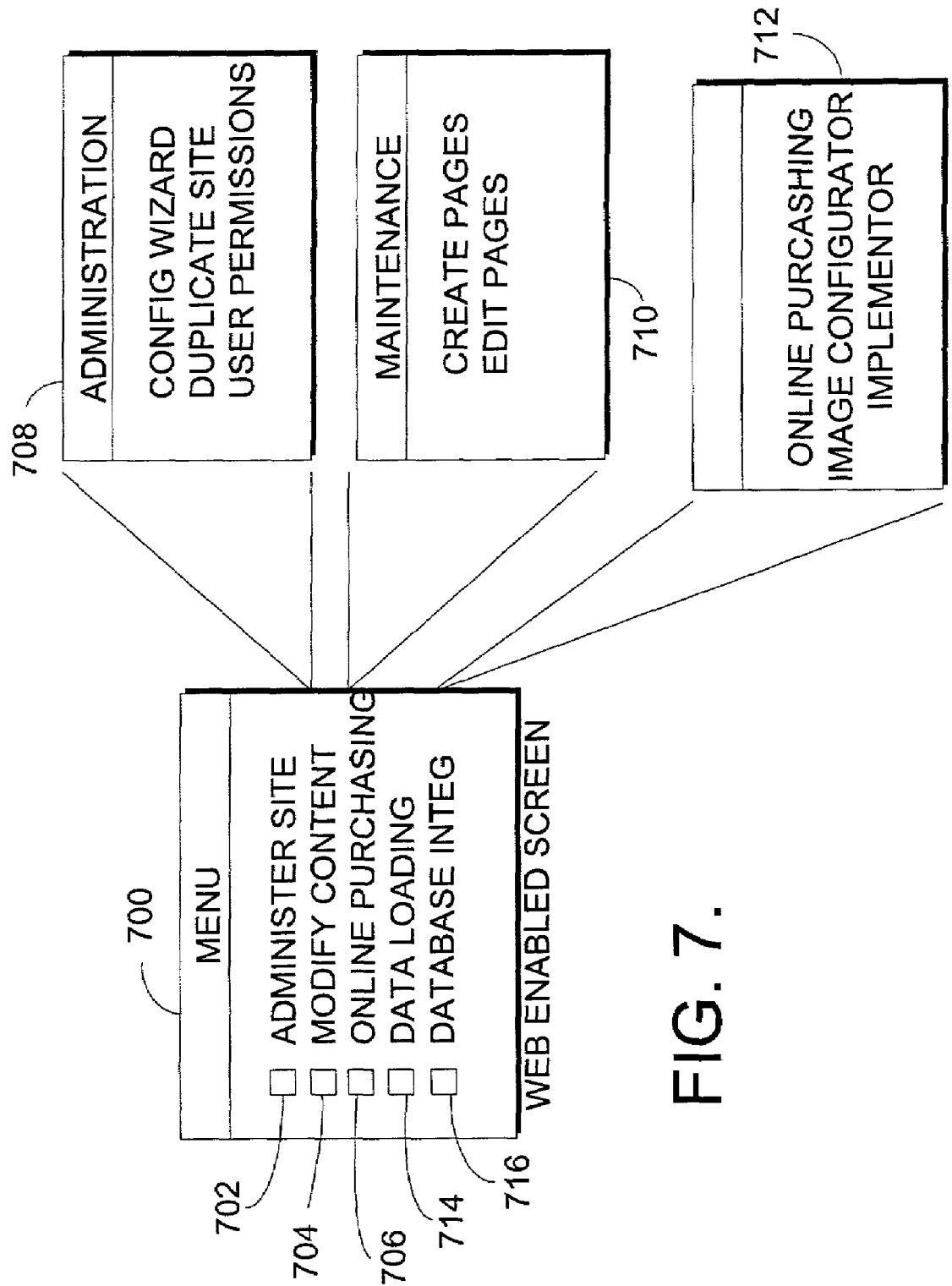
FIG. 7 is an illustration of an exemplary screen along with a number of user selectable options that can found within the present invention.

For example, with reference to FIG. 7 a web-enabled menu screen 700, which contains selectable options 702, 704, 706 that can be found in the administration application is illustrated. Selecting option Administer Site 702 opens an administration menu screen 708, from which the user could perform various functions such as configuring a wizard, duplicating a site or specifying user permissions. Selecting option Modify Content 704 opens a maintenance menu screen 710, from which a user may create new pages/screens, or edit existing pages/screens. Selecting the Online Purchasing application 706 launches the user into the application and screen 712 associated with the online purchasing application. In addition to the functions related to the online purchasing application that a user can select, the menu screen 700 also allows access to other applications and modules that are constituents of administration application, namely the data loading module 714 and the database integration module 716, both of which are more fully described below.

A second application offered by the suite offering is the online purchasing application. Like the administration application, it is contemplated that the online purchasing application be offered as a standard application in the preferred embodiment of the suite offering. The online purchasing application provides a commercial e-Store, with a variety of features and modules and is comparable to an online mall in that it is able simultaneously to handle multiple vendors. The online purchasing application of the present invention provides product related functions such as, support for products from multiple manufacturers, date-time sensitive product pricing, date-time sensitive product listings, pseudo-deletion of products (i.e., expiration) and a system for discounting products. Date-time sensitive product pricing permits the owner of the online purchasing application to set an item's price at different values depending on current date and time. For example, an item could be listed at a 'sale price' on a certain date and for a given duration. Date-time sensitive product listings permit the owner of the online purchasing application to automatically add or remove particular products based on date and time. For example, products related to Christmas will only be listed and displayed in the online purchasing application during the appropriate time of the year. Pseudo-deletion of products, essentially marks items as deleted so that they are no longer displayed, rather than completely removing such product or item from the system when a store owner elects the delete option. This enables the 'addition' of the product at a later time without significant effort and also enables the system to maintain information in relational tables that are linked to those 'deleted' items. The discount system of online purchasing application permits an e-Store to participate in, or initiate, product promotional activities, by enabling support for coupons, sales, multi-purchase discounts and other such features.

Figure 8:
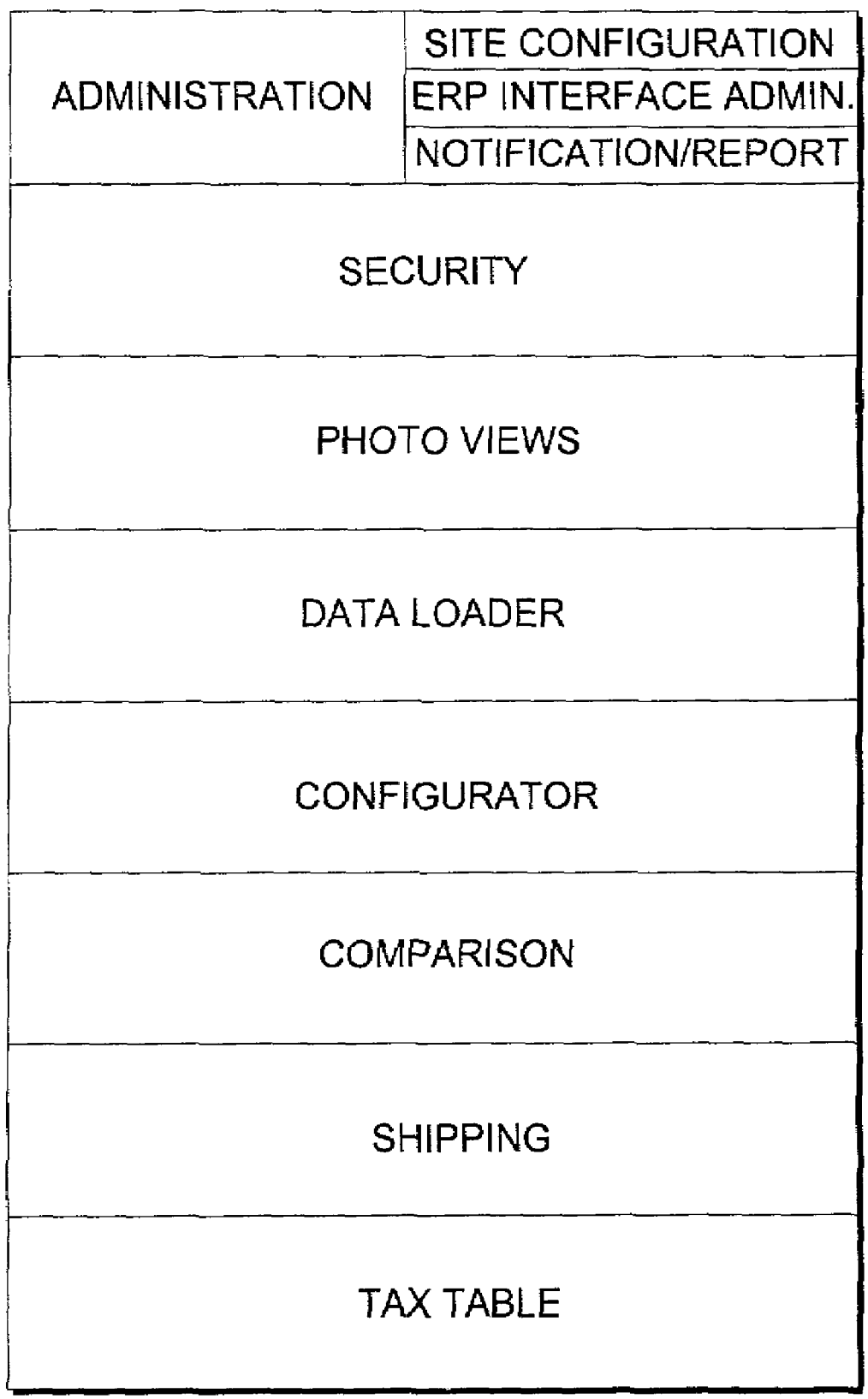
FIG. 8 is a block diagram illustrating components of the online purchasing application of the present invention.

The online purchasing application of the present invention also includes modules that facilitate and enhance user experience, configuration and efficiency of the e-Store itself. By way of example only, and not limitation, such modules include a category administration module, an image configuration module, a comparison module, a shipping module, a tax computation module, a data loading module, a security module, a categorizing and referencing module, an implementor module and a location sensitive pricing module. The relationship among these modules is illustrated in FIG. 8 and each is discussed in more detail below.

The category administration module may be most simply described as the categorization of items in a hierarchical format, wherein the relative position or category of an item can be determined by inspecting a corresponding item identifier field. Thus, a certain ease is provided in editing an e-Store site and its offerings. The category administration module is discussed in still further detail below.

The image configuration module is a feature that enables virtually an unlimited number of images to be associated with a single item, thus allowing images of various components, in their different permutations, to be associated with an item, such as a product. For example, all of the different combinations of styles, colors, materials and the like for a bicycle seat, handle bars, tires, pedals, etc., may be associated with a single bicycle model product. The image configuration module is discussed in still further detail below.

The comparison module is a feature that enables comparison of items from dissimilar groupings. For example, if one wanted to compare the shade of yellow in a flower to the shade of yellow offered in automobiles during a single purchasing session, the comparison feature will facilitate such an endeavor. The comparison module is discussed in still further detail below.

The shipping module is a feature that can be found in a variety of purchasing paradigms. However, this feature of the online purchasing application of the present invention differs from prior systems in that it allows individual items within a single online purchase of multiple items to be shipped to different locations.

The tax computation module of the present invention computes taxes in the online purchasing environment dynamically on the basis of the physical locations of a store owner and a product ship-to address. The tax computation module of the present invention is discussed in still further detail below.

The data loading module of the present invention provides a convenient mechanism for populating data stores of an e-Store, while also providing security and data validation. The data loading module is discussed in still further detail below.

The security module in the online purchasing application of the present invention is implemented at a level that correlates to the function being performed within the system, such as a record insert, edit or delete. In other words, security is implemented at the trigger level rather than table level. Furthermore, screen shots and views in the online purchasing application of the present invention vary by security access levels because security is also implemented at a client/server session level.

The categorizing and referencing module of the present invention allows persons, companies and the like to be treated as a single entity within the online purchasing application. The categorizing and referencing module is discussed in still further detail below.

The implementor module of the present invention allows relationships between tables to be defined by creating other tables that contain at least one field from each of the tables that are to be related. The implementor module is discussed in still further detail below.

Finally, the location sensitive pricing module of the present invention allows the system to utilize the geographic location of a potential buyer to dynamically determine the price of an item. For example, a Canadian customer may have the price of an item reflected in the Canadian dollars equivalent of the United States dollars.

Figure 9:
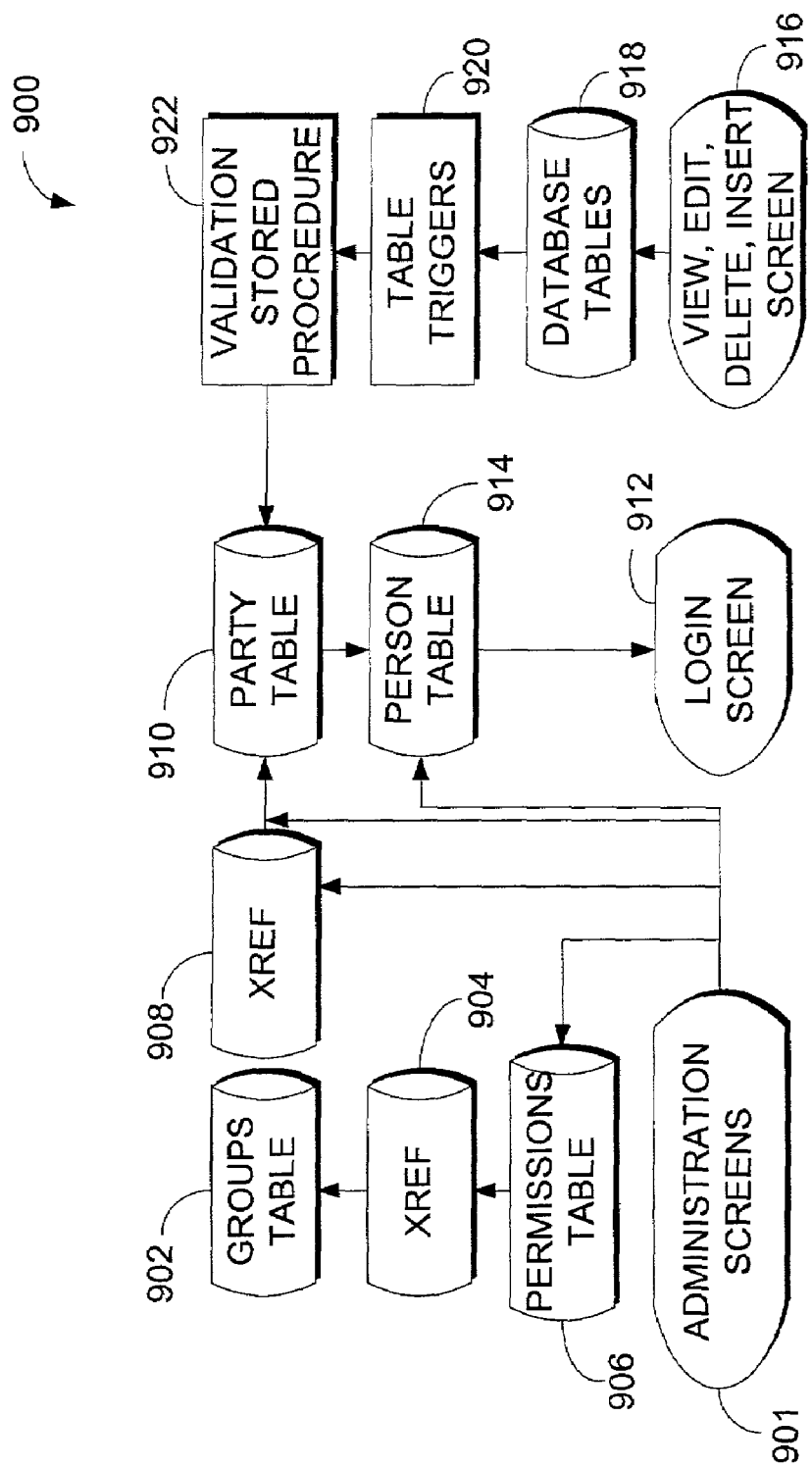
FIG. 9 is an exemplary security module and the associated data tables suitable for use in an embodiment of the present invention.

Several of the modules implemented within the suite offering of the present invention are database driven. In other words, the behavior of the screens and the administration of the module are all defined and dynamically determined by entries into one or more database tables. For example, the security module, illustrated in FIG. 9 is defined by a series of tables and cross reference tables. The process of administering security which is performed by using the administration screens 900, requires entry of information into a groups table 902, which is has a cross reference table 904 that links groups to a table of permissions 906. Also from the administration screen 901, a cross reference table 908 is populated to provide the inter-relationship to a party table 910, as more fully described below. Finally, the administration screen 901 allows the population of a person table thus identifying the permitted users of the system. When an end user logs in to the system via a login screen 912, the person table 914 and the party table 910, in cross reference to the groups table 902 and permission table 906, are used to determine the permission rights of that individual. The permission rights correspond to functions that are available through the application screens 916 such as view, edit, delete, or insert records. As indicated, the permission rights for all of the functions against the database tables 918 are verified against the party table 910 and its associated tables for table triggers, at step 920, and for validation stored procedures, at step 922.

Figure 10:
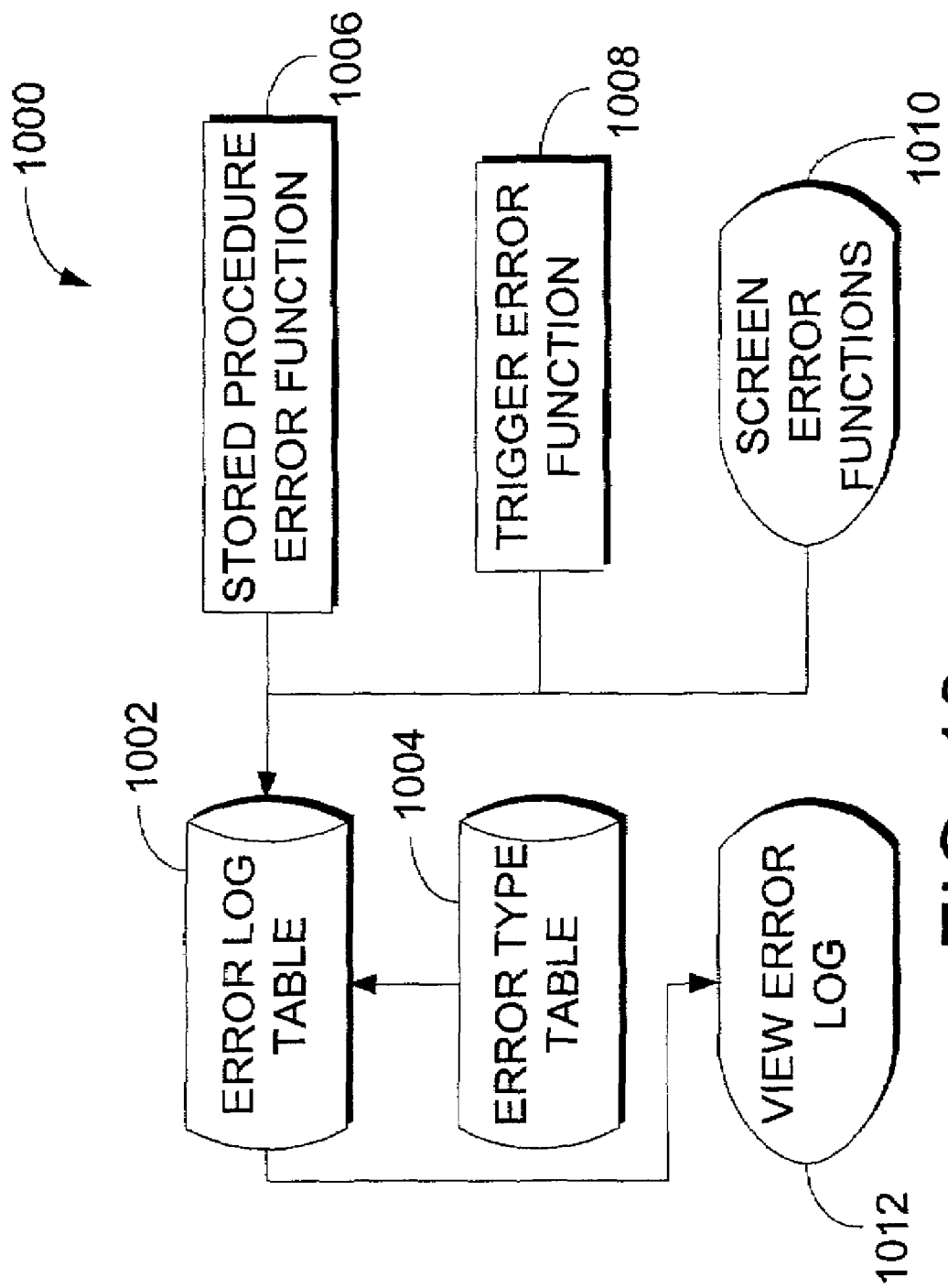
FIG. 10 is an exemplary error-handling module and the associated data tables suitable for use in an embodiment of the present invention.

An error-handling module also is implemented within a preferred embodiment of the present invention. A flow diagram of the error-handling module is illustrated in FIG. 10. The module consists of two tables, namely an error log table 1002 and an error log type table 1004. The error log table 1002 keeps a time-stamped record of each error that occurs within the suite of applications and modules, along with an indication of the type of record as defined within the error type table 1004. In a preferred embodiment of the present invention, there are three types of errors that are recorded by a variety of functions, including the stored procedure error function 1006, trigger error function 1008 and screen error function 1010. All of the recorded errors can be accessed by the view error log routine 1012.

Figure 11:
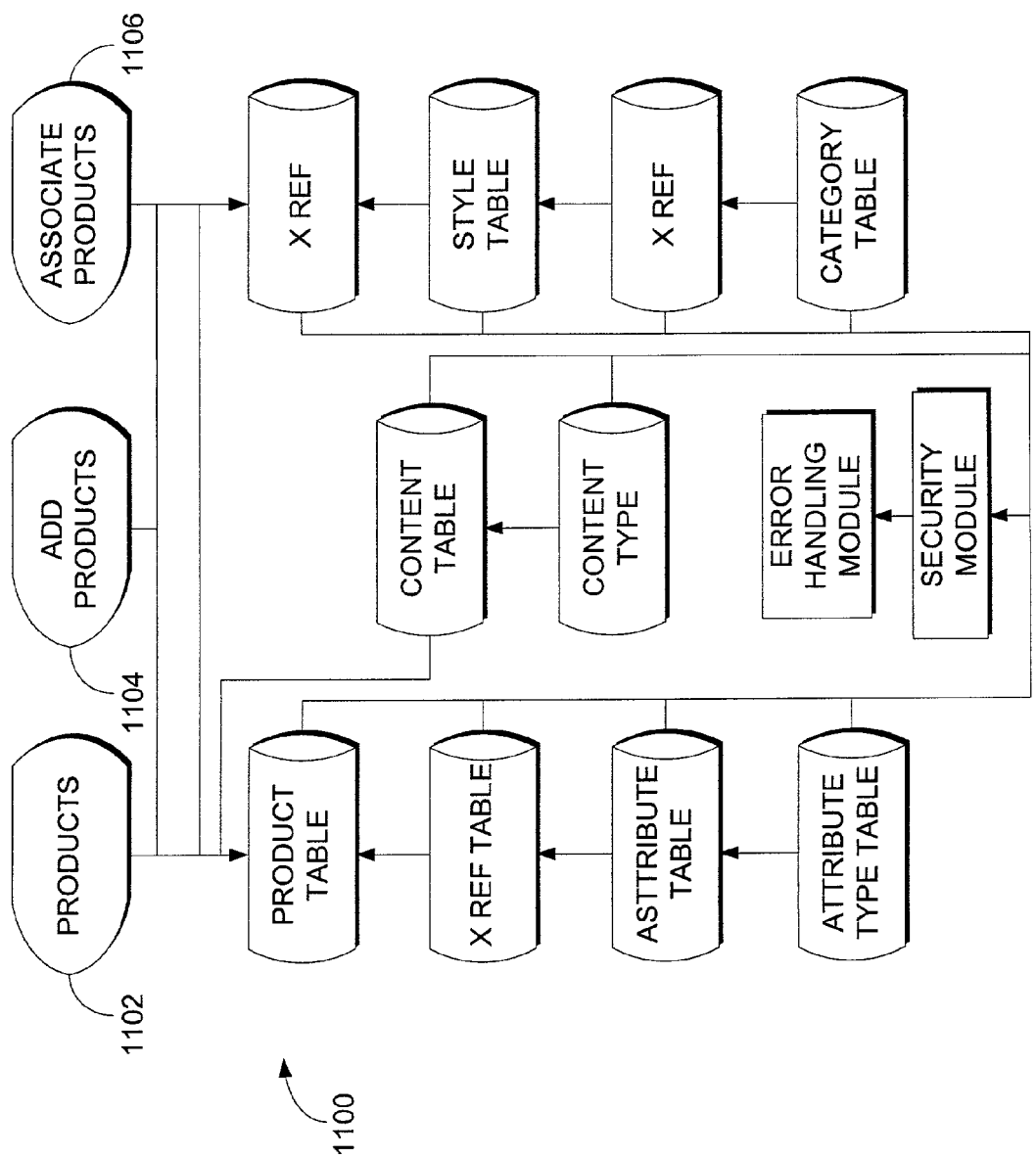
FIG. 11 is an exemplary product administration module and the associated data tables suitable for use in an embodiment of the present invention.

A product administration module of the present invention is illustrated in FIG. 11. Product administration provides a user with options that allow the user to view products 1102, add products 1104 and associate products 1104. The Add Products 1104 option allows a user to populate a variety of product tables and cross reference tables that will be utilized by other applications and modules of the present invention. The Associate Products 1106 option, permits products that have varying styles to be grouped and appropriately categorized to facilitate matching and verification of user product selections. The View Products 1102 option provides the user with the ability to review products by category and style in addition to the various attributes of each product. Associated with the product administration module 1100 are an error handling module 1000 and a security module 900, as previously discussed.

Figure 12:
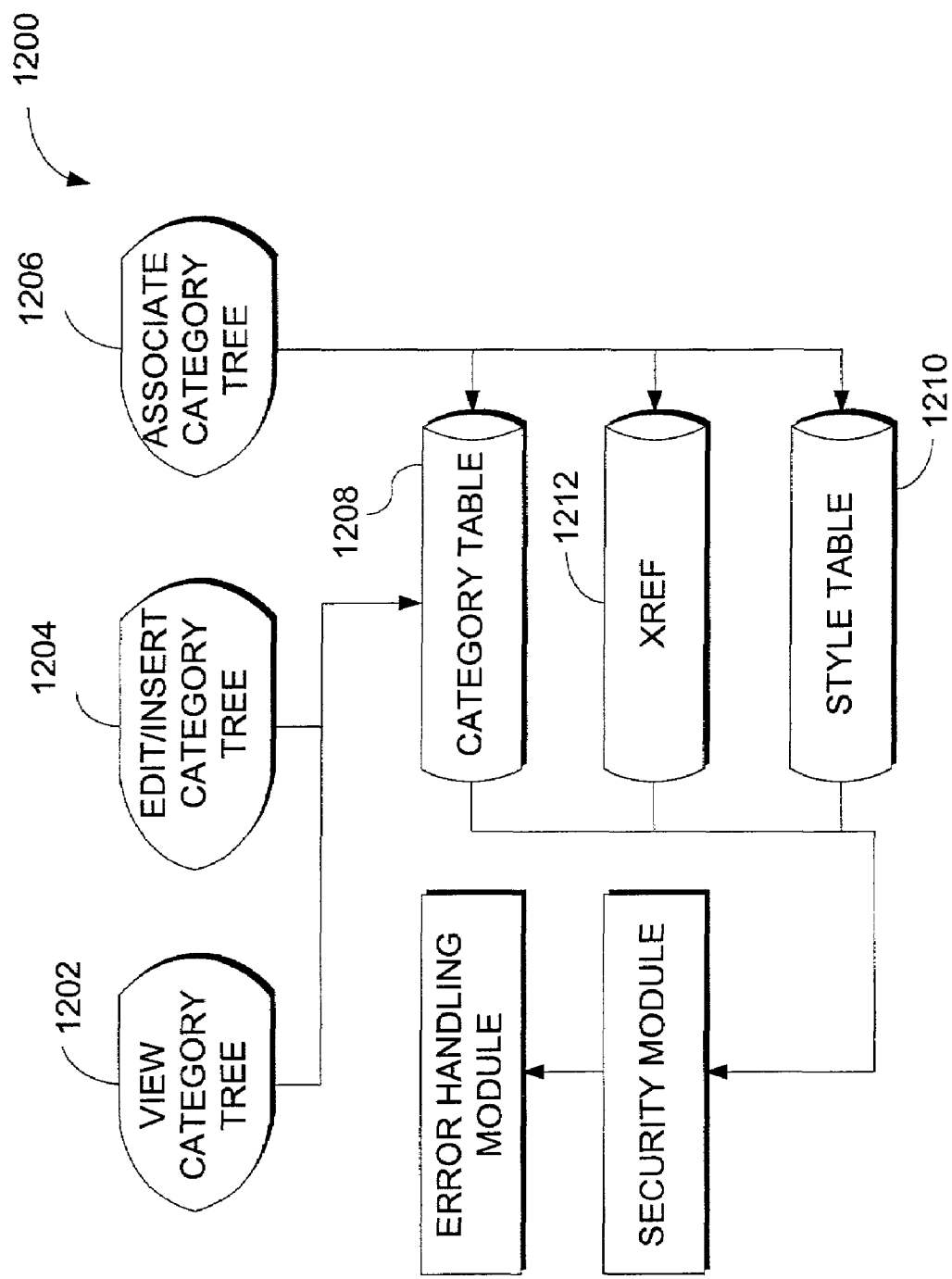
FIG. 12 is an exemplary category administration module and the associated data tables suitable for use in an embodiment of the present invention.

The category administration module 1200 is illustrated in FIG. 12 and it allows a user to view category tree 1202, edit/insert category tree 1204 and associate category tree 1206. As discussed with reference to the product administration module 1100, products may be categorized by style. The category administration module 1200 provides a means to define categories within a category table 1208, and ultimately cross reference those categories to styles that are entered in a style table 1210, utilizing a cross reference table 1212.

Figure 13:
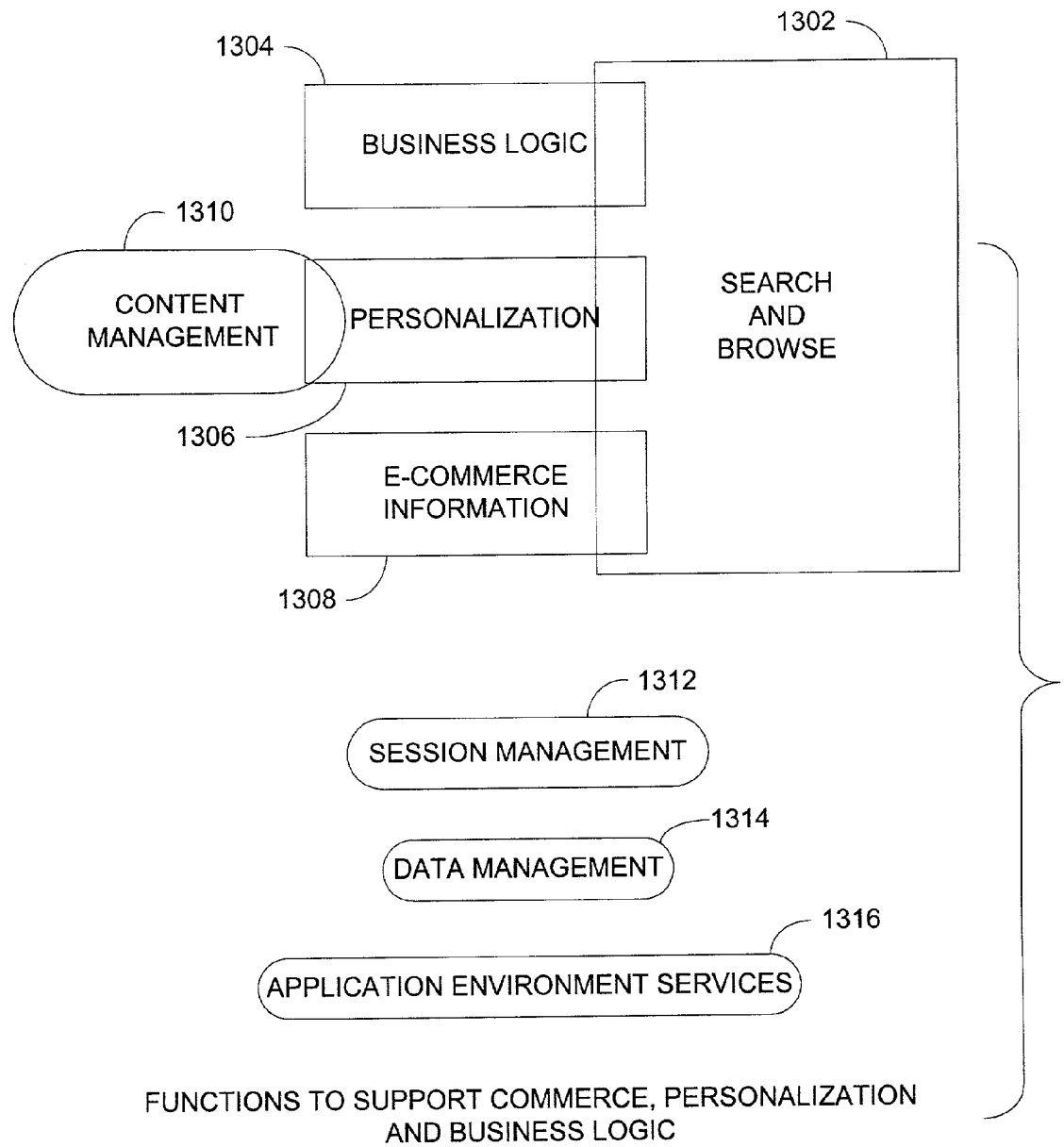
FIG. 13 is an illustration of exemplary functions that can be found in an e-Commerce solution package containing a suite of applications and modules as in a preferred embodiment of the present invention.

As previously recited, the present invention is directed to a suite of applications and modules for supporting commerce, personalization and business logic. The objectives of the present invention are accomplished, in large part, through an interaction of various service components as illustrated in FIG. 13. While some service components are normally viewed as independent, the present invention bridges some of these business islands to enable collaborative operations such as search and browse 1302. Search and browse 1302, is a functionality that is applicable to business logic 1304, personalization 1306, and e-Commerce information 1308. As such, the present invention provides a means to extend the realm of search and browse functionality into other aspects of a commercial web site. Personalization 1306, refers to the customization of services, which includes user preferences or other non-generic functions provided within the present invention, and involves reorganization or change to the content of the web-site application environment. In other words, as illustrated, there is an interaction between personalization 1306 and content management 1310. This means that a user or organization can modify the content of a site to suit their personal taste. Some other services and features can be viewed as standalone system services that neither have, nor require, a lot of extraneous functions to support commerce, personalization or business logic. These include session management 1312, a connection related service, data management 1314, and application environment services 1316. Those skilled in the art, will recognize that the breadth and sophistication of these service elements can vary widely and the presence or interaction of these services also may vary.

Figure 14:
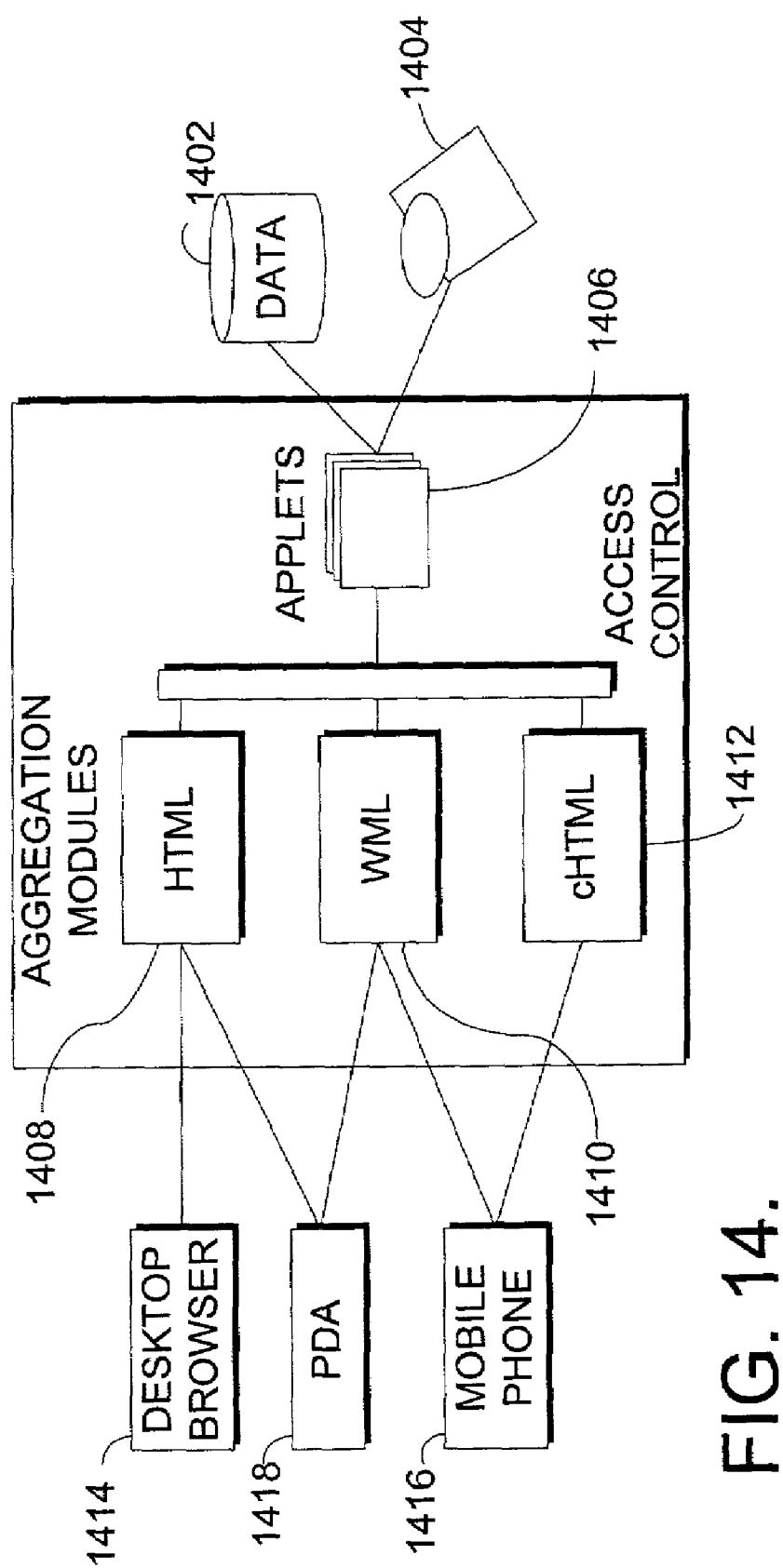
FIG. 14 is an illustrative block diagram of a variety of devices and their associated modules, interacting with data and applications according to the present invention.

Having discussed the architecture and operating environment, and having identified the modules and applications available in the suite of the present invention, we now turn to issues of accessibility to the various features of the present invention. Reference is now made to FIG. 14. As previously discussed, facilitating access to data 1402 and other content applications 1404 can be viewed as the end result of the present invention. In order to achieve this result, various methods or access controls are implemented by the present invention. By way of example, and not limitation, such access control includes applets 1406 or other such programs that can be readily interfaced by aggregation modules such as Hyper Text Markup Language (HTML) 1408, Wireless Markup Language WML 1410 and Compact HTML (cHTML) 1412. The HTML component essentially produces pages for personal computers and other devices that support an HTML browser 1414. The WML component produces WML content for Wireless Application Protocol (WAP) devices such as, mobile phones 1416 and PDAs 1418. Other aggregation modules such as, cHTML can also be produced for mobile devices, or can be produced for voice activated devices.

Many of the various applications and modules of the present invention will be discussed in further detail below.

System and Method for Administering Development and Maintenance of Multiple Web Sites The administration application of the present invention is directed to a system and method for administering the development and maintenance of commercial web sites through a combination of application modules. The particular embodiments described herein are intended in all respects to be illustrative rather than restrictive. Alternative embodiments will become apparent to those skilled in the art to which the present invention pertains without departing from its scope.

As previously discussed, a significant amount of administration is required for the operation and implementation of a commercial, multiple vendor web site offering. The characteristics and dynamics of each web site are particularly determined by the configuration of parameters and data that are contained within the tables of one or more database servers. The configuration of these parameters and data generally is accomplished through a series of administrative functions performed by one or more "site administrators." The present invention provides administrative functionality directed to non-technical users, through user-friendly menus containing a variety of options and selections. The viewable menus themselves dynamically are determined based upon application level entries in data tables.

In a first preferred embodiment, a non-technical user is able to perform site administration through a web-based front end tool. The tool allows a user to utilize a browser, wherein menu options and prompts are presented to the user to perform a variety of functions. The user can access these administrative functions for the entire web site from a single entry point URL, or "Administrative URL." The page content and menu options that are seen by the administrative user dynamically are determined and displayed based upon the previously mentioned entries in a database which describes the particular web site of the user. From this and other similar pages, the administrative user can dynamically modify his/her web site along with the content of the site pages.

The administration application of the present invention further provides site branding and allows links to other sites to be defined. Site branding is the ability to specify content for a portion of every page that is developed or configured using the administrative tool. For example, the top left square inch of every page may display a particular logo if desired.

In operation, administrative functions for determining or modifying the content of a web site are presented to an administrative user in the form of pick lists. For example, a user may select section and sub-section items to be placed on a web site page by checking appropriate boxes from a list of choices. The user also has the option to copy the content and HTML pages of an existing site to another site, thus creating a duplicate site in a matter of minutes.

Also included in the available administration application is the ability to associate the content of a site with particular date periods. For example, a user may specify a start and end date for a period during which particular page content would be displayed to visitors to the web site.

In a second preferred embodiment, certain features of the administration application are modified and/or added to the embodiment previously discussed. For instance, a non-technical user is able to access site administrative functions from any page within their web site. In other words, a user with appropriate security access can access a "next level" from any page within the web site and be provided with the menu options to administer the site rather than having to navigate to a particular "Administrative URL." Further, in this embodiment, the administration application of the present invention enables a user to define and provide framed links to other sites. A framed link as provided by this embodiment, permits a user visiting the site to access other linked sites and subsequently return to the user's originating site upon exiting the linked sites.

Another modified feature of the second preferred embodiment is with regard to the pick lists. In particular, the pick lists in this embodiment are displayed as a hierarchical tree with multiple choices and options that enable the modification of the web site content.

Security in the second preferred embodiment is provided at the level of fields and objects on a page rather than simply at a page or site level as in the first embodiment. This means that while an administrative user may have access and rights to modify a given web page within the site, the same user may or may not have the rights to modify all fields or objects on the page.

Further, the ability to associate the content of a site with a particular date period is further enhanced within this embodiment to include the ability to specify a time period as well as the ability to specify multiple sets of duration periods. For example, an administrative user could specify that a particular portion of a page displays certain information on the first day of the month between 10:00 am and 11:00 a.m. and all day on Friday the 15th of June.

System and Method for Loading Commercial Web Sites

The data loading module of the present invention provides a system and method for loading data for commercial web sites through a combination of application modules. The particular embodiments described herein are intended in all respects to be illustrative rather than restrictive. Alternative embodiments will become apparent to those skilled in the art to which the present invention pertains without departing from its scope.

As previously discussed, the operation and implementation of a commercial, multiple vendor e-Store offering generally is table driven. This means that the characteristics and dynamics of the e-Store are determined by the particular data that is contained within the tables of one more database servers. Accordingly, the ability to provide products and information in a dynamic and timely fashion is dependent upon efficient and accurate loading and updating (i.e., population) of the database server tables.

In a preferred embodiment, the data loading module of the present invention is an enhancement to multiple vendor e-Store offerings and facilitates the direct, bulk loading of data into e-Store database servers using web technology. In this embodiment, the data loading functionality is utilized to populate tables containing consumer product information (e.g. style, category, discounts, pricing, etc.). It will be understood and appreciated by those of skill in the art that the system and method for data loading provided by the present invention may be utilized to conduct web-enabled data loading of any number of data driven applications, both within and outside of the on-line purchasing environment. Data loading for all such applications is contemplated to be within the scope hereof.

It further will be understood and appreciated that, while the preferred embodiment of the data loading module provided by the present invention includes specific data source formats, a scripting language and a database server, variations of this configuration are contemplated to be within the scope of the invention. By way of example and not limitation, the data loading module of the present invention is described with reference to consumer products offered for sale in an e-Store. Typically a consumer accessible e-Store includes information that is pertinent to a user's experience and/or to the operation of the web site, the information being stored in a variety of database tables. Generally, e-Store databases contain any number of tables including, but not limited to, tables which contain information regarding product type, style, category, discounts, content, and pricing. Likewise, each data table generally contains multiple data fields of varying data types.

In a preferred embodiment of the present invention, the data loading module of the present invention accesses and obtains information from a spreadsheet, database or comma separated values (CSV) file and subsequently loads the information into an Oracle database server. The data loading module also performs data validation, as more fully described below.

Figure 15A:
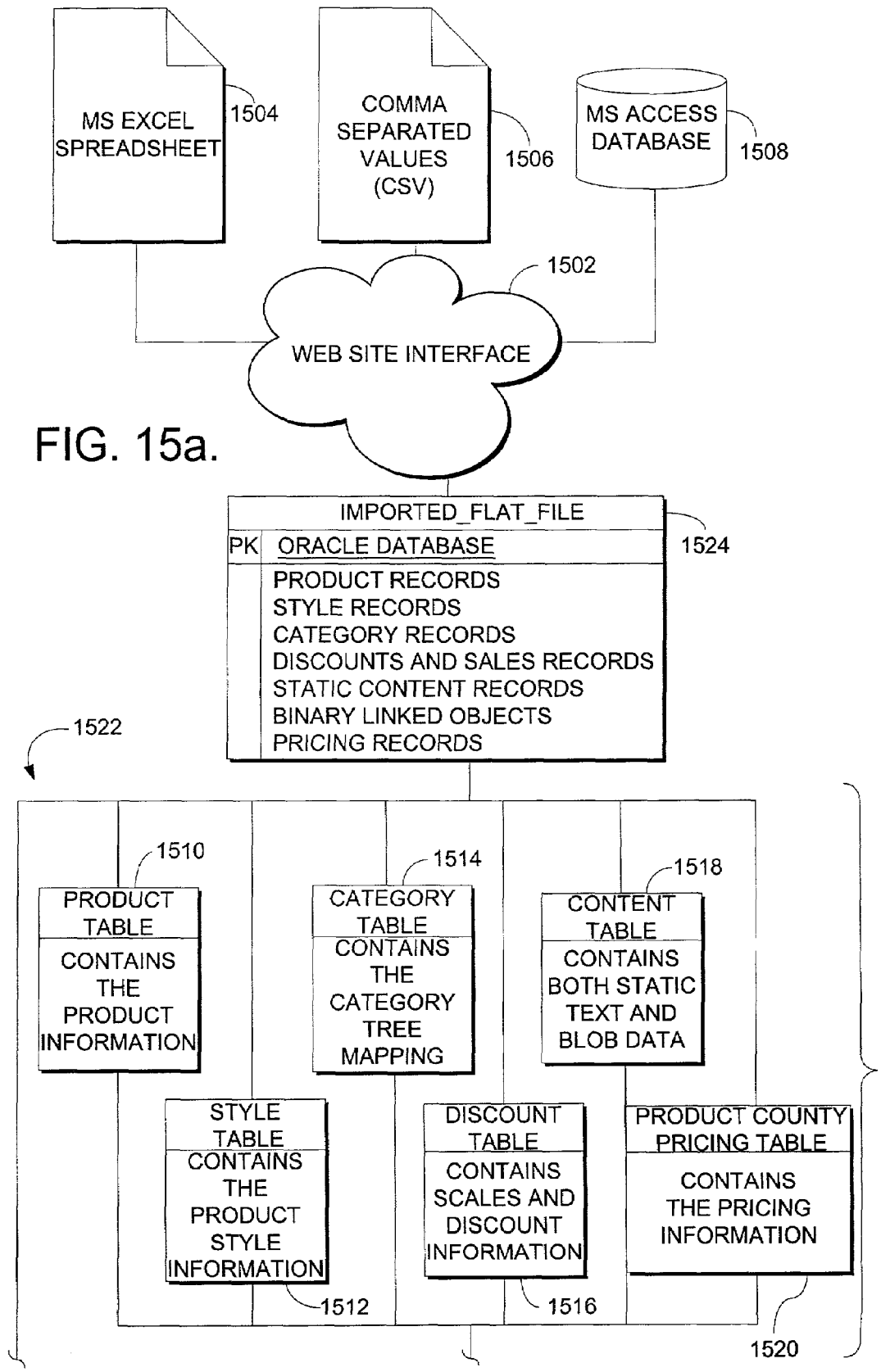
FIGS. 15a and 15b are an illustrative block diagram of tables and data sources that can be utilized in the loading of information for the present invention.
Figure 15B:
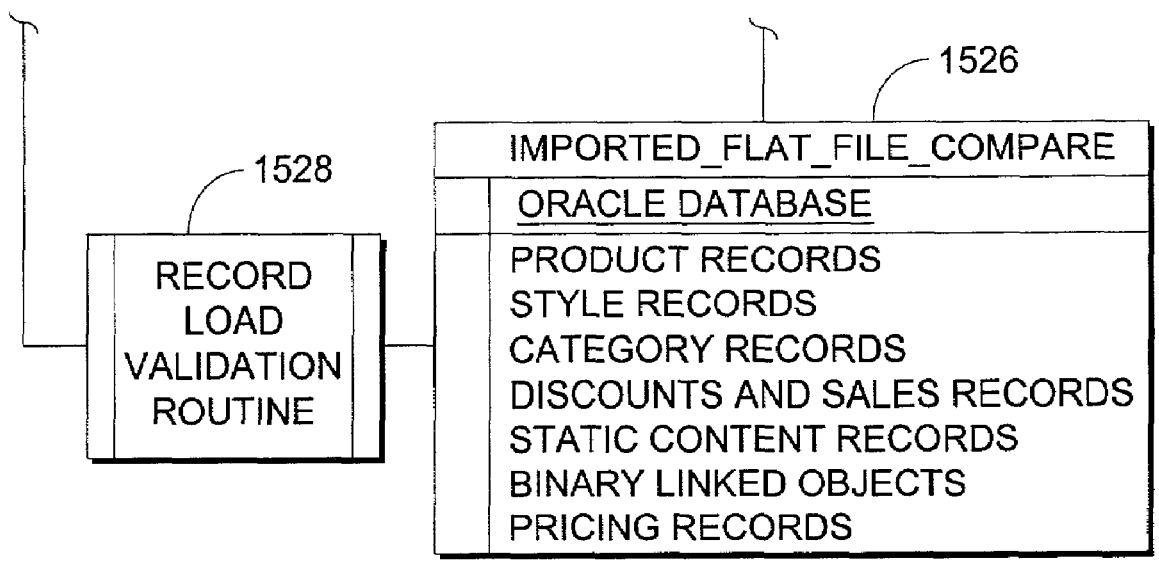
Figure 15C:
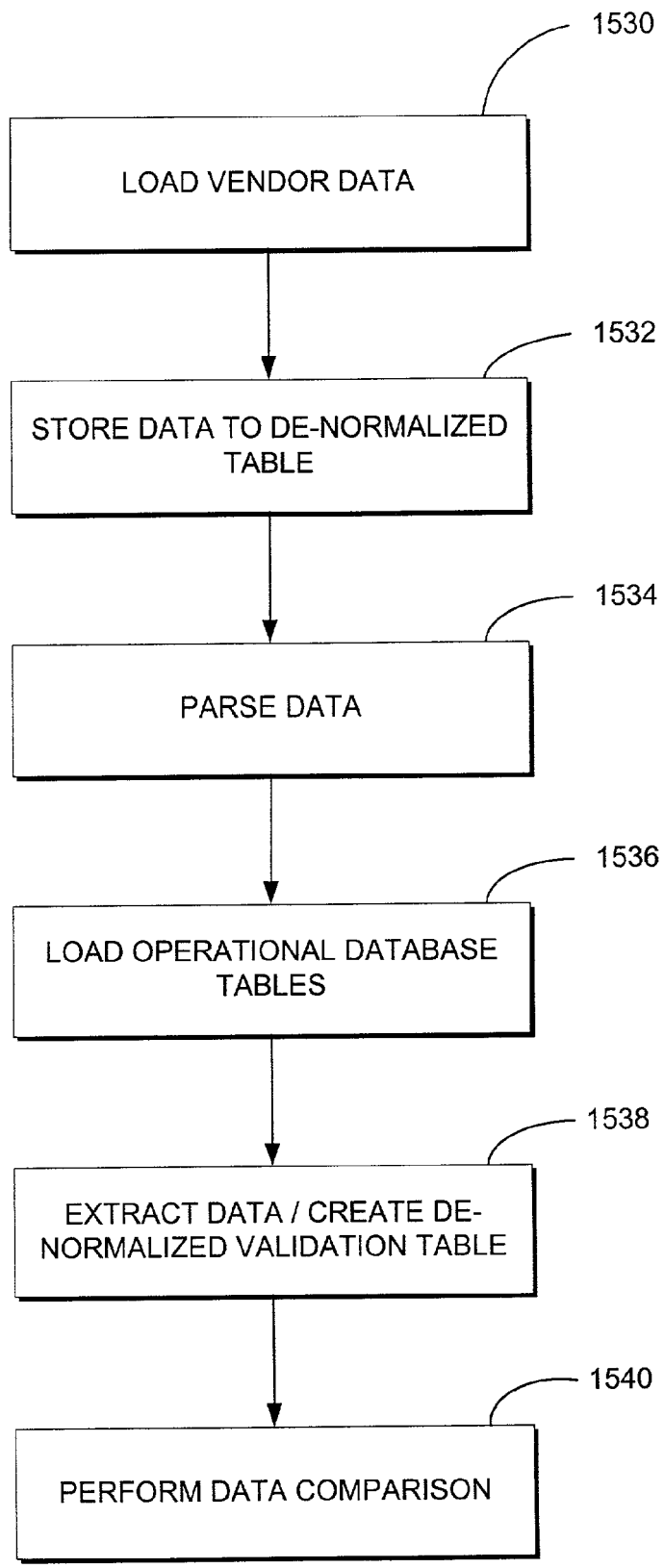
FIG. 15c is a flow diagram illustrating the loading of information according to an embodiment of the present invention.

Reference now is made to FIGS. 15a–15c, which provide an illustration of tables and data sources, as well as an environment in which the data loading module of the present invention may operate. The functions of the data loading module are performed online through a web browser and, as indicated, support multiple data formats. The data loading module resides within a web site interface 1502, and provides an interface between the miscellaneous data formats that can be found in a vendor's computing environment and an e-Store host environment. By way of example and not limitation, a vendor's environment may include spreadsheet 1504, CSV 1506 and database 1508 file formats, all of which are industry standard formats. An e-Store host environment, for purposes of this discussion, includes any database server or central data store that is accessible via a public network such as the Internet, where the relevant information for the e-Store may be found.

Within the exemplary e-Store host environment there is a product table 1510, a style table 1512, a category table 1514 and a discount and/or sales table 1516, as well as a static content and binary linked object table 1518 and a pricing table 1520. Tables 1510–1520 collectively will be referred to herein as e-Store tables 1522. The e-Store tables 1522 contain the various informational items that facilitate the operation of the e-Store and are the destination for the data obtained from a vendor. Also found within the e-Store environment are temporary tables, such as the de-normalized table 1524 and validation table 1526, which facilitate the loading and validation of data into the e-Store tables 1522. As will be understood and appreciated by those of skill in the art, the functions performed by either of the temporary tables 1524, 1526 also may be achieved through the use of flat files. An additional component of the exemplary e-Store environment is the record-validation-routine 1528 which more fully will be discussed below.

As previously noted, in the preferred embodiment of the present invention, informational items in the form of data records are read from files in the vendor environment, written to data tables in the e-Store environment and validated. While this process will be described with reference to FIG. 15c, those skilled in the art will recognize and appreciate that variations of certain features, for instance file reading, data parsing and data comparing for validation, are well known and need not be discussed at any length herein.

Referring now to FIG. 15c, the data loading module of the present invention is initiated upon accessing and obtaining raw vendor data, as illustrated at 1530. The vendor file, as previously noted, may be in any one of a variety of industry standard formats. The source of the information in the vendor file is of no consequence as long as such information is placed in an appropriate file format and is suitable for the destined fields in database e-Store tables 1522. The vendor file may contain informational items that are intended for any one or more of the e-Store tables 1522 in the e-Store host environment.

Upon obtaining vendor data 1530, at step 1532, such raw data is written into a de-normalized set of data tables, such as table 1524 of FIG. 15a. As will be understood and appreciated by those of skill in the relevant art, a certain amount of efficiency is attained by using de-normalized and non-indexed tables when loading data. Furthermore, there are a number of methods for loading database tables, none of which would particularly impact the data loading module of the present invention. As such, these methods will not be discussed at any length herein.

Subsequently, the records of the de-normalized data tables 1524 are parsed at step 1534, and loaded at step 1536 into normalized, operational e-Store tables 1522. For ease of understanding, the loading of data into operational database tables 1536 can be thought of as a derivation of the raw data received from the vendor. As such, the data contained in the operational database tables may be viewed as derived data. Numerous techniques are available in the art for moving data and all such methods are contemplated to be within the scope of the data loading module of the present invention. It also should be noted that whether records are individually parsed and written, or processed as a bulk transaction, or otherwise, is of no consequence to the present invention.

To validate the completeness and accuracy of the derived raw data, the records of the operational e-Store tables 1522 are extracted and written to a validation table 1526 at step 1538, whereupon data validation routine 1528 is commenced. Validation is performed by comparing, at step 1540, the contents of the validation table 1526 with the contents of the de-normalized table 1524. In other words, the derived raw data is cross-checked against the raw data initially obtained from the vendor for completeness and accuracy. Variations for validating data are well known to those of skill in the art and are contemplated and considered to be within the scope of the data loading methodology of the present invention.

Although many other components of the data loading module of the present invention are not discussed, those of ordinary skill in the art will appreciate that such components, and the functions that they perform, are well known. For example, the operations discussed above with reference to computing steps 1530 through 1540, may be performed using PL/SQL database scripts and stored procedures, or computer execution instructions written in a high level language such as C, Basic, or the like, or any combination thereof. Accordingly, additional details concerning the implementation need not be disclosed in connection with the data loading methodology of the present invention.

In summary, the data loading module of the present invention provides a system and method for online loading of data in a web-based computing environment. In a preferred embodiment, such data relates to informational items, such as those necessary for e-Store solutions including commercial multiple vendor web sites, back-end data integration, store-front support and product configuration. Utilizing the data loading module of the present invention, data may be loaded into an online system through a web browser from a variety of data formats. Further, the data loading methodology of the present invention provides great flexibility and accuracy to what was formerly a tedious and error-prone process. The present data loading module thus permits vendors to download data from their existing systems into one of the supported formats and subsequently go on-line to upload the data directly into the relevant production system.

Method for Integrating Databases Having Known Data Structures

The database integration application of the present invention provides a method for transferring information between various databases, each database having a known data structure and at least one of the data structures being described in Extensible Markup Language (XML). More particularly, the database integration application of the present invention provides a method for integrating on-line purchasing venues, such as electronic stores (e-Stores), with individual organization's internal management systems or Enterprise Resource Planning (ERP) systems. The particular embodiments described herein are intended in all respects to be illustrative rather than restrictive. Alternative embodiments will become apparent to those skilled in the art to which the present invention pertains without departing from its scope.

The database integration application of the present invention provides an XML-based methodology which may be used to transfer information among databases having known data structures. By way of example only, and not limitation, the particular embodiments described herein pertain to the integration of on-line purchasing venues, e.g., e-Stores, with vendor organizations' internal management systems. It will be understood and appreciated by those of skill in the art to which the present invention pertains that the database integration application described herein may have applicability outside of the exemplary on-line purchasing environment. Such variations are contemplated to be within the scope hereof.

Figure 16:
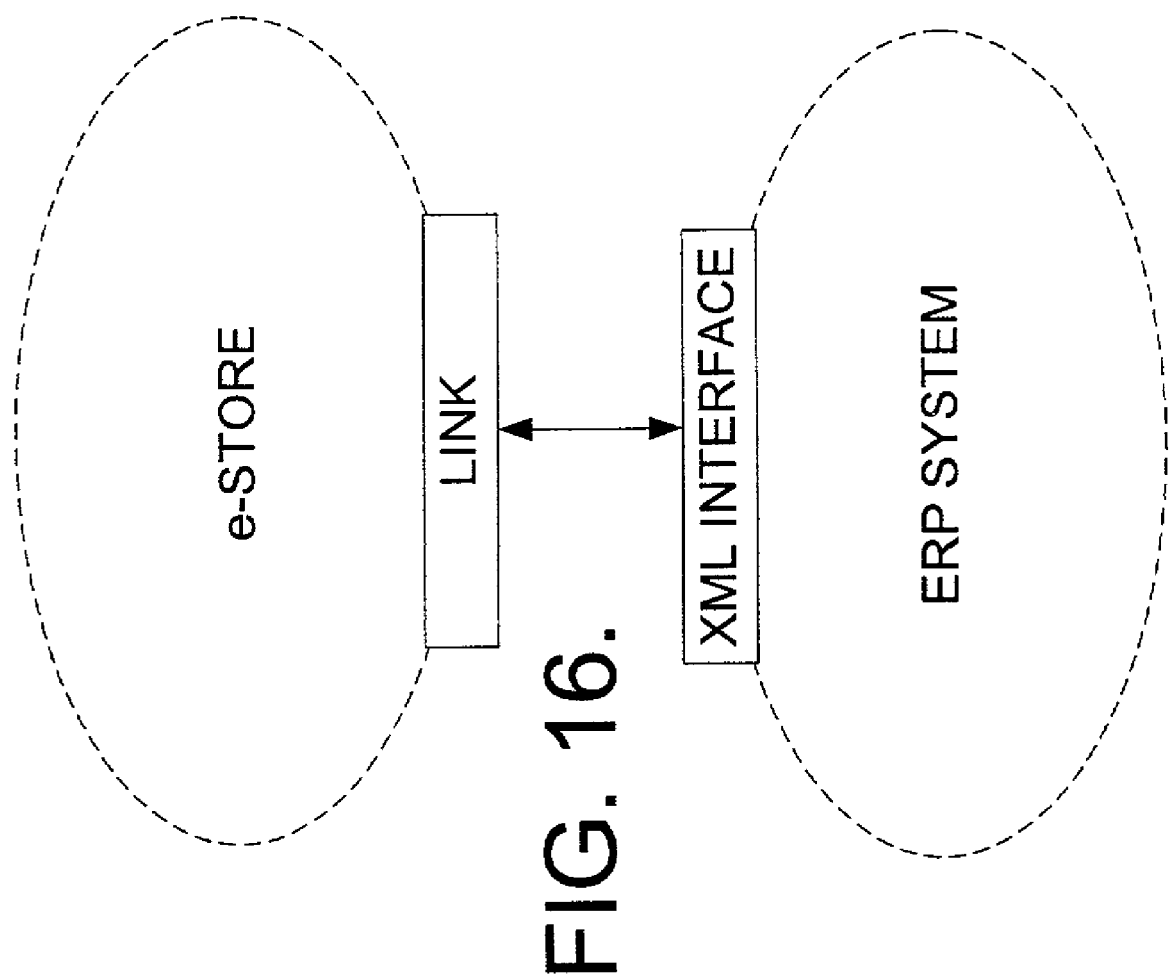
FIG. 16 is and illustrative diagram of the relationship between the online purchasing application, the database integration application and a third party internal management system, such as an Enterprise Resource Planning (ERP) system.

With reference to FIG. 16, a schematic representation of the database integration application of the present invention is illustrated. ERP systems contain multitudes of information associated with an organization's internal management. This information includes, but is not limited to, sales commissions, inventory requirements, manufacturing schedules and the organization's balance sheet. Similarly, e-Store databases contain a large volume of information including, but not limited to, available products and their associated pricing and inventory information. Because the information contained in each of the two databases generally is monitored and maintained by two or more separate organizations, a change in information contained in one database is not reflected in the other database, at least not without manual effort on the part of both maintenance organizations. The database integration application of the present invention strives to address this problem by providing a standardized XML-based interface or information transport which extracts information from both databases, identifies the information, parses the information into appropriate tables or the like and transports only that information which is desired to be shared to the other database. Thus, resource duplication in the form of manually tracking changes in the databases is reduced if not eliminated.

There are multiple ERP systems available on the market today, each of which comes equipped with an interface for communicating with other parties. These interfaces, however, differ dramatically among various ERP systems. Each database interface provides a data structure to facilitate communication and such data structures may be described in any number of different computer languages. In the preferred embodiment, the present invention specifically may be utilized with those ERP interfaces having data structures which are described in XML. Further, it is preferred that the e-Store database with which the ERP system is in communication itself includes an interface data structure which is capable of reading XML. It will be understood and appreciated that if the e-Store database with which the ERP system is in communication itself includes an XML interface, the method of the present invention still may be utilized provided the ERP interface is of a known data structure and is capable of reading XML. Such variations are contemplated to be within the scope hereof.

ERP systems which contain XML interfaces include, but are not limited to, systems manufactured by SAP, People Soft and J. D. Edwards. It is important to note, however, that while offered in the same computer language, these XML interfaces still vary significantly among ERP systems. Thus, for the database integration application of the present invention, the data structure of each must be known.

If a product vendor and/or manufacturing organization desires to sell its products via an e-Store, it is necessary for the e-Store database to maintain all relevant product information contained in the ERP system, including any changes thereto. However, resource duplication in the form of separately inputting the same information into the two separate databases is clearly undesirable. Thus, the database integration application of the present invention provides a link, represented in FIG. 16 by the term E/LINK, to enable specified information to be shared between the e-Store database and the ERP system's XML interface.

The linking method provided by the database integration application of the present invention may be described as being in the form of an interface or information transport which cooperates with and accesses information from the e-Store database. The method of the present invention provides a standardized XML interface or transport. This database integration permits the transport of order, product, product pricing, order status, shipping information, and the like between the ERP system and the e-Store database. Thus, the database integration application of the present invention provides a standardized back-end integration of databases having known interface data structures.

While capable of being utilized as above-described with a single vendor ERP system communicating with an e-Store database, the method of the present invention will prove most beneficial when the e-Store database is adapted to communicate with several ERP systems simultaneously. This is because the XML-based interface or transport of the present invention is standardized and thus capable of being utilized with a variety of interface data structures at one time. Accordingly, the need to provide a customized software solution for each vendor internal management system to communicate with the e-Store database is eliminated.

Figure 17:
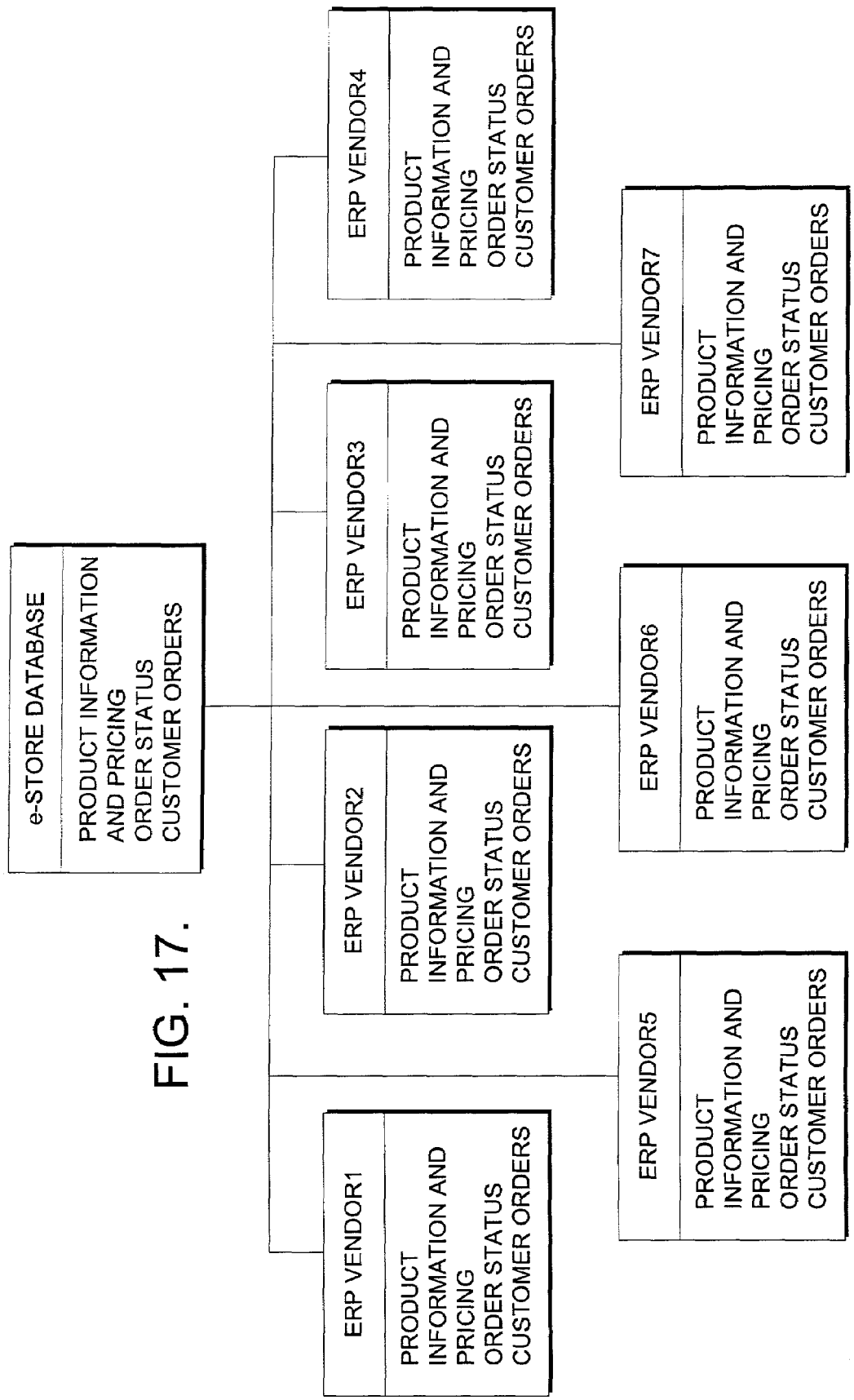
FIG. 17 is an illustration of an exemplary database schema used in integrating the online purchasing application of the present invention with an exemplary ERP system.

As previously noted, in a preferred embodiment, the ERP interface is provided in XML. This embodiment offers the benefit of the e-Store being able to be integrated with several ERP systems rather than just a single system, so long as each ERP system contains an XML interface. This makes it easier for an e-Store which services multiple product vendors and/or manufacturers to communicate with each of the vendors' systems and largely eliminates resource duplication. This single e-Store, multiple vendor embodiment is illustrated schematically in FIG. 17.

Knowledge of the data structures associated with the ERP interfaces, as well as the data structure for the e-Store from which their associated products or services are sold, permits the development of a complete set of interfaces which provide transport of product and order status information into the e-Store from the ERP systems, and transport of order information into the ERP system from the associated e-Store. These interfaces may be selected during the setup of the database integration functionality of the present invention, and subsequently run automatically in the background to keep both systems in synch. This is possible only when the format of the data on both ends of this transaction sequence is known. This is primarily because the databases must be able to recognize the format of the provided information so that it may be parsed into the appropriate locations (e.g., data tables) within the receiving database.

As previously stated, ERP systems contain multitudes of information associated with an organization's internal management. It is not necessary for all of this information to be accessible by the e-Store database. Further, e-Stores contain a large volume of information which does not necessarily need to be accessed by a particular product vendor/manufacturer's ERP system. Accordingly, the database integration application of the present invention permits the database which is donating information to make available only a subset of that information. Further, the database which is accepting information may further filter the information made available, accepting only that which is necessary for its intended purposes. Thus, only that information which is necessary to populate the e-Store database is extracted from the XML interface and only that information which is necessary to update the ERP system is extracted from the e-Store database.

Exchange of information via the database integration application of the present invention is bi-directional. In other words, product data transfers from the ERP system to the e-Store database and information on inventory changes (e.g., how many products sold and to whom) transfers from the e-Store to the ERP system. The method is flexible and dynamic and provides a standardized solution to a long-felt need in the on-line purchasing and distributing industries.

In another embodiment of the database integration application, the ERP system or the e-Store database may not be capable of handling or reading XML directly. In such instances, it may be possible to utilize an application written in an object oriented programming language which is platform neutral. Such a language is compiled into bytecode, which is not refined to the point of relying on platform specific instructions and runs on a computer in a special software environment known as a virtual machine. An example of such an application would be an application written in JAVA which was developed by Sun Microsystems. In particular, if either the e-Store or the ERP system is not capable of dealing with XML directly, a JAVA application can be utilized to act as an intermediary to communicate between the ERP system and the e-Store database. For instance, if an ERP system has an XML interface, and the e-Store system is not capable of reading XML directly, a JAVA application can be utilized to communicate the XML to the e-Store.

In communication between an e-Store database and an ERP system, the XML transferred back and forth between the e-Store and the ERP system can be put into queues. More specifically, such queues guarantee the delivery of messages between the systems. For example, if an ERP system needs to send an update to the e-Store, the ERP system would send a message potentially to a JAVA application. Thereafter, the JAVA application writes the XML to a queue operated by the ERP system, and the ERP queue delivers the message to a second separate queue operated by the e-Store database. In this example, a JAVA application on the e-Store database reads the message out of the e-Store queue, and updates the e-Store database. If one queue cannot communicate to another queue, for instance, because the physical circuit is down, the sending queue will continue trying to send the messages contained therein until the other queue is available. The queue system is described above in terms of utilizing a JAVA application to communicate the XML to both the ERP system and the e-Store database. The queue system is not limited to such circumstances and can be utilized when either the ERP system, the e-Store database, or both, can read XML directly without the JAVA application.

In a further embodiment of the database integration application, it may be desirable not only to have the ERP system communicate with the e-Store database, but to also communicate with other ERP systems. The communication between the various ERP systems can be accomplished in any of the manners described above. For example, if the ERP system in communication with an e-Store database is the ERP system of a retailer, which utilizes various manufacturers to supply products for its retail business which sells the products at the e-Store, it may be desirable to have the ERP system of the retailer in communication with the ERP system of all of its manufacturers. Still further, as disclosed above, the e-Store can be in communication with numerous ERP systems. Therefore, in the example discussed above, wherein there is a retailer and various manufacturers for products supplied to the retailer, it may be desirable to have the ERP systems of the manufacturers in direct communication with the e-Store instead of or in addition to the retailer's ERP system. If this is the case, the e-Store database, the retailer's ERP system, and the manufacturers' ERP systems could all be automatically kept in sync.

The database integration functionality of the present invention allows the ability to hook together any amount of disparate ERP systems and e-Store databases and the ability to keep them all in sync no matter where the system and databases are located, and no matter what the network connections are between the various systems and databases.

It will be understood and appreciated by those of skill in the art that while the database integration application of the present invention has been described herein by reference to the on-line purchasing and distribution industries, the method and system may be utilized in a variety of industries to transport relevant information between two data stores where the data structures are known on both sides of the transaction and wherein at least one of the interfaces is an XML interface. All such uses and variations for transporting information to and from web-based applications into systems having XML-based interfaces are contemplated to be within the scope hereof.

In summary, the database integration application of the present invention provides a method for integrating information contained in various databases wherein each database has a known data structure and at least one of said data structures includes an Extensible Markup Language (XML) interface. More particularly, the database integration application of the present invention provides a method for integrating on-line purchasing venues with individual organization's internal management systems, specifically Enterprise Resource Planning (ERP) systems.

Image Configuration Method

The image configuration application of the present invention is directed to a method that dynamically renders a visual image of a configured product by overlying depictions of that product (such as photographs of the individual components) one on top of the other based upon a coordinate system. The resulting compilation provides a new depiction which may be displayed on the Internet. The particular embodiments described herein are intended in all respects to be illustrative rather than restrictive. Alternative embodiments will become apparent to those skilled in the art to which the present invention pertains without departing from its scope.

The image configuration application of the present invention provides a method for configuring images for display on the Internet. By way of example only, and not limitation, the particular embodiments described herein pertain to configuring visual representations of products (e.g., photographs) sold via online purchasing venues, e.g., e-Stores. It will be understood and appreciated by those of skill in the art to which the present invention pertains that the image configuration application described herein may have applicability outside of the exemplary online purchasing environment. Further, the image configuration application has applicability with graphical images other than photographs. In particular, the image configuration application of the present invention may be used to configure any binary file which is capable of being converted to a format which may be read and displayed on the Internet (e.g., Computer Aided Drafting (CAD) generated drawings which are capable of being converted to GIF file format and displayed). All such applications and variations are contemplated to be within the scope hereof.

Figure 18:
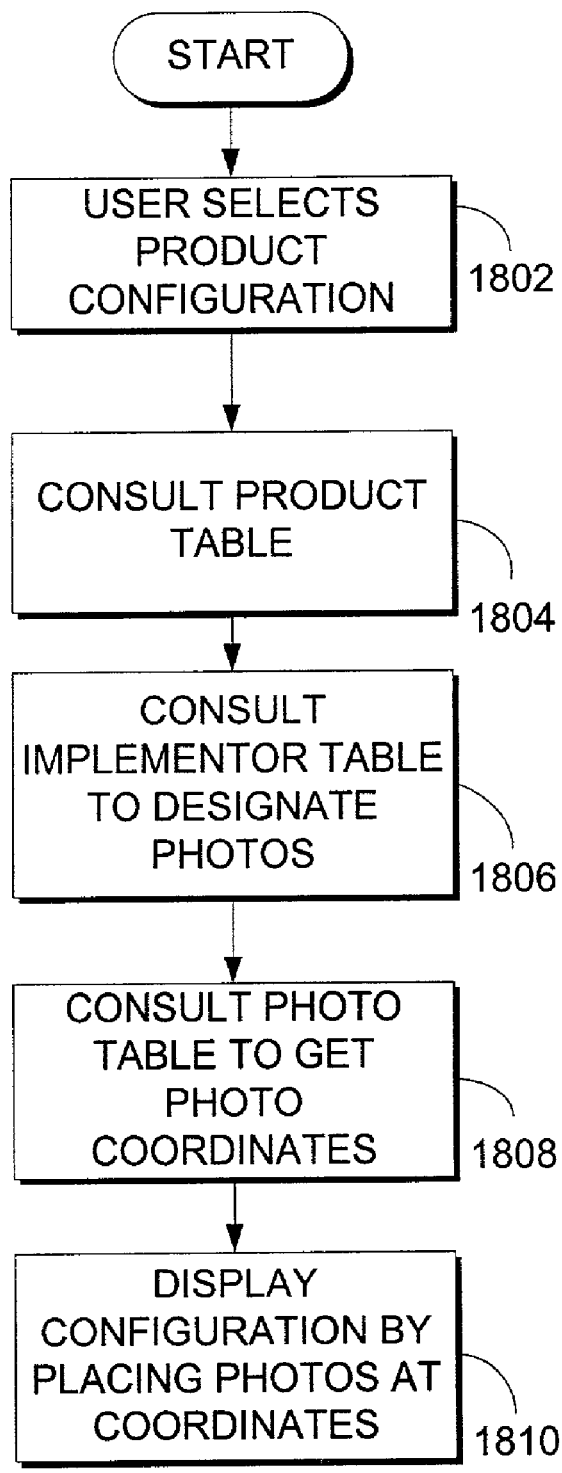
FIG. 18 is a flow diagram of image configuration application according to an embodiment of the present invention.
Figure 20:
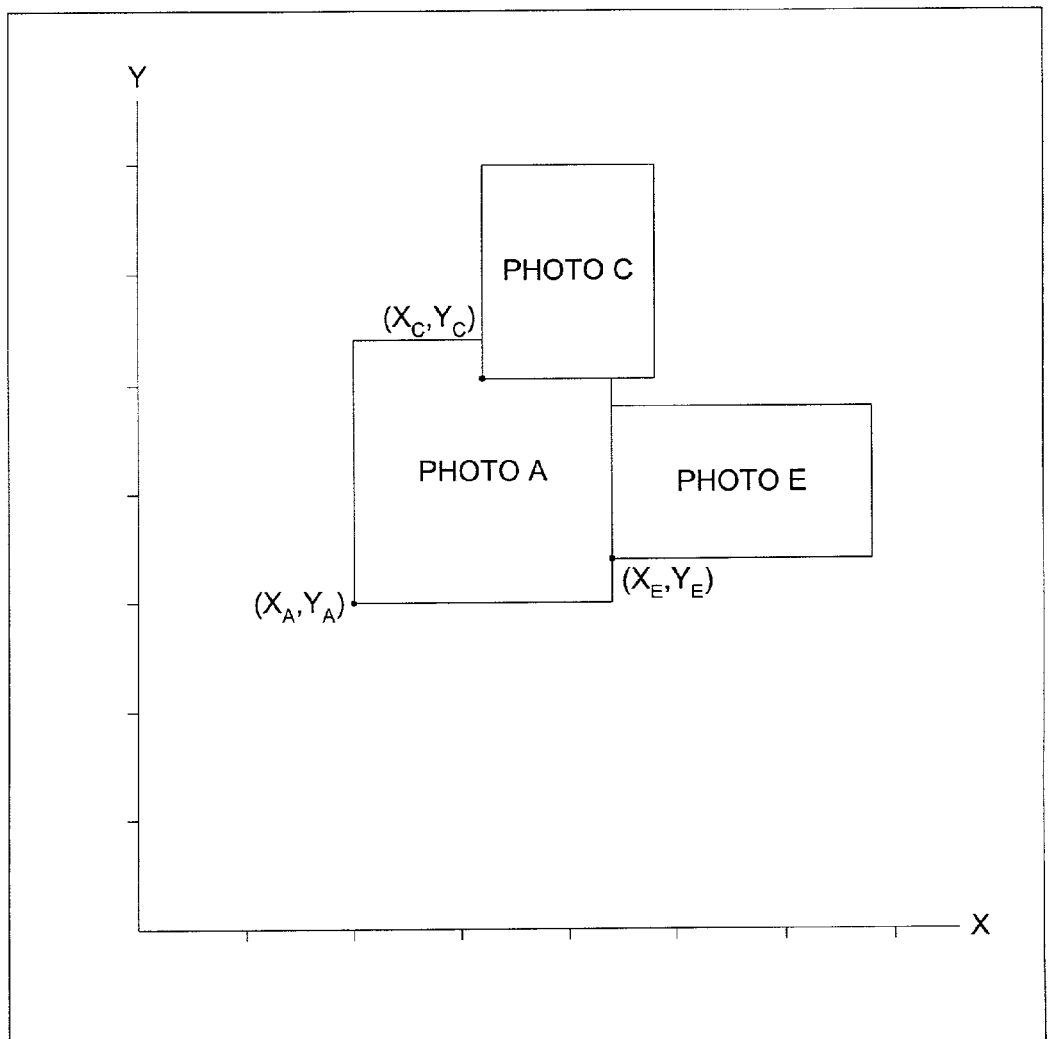
FIG. 20 is a diagram of the image configuration application coordinate system according to an embodiment of the present invention.

With reference to FIGS. 18, 19 and 20, the image configuration application is described utilizing a photograph configuration example. With reference to FIG. 18, a customer/user first selects a product configuration, at step 1802. The product configuration may be a compilation of multiple parts, for instance a base part and multiple auxiliary parts added on to base part. With reference to FIGS. 18 and 19, once a user selects a product configuration, such configuration is looked up in a products table 1902. The step of consulting the product table 1902 is shown at step 1804 in FIG. 18. Utilizing as an example the sale of a bicycle, a customer may pick a desired type of bicycle having a particular frame and particular accessory parts, such as handle bars, a seat and wheels. The configuration for the particular bike selected is located in product table 1902.

Thereafter, once the configuration is located in product table 1902, a photo implementor table 1904 is consulted to determine which photographs (hereinafter referred to as "photos") or depictions of the various parts make up the configuration. This step is shown at 1806. More specifically, with reference to FIG. 19, photo implementor table 1904 includes records for each configuration, and the photos which make up that particular configuration. Again, utilizing the bicycle scenario, the entry "CONFIG. 1" in table 1904 may be for a bicycle having a particular frame, handle bars and a seat. Referring to table 1904, "PHOTO A" under "CONFIG 1" could be of the frame of the bicycle, "PHOTO C" could be of the handle bars of the bicycle, and "PHOTO E" could be the seat of the bicycle. Therefore, as is apparent, by utilizing the photo implementor table, the system determines for each configuration which plurality of photos depict all the various parts of the end product configuration.

After the various photos of the various parts have been identified for each configuration, the system thereafter consults the photo coordinate table 1906 to determine the coordinates on an (X,Y) axis for each of the particular photographs. This step is referred to at 1808 in FIG. 18. More specifically, each of the particular photographs has associated with it a set of coordinates specifying where it is to be positioned in order to render the final product configuration. With reference to FIG. 20, an (X,Y) coordinate system is shown wherein the various photographs associated with the different parts of a particular product configuration are positioned according to their various coordinates. More specifically, for "CONFIG. 1", "PHOTO A" is positioned at coordinates $(X_A, Y_A)$ on the coordinate system. "PHOTO C" is positioned at the coordinates $(X_C, Y_C)$ coordinates. Further, "PHOTO E" is positioned at the $(X_E, Y_E)$ coordinates. In this manner, a product configuration can be assembled from various photographs of individual parts simply by determining the coordinates of where the individual photograph must be placed. With reference to FIG. 18, at step 1810, once the photographs have been positioned at the various coordinates as shown in FIG. 20, the product configuration then may be displayed.

With further reference to FIG. 20, the various photographs which make up a product configuration may be overlapped upon one another (such as "PHOTO C" and "PHOTO A") to present the parts in an appropriate relationship, or maybe positioned side by side (as represented by "PHOTO A" and "PHOTO E"). More specifically, the depiction of the accessory parts within the photograph is utilized to determine where the (X,Y) coordinates of the part must be in order to get it properly positioned in a product configuration whether that results in side by side photos, or overlapping photographs. As previously stated, although photographs of the various parts are referred to in the present example, any other depiction of the part would be suitable, for instance graphical depictions or the like. Such variations are contemplated to be within the scope hereof.

Utilizing again the example of a bicycle, a configuration of a bicycle (for instance "CONFIG. 1") may include the frame, handle bars, and seat. Assuming again "PHOTO A" represents the frame, "PHOTO C" represents the handle bars, and "PHOTO E" represents the seat, the depiction of the various parts in those photographs are displayed using the (X,Y) coordinate system shown in FIG. 20 such that the handle bars, seat and frame are positioned appropriately whether that results in side by side positioning of the photographs or overlapping positioning of the photographs.

Additionally, in FIG. 20 the (X,Y) coordinate system is shown as positioned in a lower left hand quadrant of a display area 2002. The X and Y axis need not originate in this area, but can originate in any other area, for instance, in the center of the display area 2002, thus resulting in positive and negative values for the X and Y coordinates.

An alternative embodiment of the image configuration application involves, again, the selection of various images associated with a particular configuration, but further includes the requirement that each of the images be of the same size and be capable of being overlaid upon an image of the base component. This requires specific positioning of the parts within the same size images such that when they are overlaid, the parts are positioned at their appropriate locations in the configuration. Such a system would not us an (X,Y) coordinate system, but relies upon same size images and explicit placement of parts within the images so that when they are overlaid they align with the base image at the relevant location for display.

In summary, the image configuration application of the present invention provides a method for dynamically configuring images for display on the Internet. More specifically, the image configuration application of the present invention provides a method for overlaying product depictions atop one another based upon a coordinate system to render a compiled, configured image display. The flexibility of the coordinate system provides the ability to render multiple configurations using various different component images without the necessity of depicting or photographing every end configuration itself.

Product Incompatibility System

The incompatibility module of the present invention is directed to a system and method for notifying a customer desiring to configure a product for purchase when a particular part or product selected for the configuration causes a conflict with another part or product in the configuration. Further, the incompatibility module of the present invention provides, to the customer, an alternative configuration which will make the configured product valid again. The particular embodiments described herein are intended in all respects to be illustrative rather than restrictive. Alternative embodiments will become apparent to those skilled in the art to which the present invention pertains without departing from its scope.

The incompatibility module of the present invention provides a system and method for providing alternatives to invalidly configured items on the Internet. By way of example only, and not limitation, the particular embodiments described herein pertain to configuring products sold via online purchasing venues, e.g., e-Stores. It will be understood and appreciated by those of skill in the art to which the present invention pertains that the incompatibility module described herein may have applicability outside of the exemplary online purchasing environment. For instance, the system and method may be utilized for intangible relationships such as in an online scheduling administration program for indicating incompatible classes and/or times and suggesting alternatives thereto. All such applications and variations are contemplated to be within the scope hereof.

In general, the incompatibility module of the present invention provides an interactive tool which may be utilized to configure and display customizable products. These products may include any product containing parts or components that can be replaced with different parts or components in order to specify a new custom product. It also may include a product that can have new parts added to it. The user can view an image of the product to be configured. When a part is added or replaced, an updated image of the new customized product is displayed. In this way, a customer/user can create and view a customized product by replacing existing parts or by adding new parts to the product configuration. The incompatibility module also uses a rule set to ensure that the new customized product is always internally compatible (i.e., that all the parts can fit together appropriately), as more fully described below.

Figure 21A:
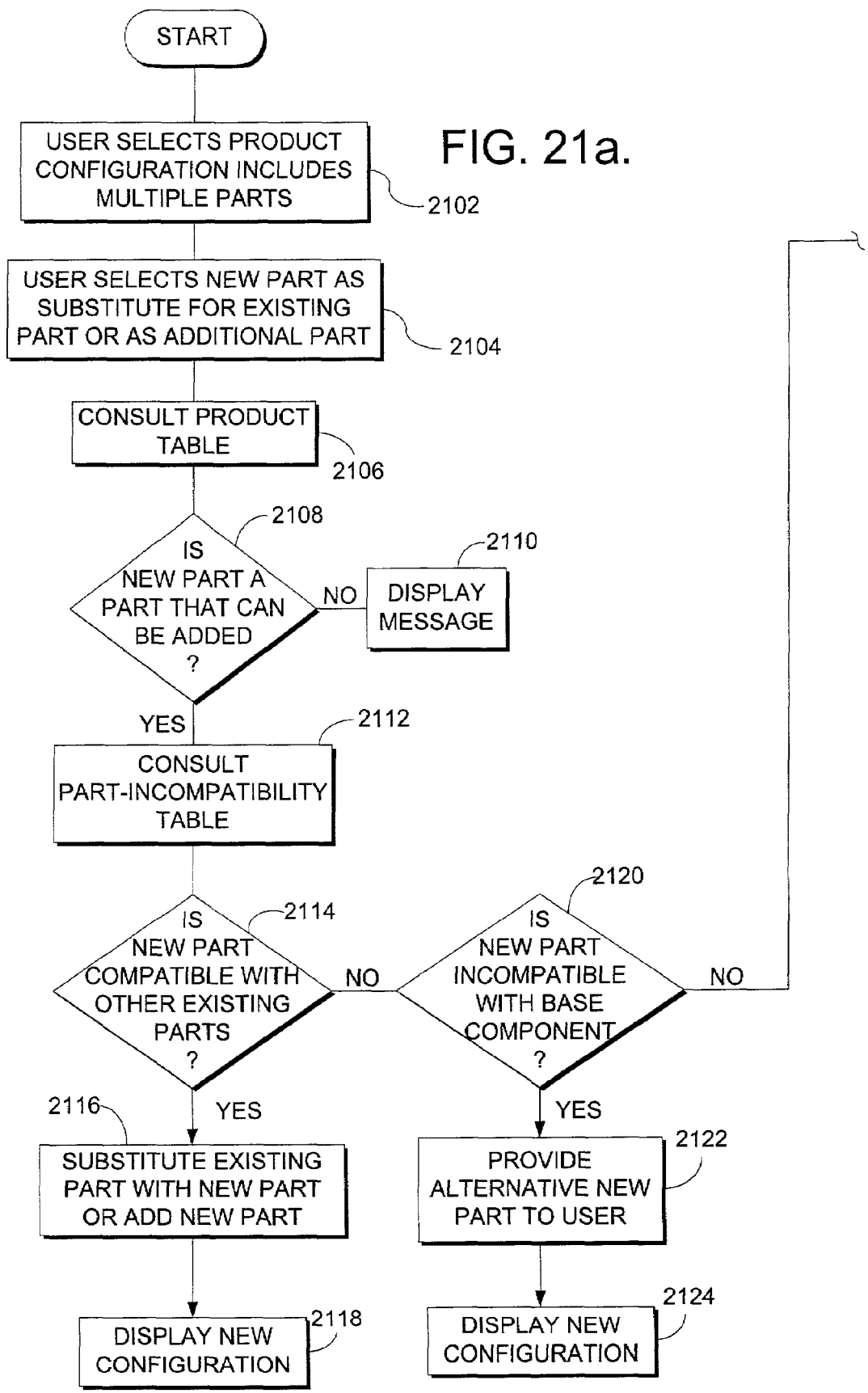
FIGS. 21a and 21b are an illustrative flow diagram of the incompatibility module according to an embodiment of the present invention.
Figure 21B:
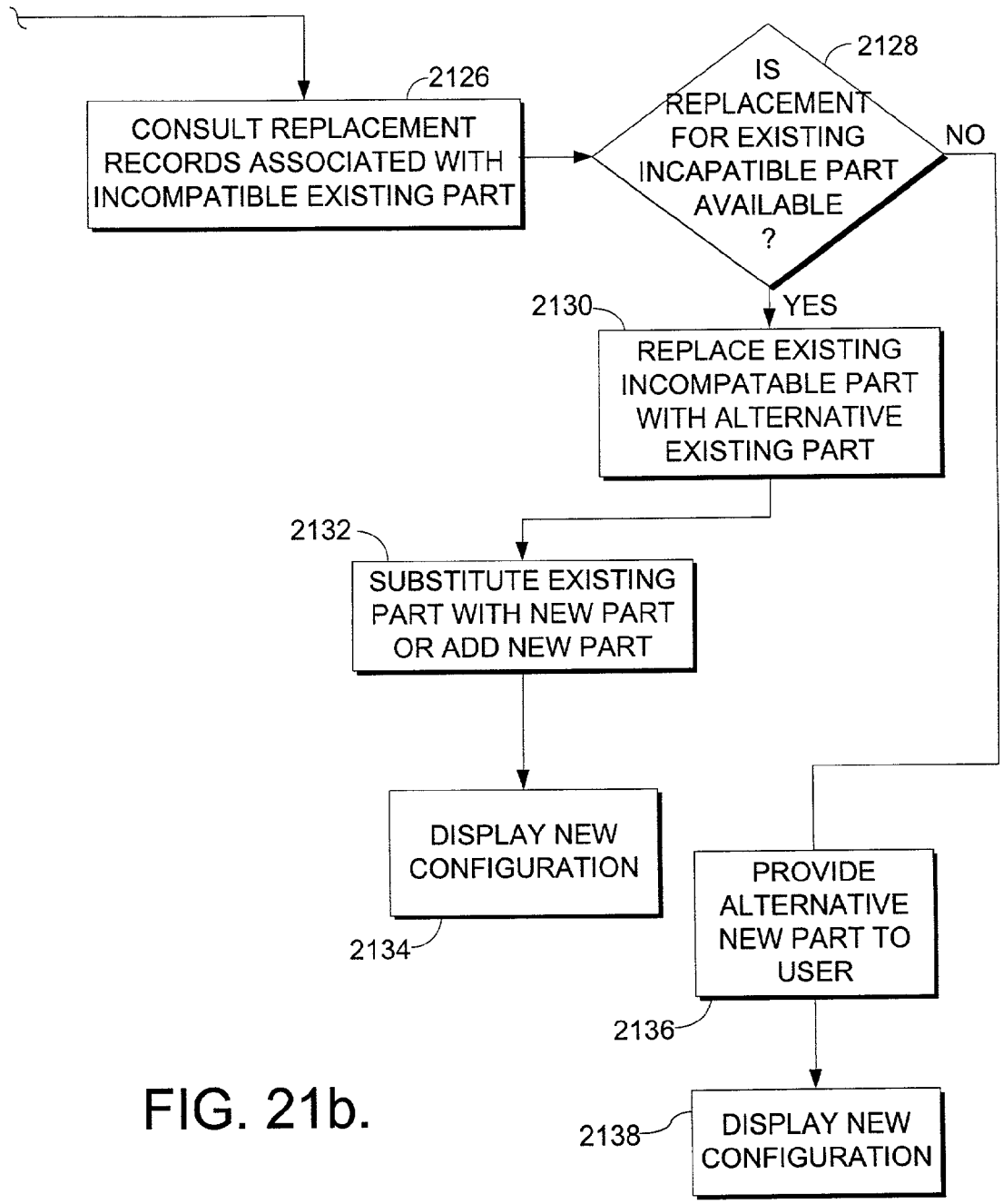
Figure 22:
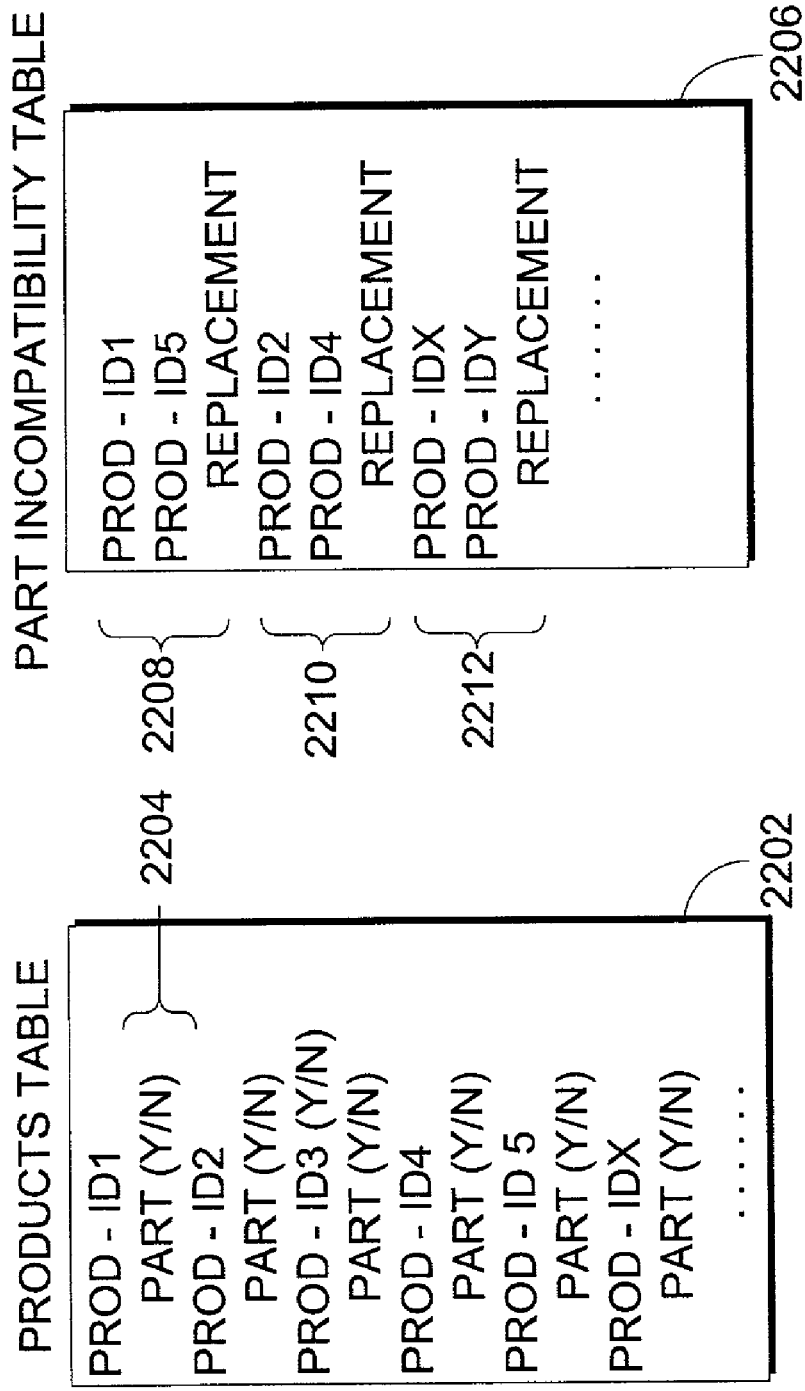
FIG. 22 is an illustration of the tables involved in the incompatibility module according to an embodiment of the present invention.

With reference to FIGS. 21a, 21b and 22, the incompatibility module is described utilizing a product configuration example. As used herein, a "product" can be anything consisting of one or more parts or components and a "part" or "component" can be either a "replacement" part/component (i.e., one that is substituted for an already existing part/component) or a "new" part/component (i.e., one that is being added to the product and not replacing an already existing part/component).

Referring now to FIG. 21a, a customer/user first selects a desired product configuration from a product configuration list, as indicated at step 2102. A product configuration typically will consist of a base part/component and multiple accessory parts that go along with the base part. The customer also may simply select a base part, and thereafter add on all the necessary accessory parts to make a configured product. In most instances, however, the customer selects the product configuration which has the base part and designated multiple accessory parts associated with the configuration. It will be assumed, for purposes of the incompatibility module of the present invention, that every part has a relationship with at least one other part. Such a relationship is simply a description or rule regarding how the part can co-exist in the product with the other parts. An exemplary product configuration is a bicycle wherein the base part is the frame, and the accessory parts are, for instance, the handlebars, brakes, seat, and wheels.

After a customer has selected a configuration, he/she may desire to substitute a new accessory part (i.e., replacement part) for an existing accessory part of the standard product configuration. This step is shown at 2104. Utilizing the bicycle scenario, an example of a replacement part is a new, more comfortable seat to substitute for the original bicycle seat of the standard product configuration. In addition to substituting a newly selected part for an existing part, it may be that the customer desires to add an additional accessory (i.e., new part) to the original configuration. For instance, in the bicycle scenario, a user may desire to add reflectors or a bicycle pump to the standard bicycle configuration. Both scenarios are contemplated to be within the scope hereof.

After a customer has selected a new (or replacement) part, a table is consulted at step 2106 to determine whether the item selected can, in fact, be added to the existing configuration. In other words, a product table is consulted to determine whether the desired addition or substitution results in a "valid configuration". As used herein, a "valid configuration" is one in which every part in the configuration is compatible with all other parts, whether base components or add-ons, in the configuration. "Compatible" as used herein means that required relationships of one part to all other parts in the specified configuration are satisfied.

Referring now to FIG. 22, an example of a product table 2202 is illustrated. In this product table, each part is given a product identification number, referred to as "PROD-ID" in FIG. 22 and an indication is given whether or not the product is, in fact, a part which can be added to the existing product configuration. More specifically, each record contains an indication 2204 whether the "PROD-ID" is capable of being added to other parts.

At 2108, the determination is made as to whether the part, selected on the basis of its PROD-ID, is compatible with the existing product configuration. If the answer to this threshold question is no, the system displays a message to the customer indicating that the product selected cannot be added to the configuration because it is not, in fact, a part component. A message is displayed to the user at 2110.

If a determination is made at 2108 that the "PROD-ID" is a part that can be added to the existing configuration (i.e., it is, in fact, a part component), the next step in the system is consulting a product incompatibility table 2206 as is indicated at 2112. More specifically, the part incompatibility table is shown in FIG. 22, and includes a plurality of records, 2208, 2210, and 2212. Each record 2208, 2210, and 2212 includes entries for two "PROD-ID" numbers. The entry of the parts into a single record indicates that the "PROD-IDs" are not compatible. For instance, with reference to record 2208, part incompatibility table 2206 indicates that the part associated with "PROD-ID1" and the part associated with "PROD-ID5" are not compatible and cannot be utilized in the same configuration. Still further, in each of records 2208, 2210 and 2212, there is a replacement entry, which indicates various "PROD-IDs", product categories, or product styles which may serve as replacements for one or both of the "PROD-IDs" entered in the particular record. For instance, if a customer is desirous of adding a part that corresponds to "PROD-ID5," and "PROD-ID5" is incompatible with "PROD-ID1" as is indicated in record 2208, the replacement entry would have a list of "PROD-ID" numbers that could be replaced for "PROD-ID1" in order to make "PROD-ID5" compatible with the product configuration.

As indicated at 2114, after consulting the product incompatibility table 2206, a determination is made as to whether the new or replacement part is compatible with all the other existing parts of the product configuration. Keeping with the bicycle scenario, an example would be determining whether a new seat which a customer desired to add is compatible with all other components of the bicycle, for instance, the spindle that is used to attach the seat to the frame. It will be understood and appreciated by those of skill in the relevant art that oftentimes a part may require one or more additional parts in order to make it compatible. For instance, the new seat may require one or more fasteners to attach it to the spindle. It is contemplated herein that use of the term "part" means all such additional parts necessary to make the configuration compatible.

With reference to step 2116, if after consulting the part incompatibility table, no incompatible parts are found, the selected new part is substituted for the existing incompatible part. Alternatively, if the selected part is not a replacement part, it simply is added as a new part. Thereafter, a product configuration reflecting addition of the new part is displayed at 2118.

However, if a determination is made after consulting the part incompatibility table that the newly selected part is not compatible with the existing parts, certain other determinations must be made in order to result in a valid configuration for the product. A first threshold determination to be made is whether the selected new part is incompatible with the base component/part of the product configuration. This step is shown at 2120. More specifically, again utilizing the bicycle scenario, the base component is the frame of the bicycle. If a determination is made that the new part to be added, for instance wheels, are incompatible with the frame (i.e., the base component), then the customer will be provided with an alternative to the new part to be added as reflected at 2122. In the bicycle scenario, if it is determined that the wheels are incompatible with the frame, a customer will be notified that they are incompatible and the assumption will be the customer wishes to keep the frame. Thereafter, the customer will be provided with alternative wheels that are compatible with the selected frame. Either with or without the customer's approval, a new product configuration including the alternative to the newly selected part will be displayed as shown at 2124.

If, however, the determination is made that the newly selected part is compatible with a base component, but instead is incompatible with an existing accessory part, the replacement records indicated above in the part incompatibility table 2206 are consulted to determine replacement parts for the incompatible existing part. The preferred system operates by first attempting to replace existing parts in the product configuration with other parts that are compatible with the newly selected part. More specifically, in the bicycle example, if a customer wishes to replace an existing seat with a newly selected seat, the compatibility of the newly selected seat will be determined by consulting part incompatibility table 2206. If, for instance, it is determined that the existing spindle, (which is used to attach the seat to the bicycle frame) is incompatible with the newly selected seat, the system preferably will find a replacement for the spindle which is both compatible with the frame, and compatible with the newly selected seat.

With reference to step 2126, the consultation of the part incompatibility table 2206 is shown to determine if there are suitable replacement parts for the incompatible existing parts. At step 2128, a determination is made as to whether a replacement for the existing incompatible part is available. At step 2130, if a replacement part is available for the existing part, a customer is notified as to that effect and the replacement part is substituted for the existing part. For instance, in the bicycle scenario, the replacement spindle that is compatible with both the frame and the newly selected seat is used to replace the existing spindle. Thereafter, at step 2132, the newly selected part is either substituted for an existing part or added on. At step 2134, the new product configuration reflecting the newly selected part, is displayed.

With reference to step 2128, if it is determined after consulting the part incompatibility table 2206 that there are no replacement parts for the existing part that is incompatible with the newly selected part, then the system will provide an alternative new part to the user, as shown at 2136. More specifically, in the bicycle scenario, if the new seat desired to be added cannot be added to the existing spindle, and the existing spindle does not have any suitable replacement that would be compatible with both the frame and the seat, then an alternative new seat would be suggested to the customer which is compatible with the existing spindle. Thereafter, the configuration with the alternative to the newly selected part will be displayed as is shown at step 2138.

As is apparent from the above discussion, the preference in deciding which part to replace, is to replace existing non-base component parts with suitable replacement parts that are compatible with the newly selected part. More specifically, the assumption is that the customer wishes the newly selected part to be in the configuration, and that, therefore, non-essential component parts to the configuration that are incompatible can be changed in order to accomplish the customer's desire of having the new part in the configuration. If however, the newly selected part is incompatible with the base component, then the system will provide an alternative newly selected part to the customer. Still further, if the newly selected part is incompatible with existing parts, and there are no replacements for the existing parts then, again, an alternative to the newly selected part will be suggested.

In summary, the above described incompatibility module of the present invention provides a web site customer configuring a product the flexibility of changing product parts and thereafter having the product configuration automatically adapt to the customer's changes. The replacement of incompatible parts with compatible parts automatically enhances the customer's buying experience, and results in efficient, customizable configuration and purchasing of products. More specifically, unlike prior art systems, a user is not left to his or her own devices to determine and configure a product by trial and error simply because the user wishes to make adjustments to the existing product configuration.

System and Method for Comparing Items

The comparison module of the present invention provides a system and method that facilitates the comparison of items, such as electronic store products, in a web-based computing environment. The particular embodiments described herein are intended in all respects to be illustrative rather than restrictive. Alternative embodiments will become apparent to those skilled in the art to which the present invention pertains without departing from its scope.

The system and method for comparing items provided by the present invention preferably is presented as an enhancement to a multiple-vendor, e-Store offering. In this embodiment, the comparison module is utilized to conduct a side-by-side comparison of consumer product information (e.g., style, color, price, availability, etc.). It will be understood and appreciated, however, by those of skill in the art that the system and method for comparing items provided by the present invention may be utilized to conduct a web-enabled comparison of any number of items other than consumer products. Such comparisons are contemplated by and are within the scope of the present invention.

It will be further understood and appreciated that, while a preferred embodiment of the method and system for comparing items provided by the present invention includes a side-by-side comparison of two items at one time, variations of this configuration are contemplated to be within the scope of the invention. For instance, rather than a side-by-side comparison, a comparison of one item linearly atop a second item may be displayed. In another embodiment, a number of items other than two may be displayed for comparison at one time. Such variations in the display of the comparison functionality are within the scope hereof.

By way of example and not limitation, the comparison module of the present invention is described herein with regard to consumer products offered for sale in an e-Store. Typically, a consumer begins an e-Store shopping session by navigating through a series of menus, each selected menu sequentially more specific than the previous ones. For example, typically the initial selection by the user will be of a category of items, e.g., "Things to Grow". The initial selection typically will lead to the display of a list of subcategories, e.g., "Indoor" and "Outdoor". A typical e-Store database may contain any number of subcategories before a consumer reaches a style listing. "Style" as that term is used herein, refers to a logical grouping of products that are distinguishable from one another by a limited number of vendor-specified attributes, typically between one and four. Attributes may include such things as color, finish, size, width, price, etc. Upon selection of a style listing, a number of specific products within that style listing are displayed. The products may be displayed by any readily recognizable identifier, such as a photograph and/or product name. It is from this product listing that items for comparison may be selected in the comparison module of the present invention.

Figure 23:
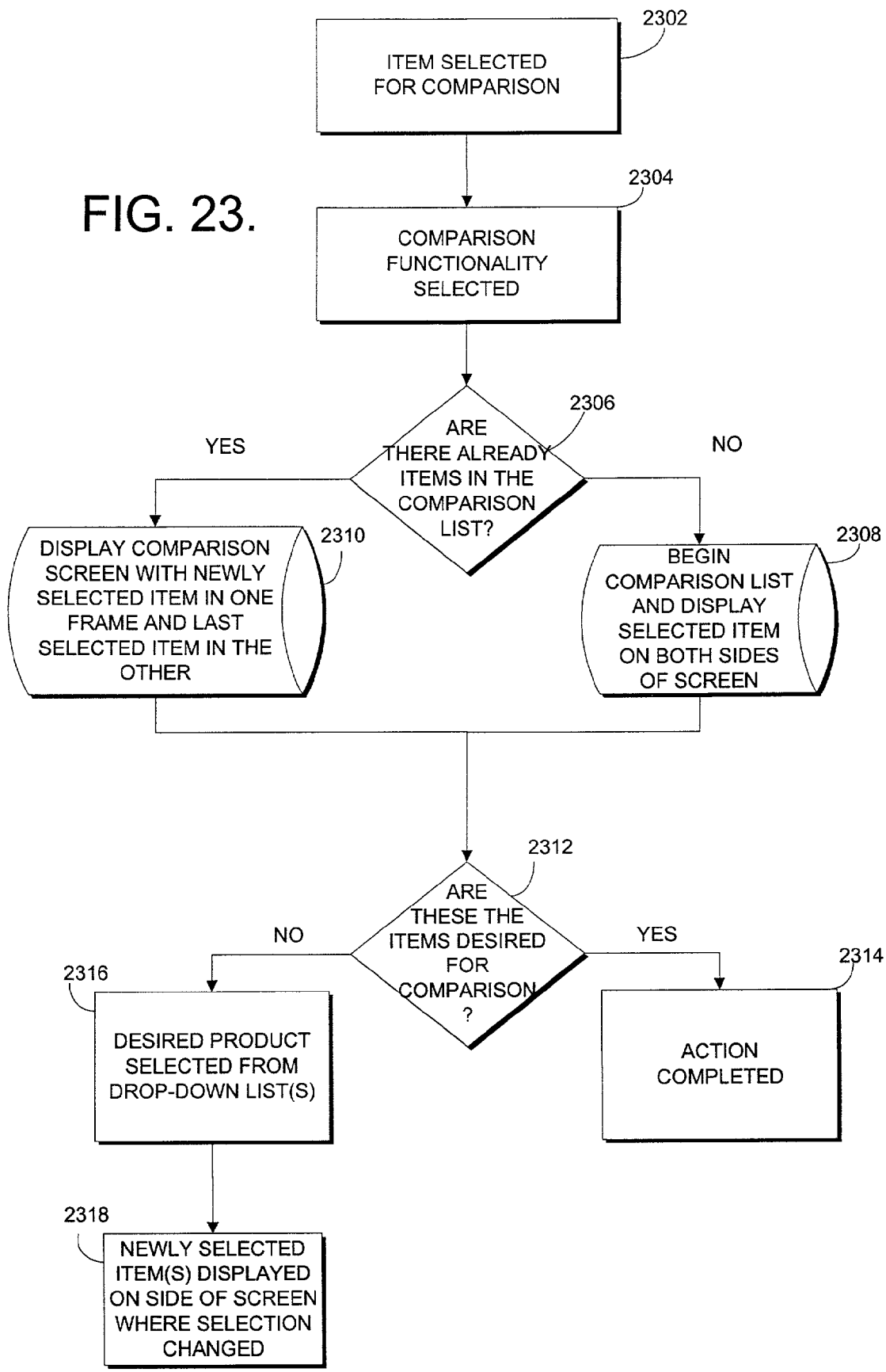
FIG. 23 is a flow diagram of the comparison module according to an embodiment of the present invention.

In the preferred embodiment, upon selection of a particular product from a product listing, information concerning the product is displayed for viewing by the consumer. This information includes manufacturer name, price, full description, all relevant product attributes and information, and the like, in addition to a photograph. Referring now to FIG. 23, if the consumer wishes to conduct a product comparison which includes the selected product 2302, a selection must be made to initiate the comparison functionality 2304. This is accomplished by choosing a selection option generally associated with the selected item. This option may be a check box or other similar indicator requiring affirmative action by the user. Variations are well known to those of skill in the relevant art and will not be further discussed herein.

After selection of the product comparison module, it must be determined whether or not a comparison list exists 2306 which is associated with the current shopping session. A "comparison list", as that term is used herein, is a grouping of item identifiers, one identifier for each item selected for comparison during a given user session. Items may be added to a comparison list by selection of the item as previously described. Once selected for comparison, an item may be deleted from the comparison list only by affirmative action on the part of the user, or by cessation of the user session.

Any item for which information is available in the associated data store may be selected for a comparison list, including configured items, as more fully described below. The comparison functionality of the present invention thus permits comparison of any products available in the e-Store offering, regardless of category, sub-category and style headings, or the like. Accordingly, comparisons are permitted in combinations which may or may not have been anticipated by the item vendors or manufacturers.

As previously noted, in a preferred embodiment, two products may be compared at one time in a side-by-side configuration. Such configuration typically includes two frames of equal dimension, one displayed on each half of a comparison screen. If the product selected at 2302 is the first product selected for comparison, the photograph and associated information is displayed in the frames on both sides of the comparison screen 2308. Additionally, an identifier (e.g., the product name) is added to a drop-down box associated with each frame and a comparison list is begun 2308. Preferably, the drop-down box is located linearly above each frame and includes an identifier display field which displays the identifier only for the item for which a photograph is displayed in the frame. Each drop-down box has a function associated therewith (e.g., an arrow key located on the far right of the identifier display field) which, when selected, displays the identifiers for all products previously selected.

If upon selection of a product at 2302, products are already present in a comparison list, the photograph and associated information is displayed in one of the frames of the comparison screen and the next most recently selected comparison item is displayed in the other frame 2310. Regardless in which frame the photograph and associated information for the newly selected product is displayed, the product identifier for the newly selected product is added to the drop-down boxes associated with both frames. Thus, there are two drop-down boxes, each containing a product identifier for each selected item. In other words, each drop-down box contains the comparison list for the user session.

Subsequently, it must be decided whether the two displayed items are the items for which comparison is desired 2312. If they are the desired items, action is completed 2314. If, however, the user wishes to display the newly selected item in comparison with an item from the comparison list other than the next most recently selected comparison item, the user selects the function (e.g., the arrow to the far right of the identifier display field) from the drop-down box associated with the desired frame which causes the identifiers for all products previously selected to be displayed. The user then may select any item from the list by choosing the appropriate identifier 2316. Once selected, the photograph and information associated with the item is displayed in the frame on the side of the comparison screen where the selection was changed 2318. The displayed photograph and information in the other of the two frames remains unchanged unless similar action is taken by the user with regard to that frame.

In an alternative embodiment, rather than displaying the last most recently selected item in the opposing frame on the comparison screen, the displayed item may be that which was being viewed at the time the new selection was made in the first frame. In other words, if a user was comparing two items, neither of which was the most recently selected item for comparison, and then desired to compare one of the items with a newly selected item, he or she could do so simply by selecting a new item for one side of the comparison screen, the opposing side remaining with a display of the item displayed prior to the change. Such variation is contemplated to be within the scope hereof.

In summary, the comparison module of the present invention provides a system and method that facilitates the comparison of items, such as e-Store products, in a web-based computing environment. Utilizing the method and system of the present invention, on-line consumers may conduct product comparisons quicker and easier than in previous comparison systems. Further, the comparison module of the present invention allows a consumer to compare products which the vendor may or may not have anticipated them comparing. The comparison functionality thus permits the additive comparison of dissimilar products at a user's initiation of a web site. The comparison method and system of the present invention dynamically builds a list of products for comparison, each compared product being deleted from the list only upon affirmative action on the part of the user.

System and Method for Calculating Sales Tax

The tax computation module of the present invention provides a system that allows full and accurate determination of sales taxes due on Internet transactions. The particular embodiments described herein are intended in all respects to be illustrative rather than restrictive. Alternative embodiments will become apparent to those skilled in the art to which the tax computation system of the present invention pertains without departing from its scope.

The tax computation module of the present invention is designed to allow for simple inclusion of additional tax functions in the event that such Internet sales transactions should be taxed differently in the future. As will be discussed in more detail below, the current system utilizes the fact that the only constant in sales tax determination is geography. Utilizing this concept, the current system allows great flexibility in assessing the tax ramifications of an Internet sales transaction.

Taxes of Internet sales are currently applied to the specific tax district of the seller, and then only if the buyer has the product delivered to that same tax district. In other words, sales taxes are applied if, and only if, there are overlapping tax locations of the buyer and the seller. The current system allows for determination of the tax districts of the seller and the tax districts of the address to which the product is to be shipped ("product ship to address"), and thereafter the determination of whether they overlap. If the tax districts do overlap, then the sales tax of the overlapping district will be applied to the Internet sale.

With references to FIGS. 24–28, the tax computation module of the present invention will be described. With initial reference to FIG. 24, the first step is to utilize the product ship to address to determine an address identification number. This step is shown at 2402. More specifically, as part of the Internet sales transaction, each buyer will have entered an address to which he or she desires the purchased product(s) to be shipped, including a zip code. Utilizing this address and zip code information in conjunction with an address table 2502 as shown in FIG. 25, an appropriate address identification number (e.g., ADD-ID1) is determined. Address table 2502 is utilized to make the determination as to the appropriate address identification number for the product ship to address. As is shown in table 2502, different addresses and zip codes may have the same address identification. More specifically, for instance, ADDRESS1 and ADDRESS7 both have the same address identification number (ADD-ID1).

As discussed, an address identification number is found for the product ship to address. Thereafter, an address geographical region cross-reference table 2602, as illustrated in FIG. 26, is consulted to determine the appropriate geographical regions of the address identification number. This step is shown at 2404. This step involves associating various geographical identification numbers with the various address identification numbers. Each of the geographical identification numbers represents a different geographical area. For instance, with reference to table 2602, the entry for the address identification number, ADD-ID1, includes the geographical identification numbers GEO-ID1, GEO-ID2, and GEO-ID3. Each of these geographical identification numbers has associated therewith a geographical region. For instance, GEO-ID1 may be associated with a state, GEO-ID2 may be associated with a county, and GEO-ID3 may be associated with a city. As is apparent, any geographical division, for instance, a country, state, county, city, school district, transportation district, and/or water district, etc., may be used as a geographical region for a sales tax and could be assigned an appropriate geographical identification number.

With additional reference to table 2602, different address identification numbers may have geographical identification numbers in common, and further, may be subdivided into additional geographical identification numbers representing further geographic subdivisions. More specifically, as discussed above, address identification number, ADD-ID1, could have associated therewith the geographical identification numbers GEO-ID1, GEO-ID2, and GEO-ID3 pertaining to the state, county and city, respectively. The entry for the different address identification number, ADD-ID2, may have the same overlapping geographic identification numbers GEO-ID1, GEO-ID2 and GEO-ID3, again representing the same state, county and city as the address identification number ADD-ID1. However, the address identification number, ADD-ID2 has an additional geographical identification number, GEO-ID4. The address identification number, ADD-ID2, may lie in a subdivision different than address identification number ADD-ID1, for instance, a particular transportation district that does not include address identification number ADD-ID1. Therefore, address identification number ADD-ID2 has the additional geographical identification number, GEO-ID4.

Once the appropriate geographical identification numbers are determined for an address identification number, the next step is to determine the appropriate tax district identification numbers for the appropriate geographical identification numbers. This step is represented at 2406 in FIG. 24. In order to determine the appropriate tax district identification numbers, a table 2702 is consulted, as shown in FIG. 27. More specifically, each geographical identification number has associated therewith one or more tax district identification numbers. For instance, the geographical identification number GEO-ID1 has associated therewith a tax district identification number of TAXDIST-ID1. Still further, a certain geographical identification number may also have more than one tax district associated therewith. For instance, with reference to geographical identification number GEO-ID3 in table 2702, two different tax district numbers, TAXDIST-ID3 and TAXDIST-ID4, are listed. This takes into consideration that a certain geographical area may have multiple sales taxes associated therewith. For instance, it may be the case that a particular city has a regular sales tax, and also has a transportation sales tax. Therefore, the geographical area of the city defines two different tax districts.

Figure 24:
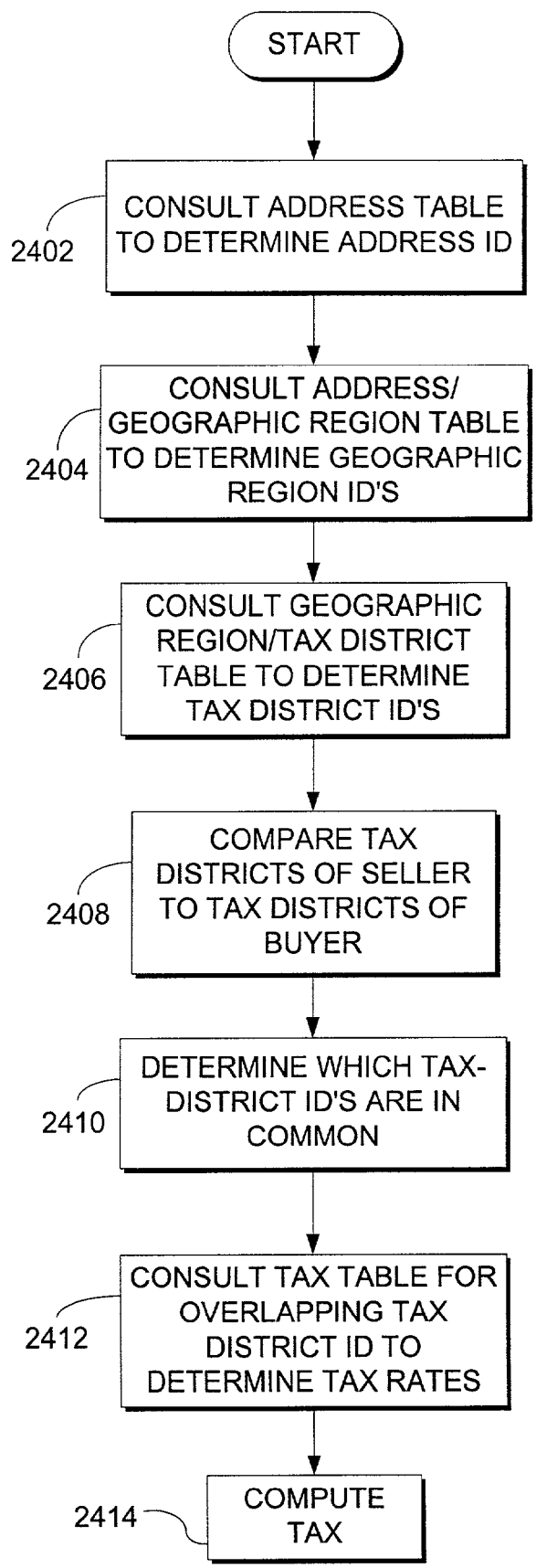
FIG. 24 is a flow diagram of the tax computation module according to an embodiment of the present invention.

With reference to FIG. 24, once the various tax district identification numbers of the product ship to address are determined, it is now time to compare those tax district identification numbers with the tax district identification numbers of the seller. This step is shown at 2408. More specifically, the tax identification numbers of the seller's location may be permanently set within the particular system. Therefore, it is only necessary to go through the steps disclosed in FIG. 24 to determine the tax district identification numbers of the product ship-to address. The seller's tax district identification numbers will remain constant because the seller is fixed. As is apparent, it may be possible each time to go through the iteration of determining the seller's tax district identification numbers by going through the same steps described above with respect to the product ship to address. In any event, at step 2408, the tax district identification numbers of the product ship to address are compared to the tax district identification numbers of the seller's address. After the comparison is made, a determination is made as to which tax district identification numbers the product ship to address and the seller's address have in common, as is indicated at 2410. More specifically, this indicates which tax districts of the product ship to address and the seller's address overlap and, thus, on which tax districts a sales tax is due for the particular Internet transaction. As is apparent, it may be the case that certain tax districts of the product ship to address do not overlap with tax districts of the seller's address, and therefore that only the appropriate taxes for the overlapping districts are due, and the ones that are not overlapping are not due.

Once the overlapping tax district identification numbers are determined, it is next time to determine the appropriate tax rate for the transaction. In order to do this, a tax table 2802 is consulted, as is shown at step 2412. Tax table 2802 is shown in FIG. 28, and includes an appropriate tax rate expressed in a percentage for a particular tax district identification number. For instance, tax district identification number TAXDIST-ID1 may have a tax rate of "A %."

Once all the appropriate rate percentages are determined for all the appropriate tax districts that overlap between the product ship to address and the seller's address, the appropriate percentages can be applied to the Internet sales transaction, and the tax computed as is shown at 2414. The tax computed utilizing all the appropriate tax rates can then be added to the purchase price of the Internet transaction automatically and assessed on the buyer.

An example of computation of the appropriate sales tax for a purchaser will now be demonstrated utilizing the assumption that a buyer desires to have the product shipped to Greenwood Village, Colo. to his/her home address. Greenwood Village is located in Arapahoe County. Further, for the example, assume that the buyer is in a particular school district located within the city of Denver, for instance, Cherry Creek School District 5. First, the buyer's address is utilized with address table 2502 to determine an appropriate address ID number. For instance, suppose the buyer's address falls within ADDRESS 2 of the table, which gives the address identification number of ADD-ID2. Thereafter, the address/geographical region table 2602 is consulted to determine the appropriate geographical regions for the address identification number. In this instance, ADD-ID2 includes geographical identification numbers GEO-ID1, GEO-ID2, GEO-ID3, and GEO-ID4. For the sake of this example, GEO-ID1 corresponds to the State of Colorado, GEO-ID2 corresponds to Arapahoe County, GEO-ID3 corresponds to the City of Greenwood Village, and GEO-ID4 corresponds to Cherry Creek School District 5. Thereafter, the geographical region/tax district table 2702 is consulted to determine the appropriate tax districts. More specifically, Colorado (GEO-ID1) is associated with TAXDIST-ID1. The County of Arapahoe (GEO-ID2) is associated with TAXDIST-ID2. Further, the City of Greenwood Village (GEO-ID3) is associated with both TAXDIST-ID3 and TAXDIST-ID4. GEO-ID3 involves a geographical region, for instance, the City of Greenwood Village, having two tax districts associated therewith, i.e., a regular sales tax and a transportation tax. Still further, Cherry Creek School District 5 (GEO-ID4) is associated with TAXDIST-ID5.

Therefore, all the appropriate tax district numbers for the buyer's location are determined. Thereafter, as shown at steps 2408 and 2410, the tax district identification numbers of the buyer are compared with those of the seller, and a determination is made as to which tax district identification numbers are in common. For the sake of the above example, assume that the seller has all the tax district identification numbers of the buyer, except for TAXDIST-ID5. In other words, the seller is not located in the same school district as the buyer, and therefore there is no overlapping of the tax districts. In this example, the taxes on an Internet sales transaction between a buyer and a seller will therefore be due on the taxes associated with TAXDIST-ID1, TAXDIST-ID2, TAXDIST-ID3 and TAXDIST-ID4. The tax district identification number TAXDIST-ID5 is not utilized for the computation of the tax because it does not overlap with the seller's tax district identification numbers.

Thereafter, tax table 2802 is consulted to determine the appropriate percentages to be applied to the transactions. Therefore, the appropriate transaction will have applied to it the tax rates of "A %," "B %," "C %," and "D %." The tax will thereafter be computed as shown at 2414, and added to the purchaser's price.

In summary, the above tax computation module of the present invention provides for the computation of sales taxes automatically for each appropriate geographical region that overlaps between the product ship to address and the seller's address. Still further, because of the table structure of the above system, it is easy to make additions, deletions and changes to the system as tax rates, tax structures, and taxing guidelines change. More specifically, changes can be easily made to the appropriate tables 2502, 2602, 2702 and 2802 as the taxing laws and rates associated with Internet transactions change.

System and Method for Categorizing and Referencing Data

The categorizing and referencing module of the present invention provides a method and system for categorizing and referencing objects or entities with similar attributes in a database environment. The particular embodiments described herein are intended in all respects to be illustrative rather than restrictive. Alternative embodiments will become apparent to those skilled in the art to which the present invention pertains without departing from its scope.

The categorizing and referencing module of the present invention is a method and system of allowing organizations and individuals to be defined and treated in a uniform and similar manner, so as to minimize duplication of data items and to facilitate data searches and is presented as a feature in a multiple vendor e-Store offering. In this embodiment, the categorizing functionality of the present invention also handles the relationships between organizations and individuals, while maintaining the ability to distinguish between them. It will be understood and appreciated, however, by those of skill in the art that the system and method of allowing organizations and individuals to be treated in a similar manner may be utilized to categorize any other objects or entities aside from individuals and organizations. Such categorizing and referencing are contemplated by and are within the scope hereof.

Figure 29:
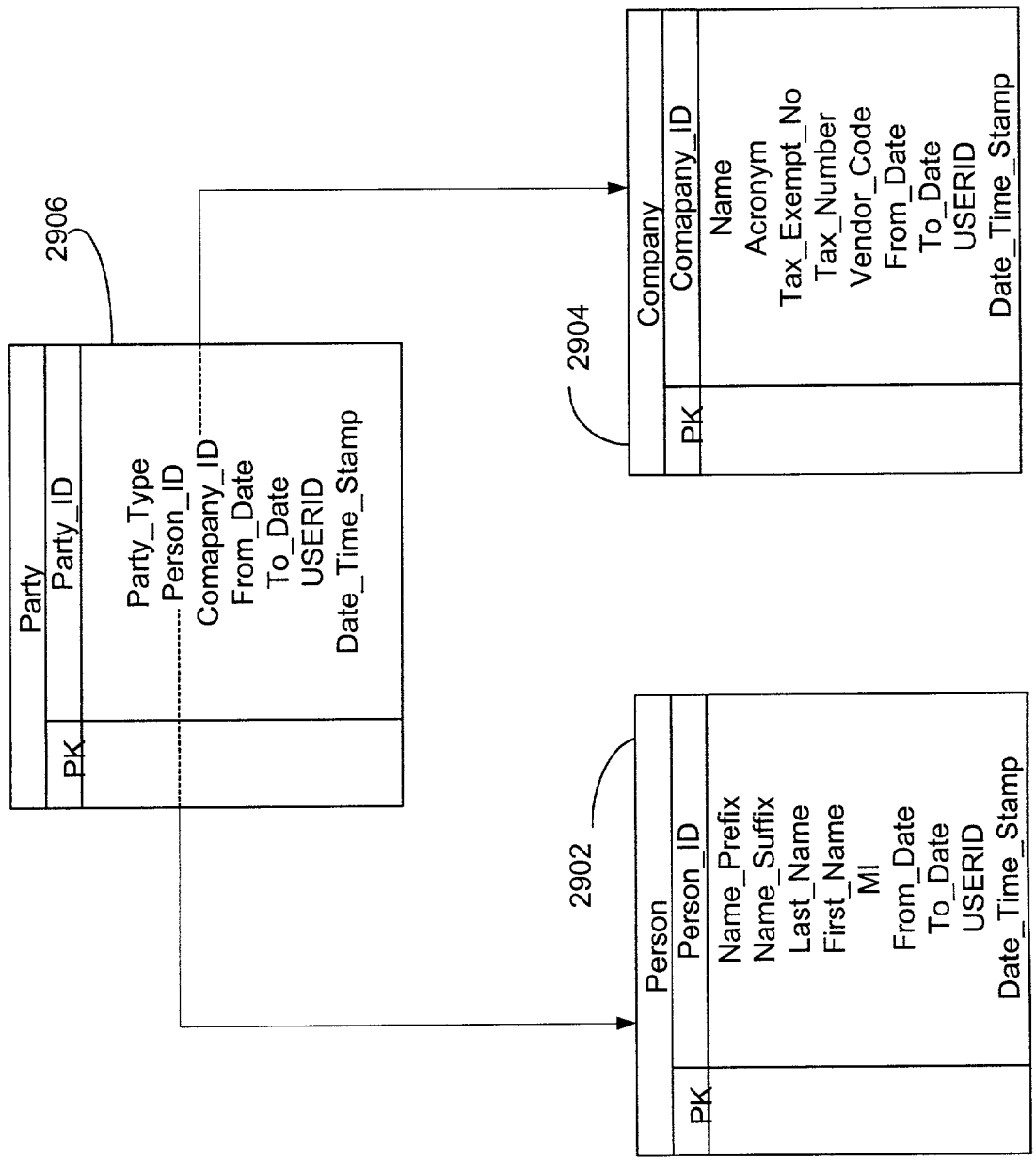
FIG. 29 is an illustration of exemplary tables for use in the categorizing and referencing data module according to an embodiment of the present invention.

In the preferred embodiment, the attributes and information that describe a person or a company are identified within a database, as a field in a table. Referring to FIG. 29, fields for three different exemplary tables are shown. A person table 2902, a company table 2904 and a party table 2906. Consistent with the categorizing and referencing method and system of the present invention, the party table 2906 provides the categorizing and referencing of the person table 2902 and the company table 2904. The informational items found in the person table 2906 relating to a person, along with the informational items found in the company table 2904 relating to a company, which are found to be similar or which can be treated the same, are categorized as being attributes of a party. These attributes of a party rather than attributes of the individual or the company, are subsequently defined in the party table 2906, wherein they can be referenced. For example, the person table 2902 contains the following fields:—Name_prefix, Name_suffix, Last_Name, First_Name, MI, From-Date, To_Date, USERID, and Date_Time_Stamp. The company table 2904 contains the following fields:—Name, Acronym, Tax_Exempt_No, Tax_Number, Vendor_Code, From_Date, To_Date, USERID, and Date_Time_Stamp.

As previously mentioned, the categorizing and referencing module of the present invention entails the identification of attributes (i.e., fields) that can be similarly treated and their subsequent categorization. In the current example, it is feasible, and in fact advantageous, to treat a person and a company as a single entity, namely a party. To that extent, some of the similar attributes of each party type which can be found in both the person table 2902 and the company table 2904, are as follows: From-Date, To_Date, USERID, and Date_Time_Stamp. These attributes are defined within the party table 2906, along with other fields (Party_Type, Person_ID and Company_ID) that facilitate reference back to each of the individual party type tables i.e. person table 2902 and company table 2904. The primary key field Party_ID exists within the party table 2906 to uniquely identify each record in the table.

Having categorized a person and company as a party, the categorizing and referencing module of the present invention further facilitates references to a party as opposed to references to a person or company, while still maintaining the ability to distinguish between them. For instance, the party table 2906 field USERID can be used and referenced without the need to necessarily know if that attribute is one that relates to a person or a company. However, if it is necessary to ascertain the underlying entity associated with the USERID field, it is possible to obtain that information through the link that is provided to each of the individual party type tables. This is because each party table 2906 record has either a Person_ID entry or Company_ID entry along with a Party_Type entry, which together, will identify the underlying entity type and more importantly the affiliated record within the entity's table.

Even further, the categorizing and referencing module of the present invention reduces the storage requirements for information on the individual entities. Storing a party table 2906 record where it makes sense to do so, will require much less space than storing a record from either the person table 2902 or company table 2904, when the party table record contains all of the relevant information. For example, when implementing a security system that requires a user identification, it is not necessary to have all of the information that is contained within either the person table 2902 and/or the company table 2904. It will suffice to have just the information that is contained within the party table 2906, which are actually fewer fields and consequently require less storage.

Further yet, the categorizing and referencing module of the present invention provides an increased flexibility in the ability to add new types of people, roles and organizations. By providing the party perspective of a person or a company, new attributes in the form of new fields can be added to the individual party type tables, person table 2902 and company table 2904, without affecting any applications, interfaces or other operations that interact with the party table 2906. For example, if it became necessary to modify the person table 2902 to add fields for e-mail and hire date, an application program, such as, the previously discussed security application, which identifies with a party and utilizes the party table 2906, would be unaffected by such addition. But on the other hand could benefit from the potential ability to access such attribute of the person table 2902 if necessary.

Even further, the categorizing and referencing module of the present invention improves data searches by allowing the search for a single entity i.e. a party, in a single table, party table 2906 as opposed to a search in the person table 2902 and/or company 2904.

In summary, the categorizing and referencing module of the present invention allows organizations and individuals to be defined and treated in a uniform and similar manner, so as to minimize duplication of data items and to facilitate data searches.

Category Administration Module

The category administration module of the present invention provides a method and system for grouping and classifying data items in a database environment. The particular embodiments described herein are intended in all respects to be illustrative rather than restrictive. Alternative embodiments will become apparent to those skilled in the art to which the present invention pertains without departing from its scope.

The category administration module of allowing items to be defined and associated with an alphanumeric category level to facilitate data searches, data presentation and display is presented as a feature in a multiple vendor e-Store offering. In this embodiment, the classification function of the present invention also handles multiple e-Stores with identical items and options, while maintaining the ability to distinguish between the items programmatically or visually. It will be understood and appreciated, however, by those of skill in the art that the system and method of assigning category levels to items for an e-Store may be utilized to classify and group any other objects or entities. Such grouping and classifying are contemplated by and are within the scope of the present invention.

In the preferred embodiment, the attributes and information that identify an e-Store, describe products, and associate the two objects are identified within a database, as fields in a table. There is also an additional field defined in the table, for assigning category levels. The grouping/classifying method of the present invention for specifying category levels, uses a string of alphanumeric characters in groupings of three, alternating the grouping between alphabetic and numeric characters, up to a theoretical maximum length of two hundred fifty six (256) characters for the entire group. For example a particular category level can be designated as "AAA001AAB002". It should be understood that neither the number of characters nor the alternating order of the groupings, is mandatory, those skilled in the art will recognize that various orders, options and permutations are possible and are considered to be within the scope of the category administration module of the present invention.

Figures 30A, 30B, 30C:
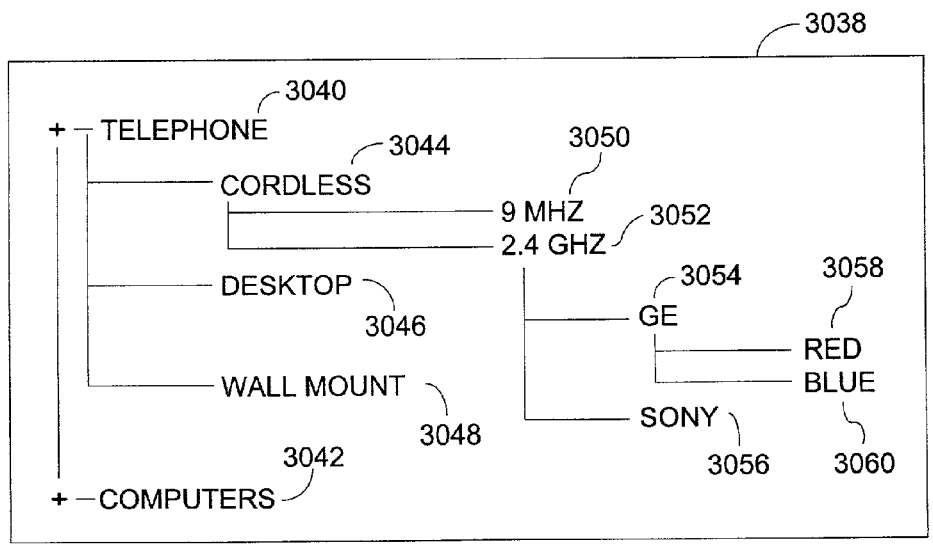
FIG. 30a is an illustration of records showing category levels associated with multiple vendors.
FIG. 30b is an illustration of additional records of category levels including sample products and features.
FIG. 30c illustrates a tree display representing products in a hierarchical formal facilitated by the present invention.

Referring to FIG. 30*a*, some illustrative records from a portion of a table that implements the present invention are shown. As noted above, a tree display of data and the classification or grouping of items is accomplished by assigning category levels to individual items. As such, data columns are designated for category level 3002, Item Name 3004, Item Description 3006 and so on. As shown and by way of example only, entries are made for a first record 3008 and a second record 3010. A unique category level 3002 is provided for each of the records 3008, 3010. Returning to the example previously discussed, regarding one or more online e-Stores that sell among other things, some electronic equipment. The first e-Store (ESTORE 1) is represented by record 3008 and a category level 3002 of 'AAA' is assigned. A second e-Store (ESTORE 2), represented by record 3010 has a category level 3002 of 'AAB'. Subsequent e-Stores can also be defined and assigned a category level 3002, in succession through the level 'ZZZ'.

FIG. 30*b*, illustrates a table containing a few records of the type previously discussed. Record 3012, is associated with telephone products that are carried by the vendor of ESTORE 1. Since the telephone is the first product item of the ESTORE 1 vendor, it is assigned a category level 3012 of 'AAA001', where 'AAA' designates the vendor and '001' indicates that it is the first item. Another line of products carried by the same ESTORE 1 vendor are computers. This record 3024 is designated, with a category level of 'AAA002' to indicate as previously discussed, the vendor and the fact that this is the second item for that particular vendor.

Telephones, as well as other products, tend to come in a variety of styles and with a variety of features, and such options must be conveyed to a consumer. In order to accommodate this scenario, it is further necessary within the database of the current example, to designate these style and feature variations for later retrieval. A record 3026 is specified for a category of cordless telephones, carried by the ESTORE 1 vendor, and is duly assigned a category level 3012 of 'AAA001AAA'. This category level designation not only indicates the lineage of the cordless phone, but it also identifies its position within the hierarchy of products. In other words, just based on the category level 3012 'AAA001AAA', one can ascertain that this product is the first of a subset of the category level 3012 'AAA001' (telephones), which in turn is a subset of 'AAA' (products of ESTORE 1 vendor). Consistent with this same methodology, the 9 MHZ and 2.4 GHZ variations of a cordless telephone are assigned category levels 3012 of 'AAA001AAA001' and 'AAA001AAA002' in records 3028 and 3030 respectively.

Other style variations of a telephone are the desktop or wall mount. Since these are variations that apply to telephones, the category level 3012 for each of them will be on the same level as the previously noted cordless telephone. In other words, as shown, desktop telephones indicated by record 3032 has a category level of 'AAA001AAB' and wall mount telephones of record 3034 has a category level of 'AAA001AAC'. Both of which are at the same level as the cordless phone with a category level 3012 of "AAA001AAA".

As previously noted, the category administration module of the present invention enables records relating to multiple vendors or multiple e-stores to coexist. This ability, as will be understood by those skilled in the art, is not limited to just vendors and e-Stores but rather to any other grouping of data where data items need to be stored or displayed in a hierarchical manner. To this end, record 3020 indicates a second vendor, ESTORE 2 with a category level 3012 of 'AAB'. Record 3036, designates telephone products being offered by ESTORE 2. Accordingly, a category level 3012 of 'AAB001' is assigned to the telephone product.

Having categorized and grouped items within a table, the category administration module of the present invention further facilitates identification of peer items and item ancestral lines. This enables visual determination of item relationships upon inspection of the category level 3012 field, as well as a treed display of data items. For example, as shown in FIG. 30*c*, a 'drill down' tree representation of the product offerings for ESTORE 1 vendor is displayed, and generally referenced as 3038. The system and method of the present invention, through the category level entries shown in FIG. 30*b*, facilitates such a display.

Returning to FIG. 30*c*, the screen text telephones 3040, is on the same level as computers 3042 as provided by the category level 3012 of record 3018 and record 3020. Consistent with other category levels 3012 of records 3022 to 3036 in FIG. 30*b*, a hierarchical and relationship display of items 3042 to 3060 are also shown in FIG. 30*c*.

A sub-category or sub-level of the telephone 3040 shows the items cordless 3044, desktop 3046 and wall mount 3048. As previously noted these items are variations of the telephone. The item cordless 3044 has a further sub-level that displays its variations, namely the cordless 9 MHZ 3050 and the cordless 2.4 GHZ 3052. Also shown in FIG. 30*c* but not included in the table of FIG. 30*b* is the possibility that there could be other variations, to any of the indicated levels, thus resulting in more sub-levels. As shown in FIG. 30*c* there could be multiple brands of the telephone cordless 2.4 GHZ 3052, such as brand-a 3054 and brand-b 3056. For each brand there could also be color choices, minimally shown as red 3058 and blue 3060. It should be noted that in order for these additional sub-levels to be displayed, entries and category levels 3012 must be specified in the database table.

The present invention further allows table driven growth of an e-Store. Items can be added an associated with the proper parent product line or option by the specification of a properly formatted category level. For example, to add a cellular telephone to the product offering of the ESTORE 1 vendor, a record entry with a category level of 'AAA001AAD' would be all that was necessary to cause the item to show up in the correct position on the tree display of FIG. 30*c*.

Further yet, the method of the present invention improves data searches by allowing the search for items strictly by use of the associated category level rather than other typical constraints. A search that involves narrowing down the returned group of information is more feasible with the use of the category levels of the present invention. For example, a search for all telephone products carried by an e-Store vendor under the present system and method requires a search of the field 'category level' for all entries beginning with the particular vendor's product level, i.e., 'AAA001'. This provides greater efficiency than creating a data query that uses either sub queries or multiple field queries. A sub-query involves running a first query to get one result, followed by a second query on the first result set for a subsequent result, or vise-versa, e.g., (Select from (select from table where vendor='estore1') where product='telephone'). A multiple field query involves, a query that obtains records that match the criteria for field1 and field 2, e.g., (Select from table where vendor='estore1' AND product='telephone').

Even further, from the stand point of a system designer or end-user, the category administration module of the present invention allows a designer to avoid having to predict the nature of searches and the fields of importance to an end-user when designating indexed search fields in a database. End-user searches can be performed to varying levels and degrees on the category level field. Using the above example, the designer would have had to designate the vendor field and product fields as search fields other wise the sample queries would be extremely slow. Whereas, with the category administration module of the present invention, designation of the category level field 3012 provides for a wide variety of possible and efficient searches.

In summary, the category administration module of the present invention provides a method and system for alpha-numeric grouping and classification of data items in a database application. The grouping/classifying method and system of the present invention allows product items to be associated with an alphanumeric identification, so as to facilitate the grouping, and classification of data items and to facilitate data searches. The category administration module of the present invention also enables a treed hierarchical display of product items in relationship to other product items.

Implementor Module

The implementor module of the present invention provides a system and method for handling complex relationships between data tables. The particular embodiments described herein are intended in all respects to be illustrative rather than restrictive. Alternative embodiments will become apparent to those skilled in the art to which the present invention pertains without departing from its scope.

The system and method for handling table relationships is described herein with reference to an e-Store database for on-line purchasing of vehicles. However, it will be understood and appreciated by those of skill in the art that the system and method described has applicability in numerous applications both inside and outside of an e-Store embodiment. The following discussion is not intended to limit the scope or functionality of the invention.

The system and method for handling complex relationships between data tables is described herein with reference to FIGS. 31*a*, 31*b*, 32 and 33. For purposes of the example illustrated in the figures, presume that four individual consumers are each purchasing a vehicle through an e-Store. Presume that the make and model of each vehicle has been chosen and established and that each consumer must decide on three optional features. These features are whether or not to include heated seats, whether or not they want automatic windshield wipers and what type of roof is desired.

Further presume that the first consumer chose not to have a heated seat, chose automatic wipers distributed by a first vendor and chose a solid roof. The second consumer chose to have a heated seat on the driver's side only, opted against automatic wipers and also chose a solid roof. The third consumer chose to have a heated seat on both the driver's side and the passenger's side, chose automatic wipers distributed by a second vendor and chose a moon roof. The fourth consumer chose not to have a heated seat, not to have automatic wipers and chose a sun roof.

With initial reference to FIG. 31*a*, a typical prior art system for storing data relating to the aforementioned consumer choices is illustrated. An exemplary table of prior art systems is represented by reference numeral 3100. The table contains a number of fields. Generically, there is a field for Record Number 3102 and Client Identification 3104. There is also a field for each of the consumer options 3106, 3108, 3110. As is evident from table 3100, there are four records contained in the table, one for each of the consumers purchasing a vehicle. The records are indicative of the consumer choices discussed above.

Since the consumer options 3106 through 3110 probably have some other criteria and relevant information associated with them, such as price variations and so on, a table is created for each of the options to include fields such as vendor, description and an identification number. The identification number is designated as a unique primary key for each of the tables. The tables for each of these options are shown in FIG. 32 and identified as heated seat table 3202, auto wipers table 3204 and roof table 3206. It should be noted that each of these tables likely contains several other fields for other related parameters, which are not discussed or shown because they provide no particular relevance to the present discussion.

There is a table entitled "Heated Seat" represented by reference numeral 3202. This table includes a field for vendor name, description and identification number. Table 3202 further includes two records. The first record indicates that identification number HS001 represents a heated seat on the driver's side only which is distributed by a first vendor. The second record indicates that identification number HS002 represents a heated seat on both the driver's side and the passenger's side which is distributed by the same vendor. There is also a table entitled "Auto Wipers" and represented by reference numeral 3204 and a table entitled "Roof" and represented by reference numeral 3206. Each of these tables contain records that provide a particular identification number for each of the options that can be selected by the consumer. There are two options for Auto Wipers with identification numbers of W001 and W002, from Vendor 1 and Vendor 2, respectively. In Roofs there are three available options with identification numbers R001, R002 and R003, which are associated with a solid roof from Vendor 1, a Moon roof also from Vendor 1 and a Sun roof from Vendor 3, respectively.

Because it is desirable, and probably likely, that there will be queries that seek to combine consumer purchase information of table 3100 with details from the other option tables 3202 to 3206, the fields of consumer purchase table 3100 namely heated seat 3106, auto wipers 3108 and roof 3110 are index fields and, more specifically, are foreign keys.

As will be understood and appreciated by those of skill in the art the more likely representation for data table 3100 of consumer choices is the data table 3120 shown in FIG. 31b, wherein the identification numbers of the individual option records from the tables 3202, 3204 and 3206 are used in the consumer option table 3120. For this reason, as well as other reasons previously discussed, the fields of the table 3120 that contain identification numbers are set up a foreign keys and implicitly, the identification numbers of the option tables 3202, 3204 and 3206 are set up as primary keys within the respective tables.

As will be understood and appreciated by those of skill in the art, the prior art table 3120 contains multiple nullable foreign-key fields (i.e., foreign key fields for which no value is required) because there are a number of options which the consumers could chose not to include in their respective vehicles. Such nullable fields are undesirable for reasons such as those stated above.

Figure 33:
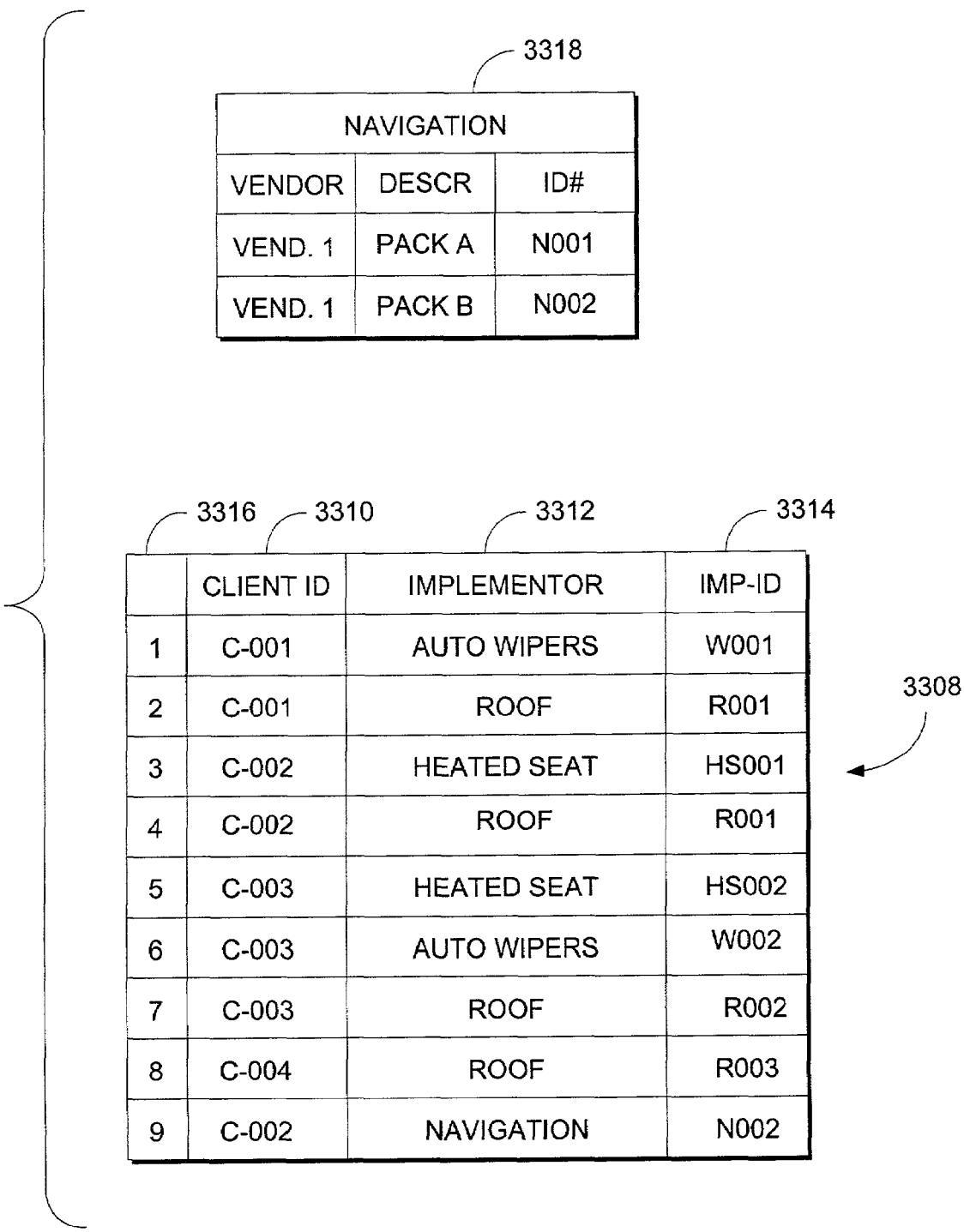
FIG. 33 illustrates a system for storing and handling data in accordance with the implementor module of an embodiment of the present invention.

With reference to FIG. 33, the implementor module of the present invention is illustrated for handling the same data. With reference to table 3308, the choices made by each exemplary consumer are represented according to the system and method of the present invention. Table 3308 includes four fields. There is a field entitled "Client ID" 3310, a field entitled "Implementor" 3312 and a field entitled "Implementor-ID" 3314. There is also a field 3316 containing the number of each record contained in the table.

The implementor module of the present invention handles the consumer choices and the relationships between each of the individual option tables as shown in FIG. 32, by creation of a master table 3308 which includes an IMPLEMENTOR field 3312 and an IMPLEMENTOR_ID field 3314. The master table 3308 also contains an indication of the information for which an association is desired, in this case a CLIENT ID field 3310. The IMPLEMENTOR field 3312 contains the name of the table in which the desired associated record exists. The IMPLEMENTOR_ID field 3314 contains the primary key of the record which is to be associated with the current record of the master table. In other words, field 3314 contains an indication of the exact record within the desired table for which association is desired.

For instance, recall that in the example illustrated, the consumer referred to herein by Client ID C-001 opted not to have heated seats, opted for automatic wipers distributed by a first vendor and opted for a solid roof. Record number one of master table 3308 provides a mandatory association between Client ID C-001 and the record from the table entitled "Auto Wipers" which has an identification number W001. Looking at the "Auto Wipers" table 3204 of FIG. 32, it is evident that this is the primary key for the record which refers to automatic wipers manufactured by a first vendor, as desired. Further, record number two of master table 3308 provides a mandatory association between Client ID C-001 and the record from the "Roof" table 3206 of FIG. 32, which has an identification number R001. Examining the "Roof" table, it is evident that this is the primary key for the record which provides for a solid roof, as was desired.

A similar analysis of records 3–9 of column 3316 illustrates that table 3308 contains all of the correct information regarding the options chosen by each of the four consumers. However, the table is normalized and does not contain any null foreign-key fields. As such, it provides a more desirable option than the prior art system represented in FIG. 31a and 31b.

Each entry in table 3308 includes a dynamic link to another desired record. The association or link between the tables may be modified or changed without significant technical expertise. Table 3308, and in particular the IMPLEMENTOR and IMPLEMENTOR_ID fields 3312 and 3314, respectively, provides a dynamic, flexible system and method for linking one table to another table if a certain data condition exists and to a different table if a variant data condition exists. As such, data within tables may be related without the need to create multiple table instances for each data condition.

Furthermore, the implementor module of the present invention provides added flexibility in the ability to grow or expand consumer offerings through the addition of other data tables. For instance, in the example illustrated, assume that a new set of consumer options has become available, such as a navigation system for automobiles. Accordingly, a new option table is created called navigation and referenced as 3318. The table is created to include fields such as vendor, description, identification number and any other relevant fields.

Under prior art systems, such an addition will require extensive changes to application programs that interacted with the consumer option table 3120 of FIG. 31b. This would be the case because the addition of a new column/field to table 3120 would be necessary in order to accommodate the new user option. Hence, a change in the data structures that are used to communicate with the table 3120 would be necessary to handle the changed table structure.

Conversely, the implementor module of the present invention would require no change to the underlying structure of table 3308 of FIG. 33. Consequently, no changes to any interface application program will be necessary. Instead, the new navigation option may be incorporated by merely providing a record entry such as record 9 of FIG. 33. Record 9 designates a Client-ID 3310 of 'C-002' an IMPLEMENTOR field 3312 value of 'navigation' and an IMPLEMENTOR_ID field 3314 value of 'N002', to indicate that the second consumer has chosen to add 'PackB' of the navigation system. No other change or modifications to master table 3308 would be required.

Even further, from a designer's perspective, any relationship links that are required for a particular type of data query can be established on the fly by an application program, simply by utilizing the IMPLEMENTOR and IMPLEMENTOR_ID fields 3312 and 3314.

In summary, the implementor module of the present invention provides a system and method for handling complex relationships among tables through the dynamic linking of tables. This dynamic linking of data tables to one another is based on data field values, thus eliminating the need for static table links which need to anticipate all potential data search strategies.

The systems and methods of the present invention have been described in relation to particular embodiments which are intended in all respects to be illustrative rather than restrictive. Alternative embodiments will become apparent to those of skill in the art to which the invention pertains without departing from its scope.

From the foregoing, it will be seen that this invention is one well adapted to attain all the ends and objects herein above set forth together with other advantages which are obvious and which are inherent to the systems and methods. It will be understood and appreciated that certain features and sub-combinations are of utility and may be employed without reference to other features and sub-combinations. This is contemplated by and is within the scope of the claims.

Having thus described the invention, what is claimed is:

1. A method in a computing environment for configuring images for display, the method comprising:
   receiving a selection of a first component image associated with a first identifier, said first component image depicting a first component;
   based on said selection of said first component image, receiving a selection of a second component image associated with a second identifier, said second component image depicting a second component, wherein the first and second component images relate to components of a product;
   positioning, on a coordinate system, said first component image and said second component image, wherein positioning comprises accessing a table having pairs of identifiers that are incompatible, and based on the first and second identifiers traversing the table to determine whether said first component image and said second component images are compatible; and
   creating a configured image, said configured image including said first component and said second component.

2. The method as recited in claim 1, wherein said coordinate system is based upon an (X,Y) axis.

3. The method as recited in claim 1, wherein said second component image is overlaid on said first component image.

4. The method as recited in claim 1, wherein said first and second component images are photographs.

5. The method as recited in claim 1, further comprising consulting a coordinate table to determine coordinates of said first and second component images.

6. The method as recited in claim 1, further comprising consulting an image table to determine component images necessary to make-up said configured image.

7. A computer system having a processor, a memory and an operating environment, the computer system operable to perform the method of claim 1.

8. A method in a computing environment for configuring product images for display, the method comprising:
   receiving a selection of a configured product image;
   consulting a first data table to determine which of a variety of component images comprise said configured product image;
   selecting at least one of said variety of component images;
   automatically detecting and replacing incompatible component image selections;
   consulting a second data table to determine coordinates on an (X,Y) axis of each selected component image that comprises the configured product image; and
   displaying the configured product image by placing each selected component image at its corresponding coordinates on said (X,Y) axis.

9. The method as recited in claim 8, wherein said component images are photographs.

10. A computer readable medium having computer executable instructions for performing the method of claim 8.

11. A computer system having a processor, a memory and an operating environment, the computer system operable to perform the method of claim 8.

12. The method as recited in claim 8, wherein each selected component represents a part of the product configuration.

13. A computer system for displaying a configured graphical image, the computer system comprising:
   a configuration component which determines which of a plurality of component images comprise the configured graphical image and selects at least one of said plurality of component images;
   a compatibility component which utilizes identifiers associated with said plurality of component images to generate notifications when component images of the configured graphical image conflict;
   a coordinate component which determines positions of said selected component images on a coordinate system, said positions being defined by (X,Y) coordinates; and
   a displaying component which arranges said selected component images on an (X,Y) axis based upon the determined (X,Y) coordinates and displays the resulting configured graphical image.

14. The computer system as recited in claim 13, wherein said plurality of component images are photographs.

15. The computer system as recited in claim 13, wherein the positioning is defined by (X, Y) coordinates for said selected component images and overlap relationships between said selected component images.

16. A method in a computing environment for displaying a product configuration including multiple parts, the method comprising:
- determining coordinates on an (X,Y) axis for one or more component images that comprise the product configuration;
- selecting at least one of said one or more component images;
- automatically detecting and replacing incompatible component image selections; and
- displaying the product configuration by positioning the selected component images at their determined coordinates.

17. The method as recited in claim 16, wherein the one or more component images are photographs.

18. A computer readable medium having computer executable instructions for performing the method of claim 16.

19. A computer system having a processor, a memory and an operating environment, the computer system operable to perform the method of claim 16.

20. The method as recited in claim 16, wherein the one or more component images represent multiple parts of the product configuration.

21. A computer readable medium containing a data structure for storing location information on one or more component images of a configured product, wherein said data structure comprises:
- an implementor table, said table containing entries indicative of the component images that make up the configured product, wherein one or more of said entries are selected to make up said configured product;
- a compatibility table, said compatibility table containing entries indicative of replacement component images of the one or more component images; and
- a coordinate table, said coordinate table containing entries indicative of (X,Y) coordinates for said selected entries, the (X,Y) coordinates specifying positions of component images necessary to correctly make up the configured product.

22. A computer readable medium containing a method for depicting a selected configuration of a product, wherein the method comprises:
- receiving a selection of a first component image, said first component image depicting a first component;
- based on said selection of said first component image, receiving a selection of a second component image, said second component image depicting a second component, wherein the first and second component images relate to components of the product;
- positioning, on a coordinate system, said first component image and said second component image, wherein positioning comprises determining whether said first component image and said second component images are compatible via identifiers associated with said first and second component images; and
- creating a configured image that represents the selected configuration of the product, said configured image including said first component and said second component.

23. The computer readable medium as recited in claim 22, wherein said coordinate system is based upon an (X,Y) axis.

24. The computer readable medium as recited in claim 22, wherein said second component image is overlaid on said first component image.

25. The computer readable medium as recited in claim 22, wherein said first and second component images are photographs.

26. The computer readable medium as recited in claim 22, wherein said method further comprises consulting a coordinate table to determine coordinates of said first and second component images.

27. The computer readable medium as recited in claim 22, wherein said method further comprises consulting an image table to determine component images necessary to make-up said configured image.

* * * * *